(12) United States Patent
Nakamura et al.

(10) Patent No.: US 11,554,444 B2
(45) Date of Patent: Jan. 17, 2023

(54) LASER MACHINE FOR CUTTING WORKPIECE

(71) Applicant: Fanuc Corporation, Yamanashi (JP)

(72) Inventors: Ryousuke Nakamura, Yamanashi (JP); Takashi Izumi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 396 days.

(21) Appl. No.: 16/820,120

(22) Filed: Mar. 16, 2020

(65) Prior Publication Data

US 2020/0298337 A1    Sep. 24, 2020

(30) Foreign Application Priority Data

Mar. 18, 2019    (JP) .............................. JP2019-050111

(51) Int. Cl.

| B23K 26/14 | (2014.01) |
|---|---|
| B23K 26/064 | (2014.01) |
| B23K 26/03 | (2006.01) |
| B23K 26/04 | (2014.01) |
| B23K 26/06 | (2014.01) |

(52) U.S. Cl.
CPC .......... *B23K 26/1438* (2015.10); *B23K 26/03* (2013.01); *B23K 26/034* (2013.01); *B23K 26/043* (2013.01); *B23K 26/0613* (2013.01); *B23K 26/0648* (2013.01); *B23K 26/147* (2013.01); *B23K 26/1437* (2015.10); *B23K 26/1464* (2013.01)

(58) Field of Classification Search
None
See application file for complete search history.

(56) References Cited

U.S. PATENT DOCUMENTS

| 6,031,200 | A | * | 2/2000 | Whitehouse | ........... | G01B 11/02 |
|---|---|---|---|---|---|---|
| | | | | | | 219/121.72 |
| 2018/0009062 | A1 | * | 1/2018 | Sbetti | ................ | G02B 26/0858 |
| 2018/0328725 | A1 | * | 11/2018 | Borgstrom | ........... | G01B 11/005 |

FOREIGN PATENT DOCUMENTS

| JP | 06190582 A | 7/1994 | |
|---|---|---|---|
| JP | 07144289 A * | 6/1995 | ........... B23K 26/042 |
| JP | 07204877 A * | 8/1995 | |
| JP | 07308792 A | 11/1995 | |
| JP | 10328870 A * | 12/1998 | |
| JP | 2010284671 A | 12/2010 | |
| JP | 2012187606 A * | 10/2012 | |
| JP | 2012187606 A | 10/2012 | |
| JP | 6116757 B | 4/2017 | |
| JP | 2018020374 A | 2/2018 | |

OTHER PUBLICATIONS

Machine translation Japan Patent document No. 10328870A, Jun. 2022 (Year: 2022).*

* cited by examiner

*Primary Examiner* — Geoffrey S Evans
(74) *Attorney, Agent, or Firm* — RatnerPrestia

(57) ABSTRACT

A laser machine able to effectively satisfy cutting quality required on one side of a cutting spot of a workpiece. The laser machine comprising a machining head configured to emit a laser beam and an assist gas coaxially and non-coaxially; and a data table in which data of a machining condition for cutting a workpiece using the machining head, and a shift amount, by which a center axis of the assist gas is to be shifted from an optical axis of the laser beam in order to make cutting quality on both sides of a cutting line to be different during cutting the workpiece, are stored in associated with each other.

10 Claims, 37 Drawing Sheets

LASER MACHINE FOR CUTTING WORKPIECE

CROSS-REFERENCE TO RELATED APPLICATIONS

This application is a new U.S. Patent Application that claims benefit of Japanese Patent Application No. 2019-050111, filed Mar. 18, 2019, the disclosure of this application is being incorporated herein by reference in its entirety for all purposes.

BACKGROUND OF THE INVENTION

1. Field of the Invention

The present invention relates to a laser machine for cutting a workpiece.

2. Description of the Related Art

A laser machining method is known in which a workpiece is cut while an optical axis of the laser beam being shifted relative to an exit port of a nozzle through which an assist gas is emitted (e.g., JP 6116757 B).

On both sides of a cutting spot of the workpiece, cutting quality of each side of the workpiece required (a dimension of dross, roughness of a cut surface, a taper of a kerf, etc.) differs each other in some cases. Specifically, although high cutting quality is required on one side of the cutting spot of the workpiece, cutting quality equivalent to that on the one side is not required on the other side of the cutting portion in some cases. In such a case, there is a demand for a technique able to effectively satisfy the cutting quality required on one side of the cutting spot of the workpiece.

SUMMARY OF THE INVENTION

In an aspect of the present disclosure, a laser machine comprising a machining head configured to emit a laser beam and an assist gas coaxially and non-coaxially; and a data table in which data of a machining condition for cutting a workpiece using the machining head, and a shift amount, by which a center axis of the assist gas is to be shifted from an optical axis of the laser beam in order to make cutting quality on both sides of a cutting line to be different during cutting the workpiece, are stored in associated with each other.

According to the present disclosure, when two regions having different cutting quality requirements are specified on both sides of a cutting spot of a workpiece, it is possible to effectively satisfy the cutting quality requirement for one of the regions.

DETAILED DESCRIPTION

Figure 1:
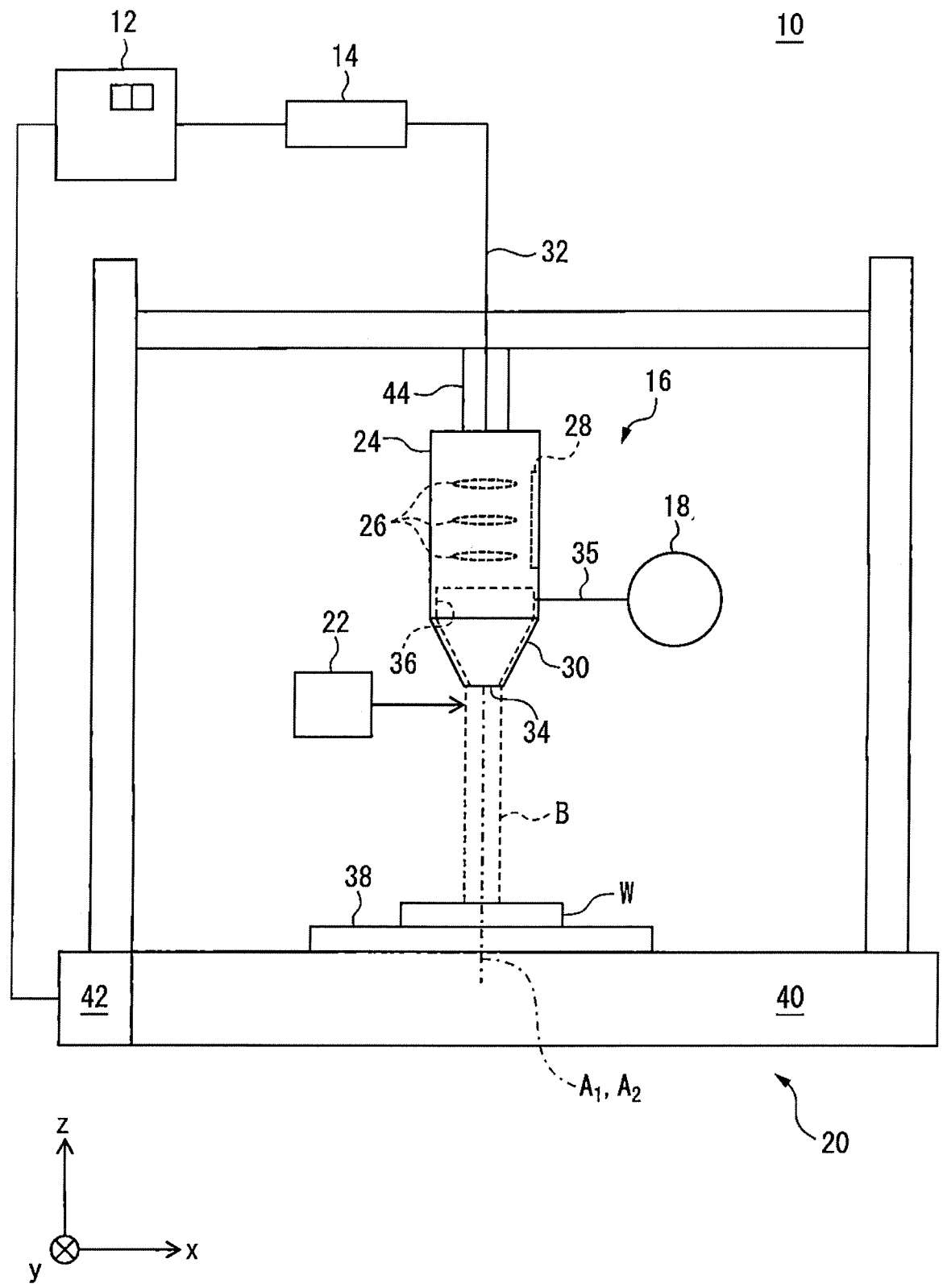
FIG. 1 is a diagram of a laser machine according to an embodiment.

Embodiments of the present disclosure will now be described in detail with reference to the drawings. Note that, in the various embodiments described below, similar components are denoted by the same reference numerals, and redundant description thereof will be omitted. Further, in the following description, an orthogonal coordinate system in the drawings is used as a reference of directions, and the x-axis positive direction is referred to as the rightward direction, the y-axis positive direction is referred to as the frontward direction, and the z-axis positive direction is referred to as the upward direction, for that sake of convenience.

Figure 2:
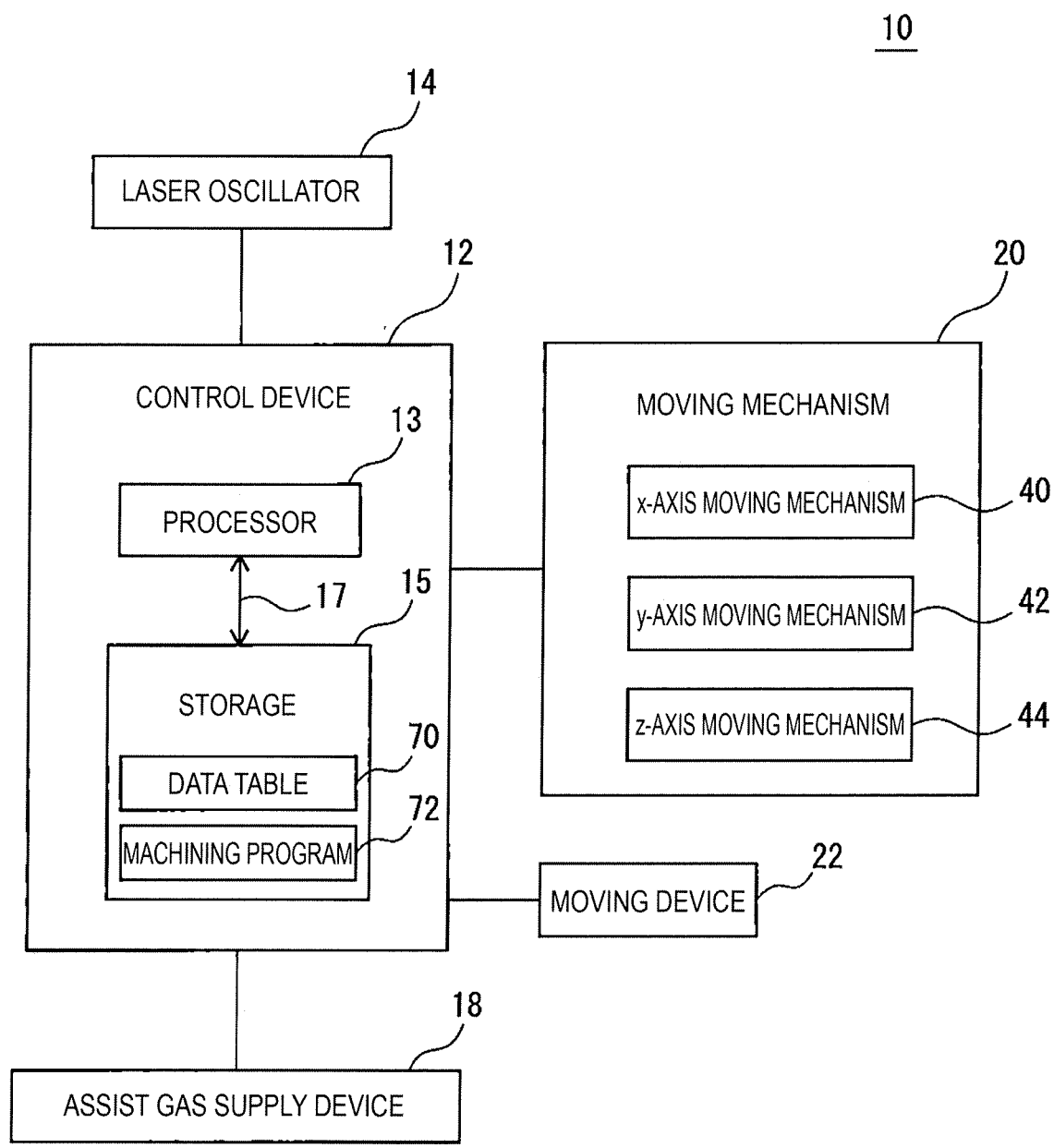
FIG. 2 is a block diagram of the laser machine illustrated in FIG. 1.

Referring to FIG. 1 and FIG. 2, a laser machine 10 according to an embodiment will be described. The laser machine 10 includes a control device 12, a laser oscillator 14, a machining head 16, an assist gas supply device 18, a moving mechanism 20, and a moving device 22. The control device 12 includes e.g. a processor 13 (CPU, GPU, etc.) and a storage 15 (ROM, RAM, etc.), and controls each component of the laser machine 10 directly or indirectly. The processor 13 and the storage 15 are communicably connected to each other via a bus 17.

The laser oscillator 14 performs laser oscillation inside thereof in accordance with a command from the control device 12, and emits a laser beam to the outside. The laser oscillator 14 may be of any type, such as a $CO_2$ laser oscillator, a solid-state laser (YAG laser) oscillator, or a fiber laser oscillator.

The machining head 16 includes a head main body 24, optical elements 26, a lens driver 28, and a nozzle 30. The head main body 24 is hollow, and an optical fiber 32 is connected to a proximal end of the head main body 24. The laser beam emitted from the laser oscillator 14 propagates through the optical fiber 32, and enters into the head main body 24.

The optical elements 26 include e.g. a collimating lens or a focus lens, and constitute an optical system of the machining head 16. The optical elements 26 collimate or focus the laser beam entering into the head main body 24, and guide it to a workpiece W. The optical elements 26 are housed in the head main body 24 so as to be movable in a direction of an optical axis $A_1$ of the laser beam. The lens driver 28 moves at least one optical element 26 in the direction of the optical axis $A_1$. By the lens driver 28 adjusting the position of the optical element 26 in the direction of the optical axis $A_1$, it is possible to control a focus position in the optical axis direction of the laser beam emitted from the nozzle 30.

The nozzle 30 is hollow, and provided at a distal end of the head main body 24. The nozzle 30 has a truncated-conical outer shape in which a cross-sectional area orthogonal to the optical axis $A_1$ decreases from the proximal end thereof toward the distal end thereof, and includes a circular-shaped emission port 34 at the distal end thereof. A hollow chamber 36 is formed inside the nozzle 30 and the head main body 24. The laser beam propagating from the optical elements 26 passes through the chamber 36 and is emitted to the outside through the emission port 34.

The assist gas supply device 18 supplies an assist gas to the chamber 36 formed inside the head main body 24 and the nozzle 30, through a gas supply tube 35. The assist gas is e.g. nitrogen or air. The assist gas supplied to the chamber 36 is emitted through the emission port 34 as a jet B, together with the laser beam.

The nozzle 30 is configured to emit the assist gas and the laser beam coaxially and non-coaxially with each other, as described later. In FIG. 1, the assist gas jet B is schematically illustrated by dotted lines. When the nozzle 30 emits the assist gas and the laser beam coaxially, the optical axis $A_1$ of the laser beam and a center axis $A_2$ of the assist gas are parallel to the z-axis. The z-axis direction is parallel to a vertical direction, for example.

The moving mechanism 20 moves the machining head 16 and the workpiece W relative to each other. Specifically, the moving mechanism 20 includes a work table 38, an x-axis moving mechanism 40, a y-axis moving mechanism 42, and a z-axis moving mechanism 44. The workpiece W is set on the work table 38. The x-axis moving mechanism 40 includes e.g. a servomotor (not illustrated) and a ball screw mechanism having a ball screw extending in the x-axis direction (not illustrated). The x-axis moving mechanism 40 moves the work table 38 in the x-axis direction in accordance with a command from the control device 12.

The y-axis moving mechanism 42 includes e.g. a servomotor (not illustrated) and a ball screw mechanism having a ball screw extending in the y-axis direction (not illustrated). The y-axis moving mechanism 42 moves the work table 38 in the y-axis direction in accordance with a command from the control device 12. The z-axis moving mechanism 44 includes e.g. a servomotor (not illustrated) and a ball screw mechanism having a ball screw extending in the z-axis direction (not illustrated). The z-axis moving mechanism 44 moves the machining head 16 in the z-axis direction.

In accordance with a command from the control device 12, the moving device 22 moves the optical axis $A_1$ of the laser beam and the center axis $A_2$ of the assist gas B relative to each other, by varying at least one of the optical axis arrangement of the optical system in the machining head 16, the position of the nozzle 30, and the emission mode of the assist gas. There are various embodiments of the moving device 22. Hereinafter, the various embodiments of the moving device 22 will be described with reference to FIG. 3 to FIG. 12.

Figure 3:
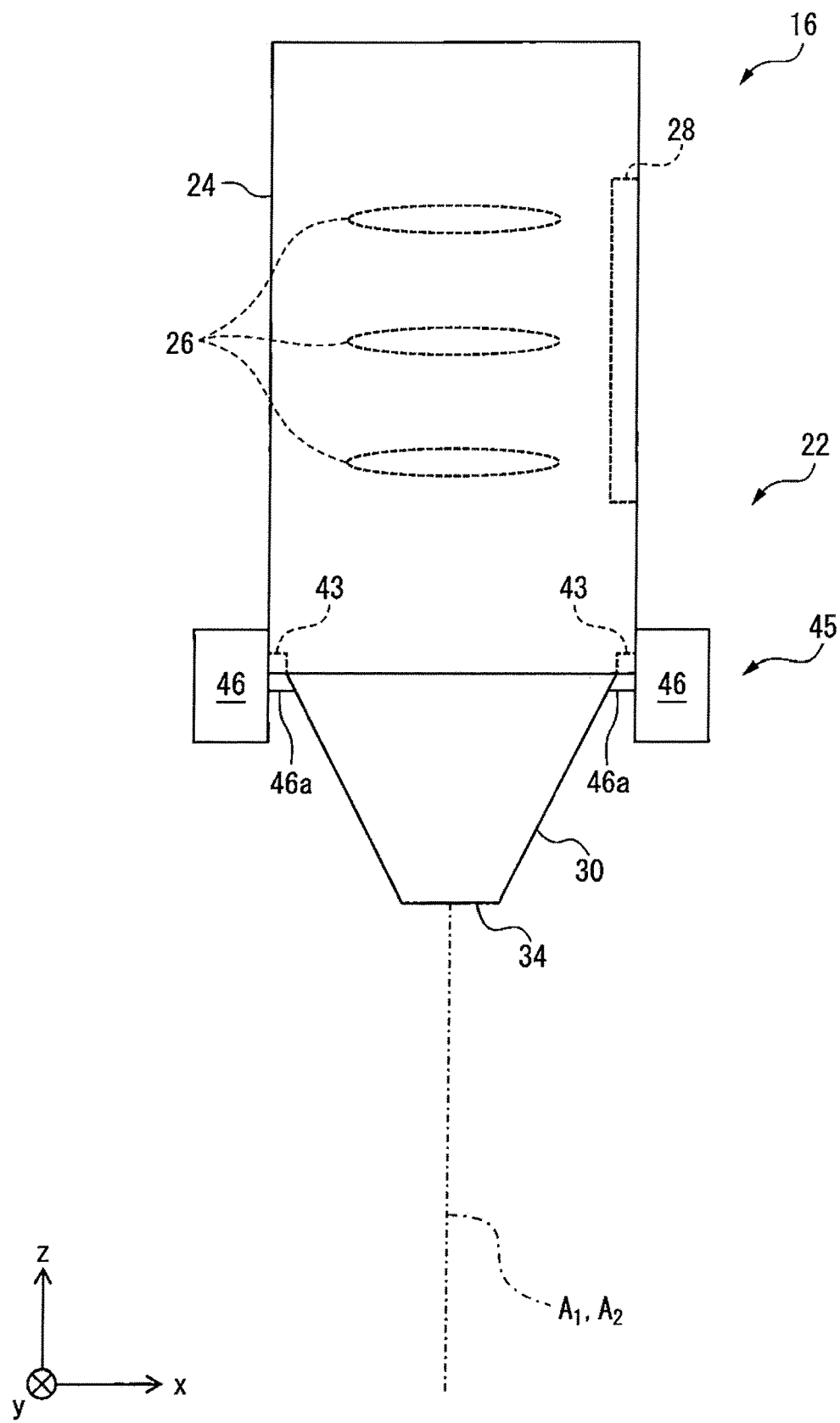
FIG. 3 is a diagram of a moving device according to an embodiment.

A moving device 22 illustrated in FIG. 3 includes a nozzle moving mechanism 45. In the embodiment illustrated in FIG. 3, the nozzle 30 is provided at the head main body 24 so as to be movable along an x-y plane (i.e., a plane orthogonal to an optical axis $A_1$) relative to the head main body 24. For example, an elastic material (e.g., annular rubber) 43 is interposed between the nozzle 30 and the head main body 24, such that the nozzle 30 can be supported by the elastic material 43 so as to be movable along the x-y plane relative to the head main body 24.

The nozzle moving mechanism 45 includes a plurality of drivers 46. For example, a total of four drivers 46 are disposed around the optical axis $A_1$ at substantially equal intervals (i.e., interval of 90 degree). Each driver 46 is a servomotor or a piezoelectric element, etc., and includes a drive shaft 46a, the tip of which is coupled to the nozzle 30. In accordance with a command from the control device 12, the drivers 46 advance and retract their drive shafts 46a in cooperation with each other so as to drive the nozzle 30 along the x-y plane relative to the head main body 24.

Figure 4:
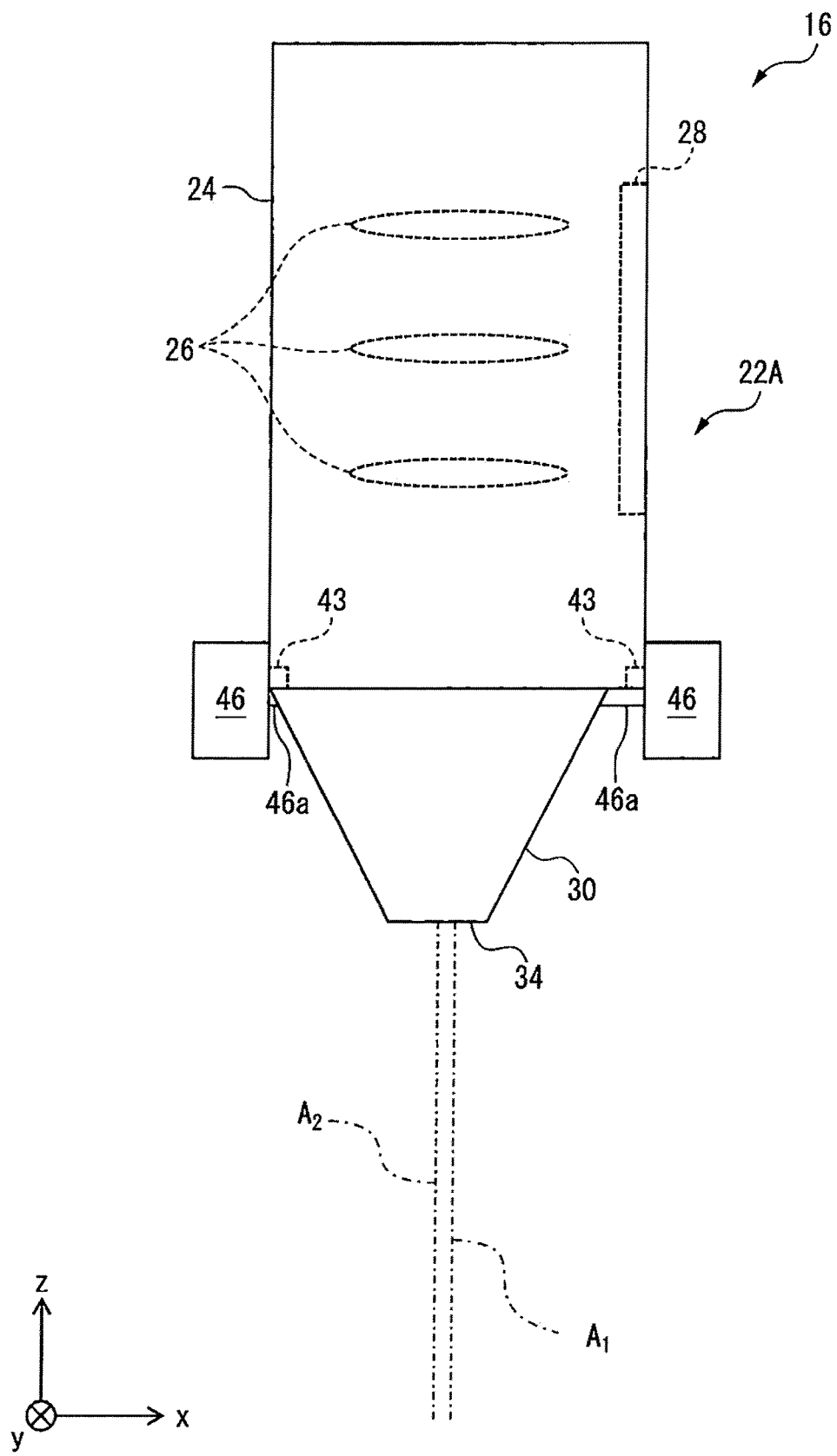
FIG. 4 illustrates a state in which the moving device illustrated in FIG. 3 shifts a center axis of an assist gas from an optical axis of a laser beam.

For example, as illustrated in FIG. 4, of the two drivers 46 aligned in the x-axis direction, the driver 46 located on the right side advances the drive shaft 46a thereof leftward, in synchronization with which the driver 46 located on the left side retracts the drive shaft 46a thereof leftward. Whereby, the nozzle 30 is moved leftward relative to the head main body 24. As a result, the center axis $A_2$ of the assist gas emitted from the emission port 34 of the nozzle 30 is shifted leftward from the optical axis $A_1$ of the laser beam.

Similarly, of the two drivers 46 aligned in the y-axis direction, the driver 46 located on the front side retracts the drive shaft 46a thereof forward, in synchronization with which the driver 46 located on the rear side advances the drive shaft 46a thereof forward. Whereby, the nozzle 30 is moved forward relative to the head main body 24. The processor 13 of the control device 12 controls the advancing and retracting direction and the movement amount of the drive shaft 46a of each driver 46, whereby moving the nozzle 30 in the x-axis and y-axis directions (i.e., along the x-y plane) relative to the head main body 24.

Figure 5:
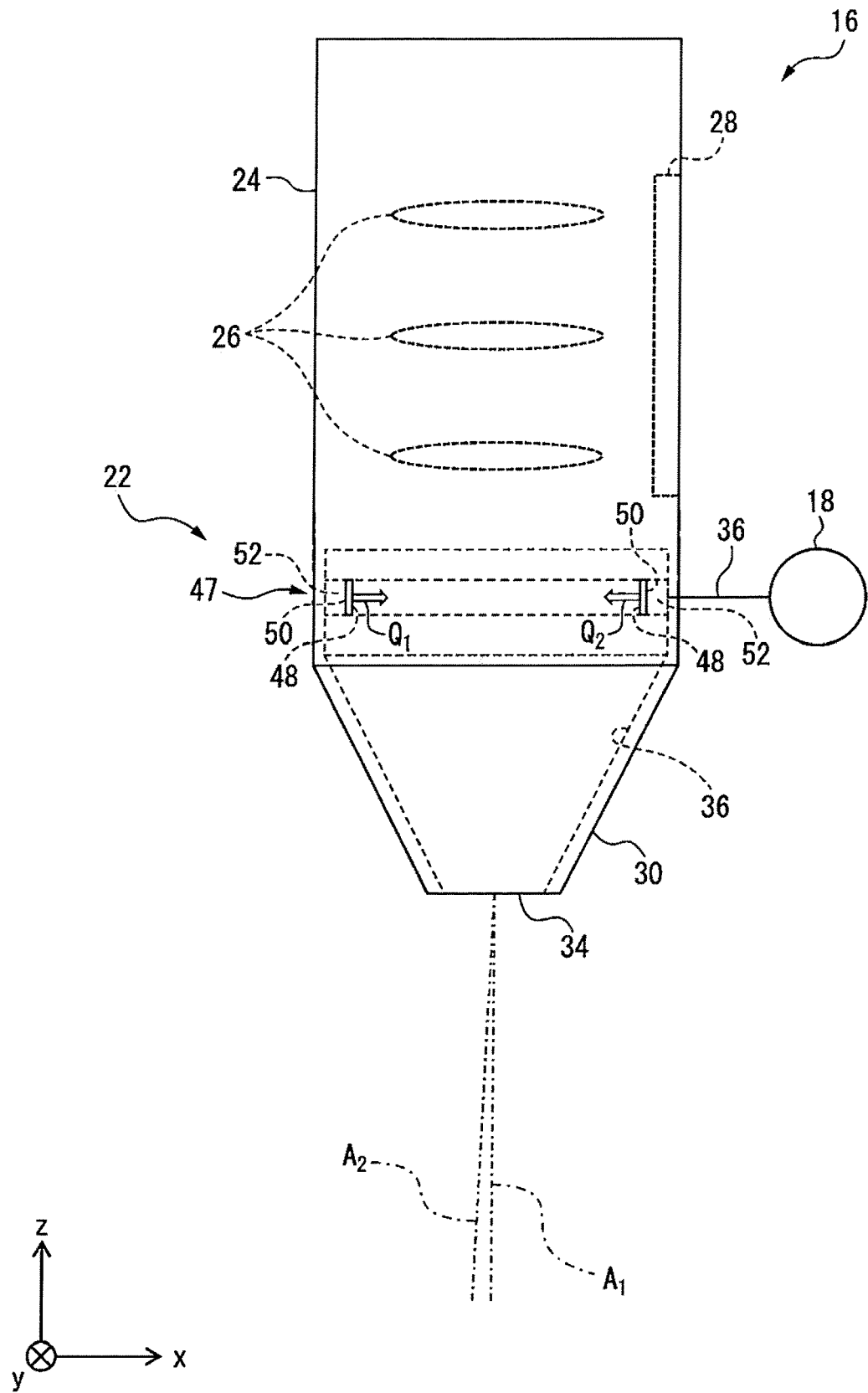
FIG. 5 is a diagram of a moving device according to another embodiment.

A moving device 22 illustrated in FIG. 5 includes a flow-rate adjustment mechanism 47. The flow-rate adjustment mechanism 47 is configured to shift the center axis $A_2$ of the assist gas B emitted through the emission port 34 from the optical axis $A_1$ of the laser beam, by varying the flow rate of the assist gas supplied to the chamber 36 along the circumferential direction around the optical axis $A_1$.

Specifically, the machining head 16 includes a plurality of discharge ports 48 disposed to be aligned in the circumferential direction around the optical axis $A_1$, wherein each discharge port 48 is opened to the chamber 36. The assist gas supplied from the assist gas supply device 18 is discharged into the chamber 36 through each discharge port 48.

The flow-rate adjustment mechanism 47 includes a plurality of movable shutters 50 configured to block the discharge ports 48, respectively, so as to change the opening areas thereof; and drivers 52 configured to drive the respective movable shutters 50. The driver 52 includes e.g. a servomotor, and changes the opening area of the discharge port 48 by moving the movable shutter 50 in response a command from the control device 12, thereby adjusting the flow rate of the assist gas introduced from each discharge port 48 into the chamber 36.

For example, as illustrated in FIG. 5, the flow-rate adjustment mechanism 47 blocks by the movable shutter 50 a part of the left discharge port 48 of the two discharge ports 48 disposed to face each other in the x-axis direction, so as to adjust the flow rate of the assist gas discharged therefrom to a flow rate $Q_1$.

On the other hand, the flow-rate adjustment mechanism 47 fully opens the movable shutter 50 of the right discharge port 48 of the two discharge ports 48 disposed to face each other in the x-axis direction, so as to adjust the flow rate of the assist gas discharged therefrom to a flow rate $Q_2$ (>$Q_1$). By adjusting the flow rates $Q_1$ and $Q_2$ of the assist gas in this manner, the center axis $A_2$ of the assist gas emitted through the emission port 34 may be shifted leftward from the optical axis $A_1$ of the laser beam.

Similarly, the flow-rate adjustment mechanism 47 blocks by the movable shutter-50 a part of the rear discharge port 48 of the two discharge ports 48 disposed to face each other in the y-axis direction, so as to adjust the flow rate of the assist gas discharged therefrom to a flow rate $Q_3$. On the other hand, the flow-rate adjustment mechanism 47 fully opens the movable shutter 50 of the front discharge port 48 so as to adjust the flow rate of the assist gas discharged therefrom to a flow rate $Q_4$ (>$Q_3$).

By adjusting the flow rates $Q_3$ and $Q_4$ of the assist gas in this manner, it is possible to shift the center axis $A_2$ of the assist gas emitted from the emission port 34 rearward from the optical axis $A_1$ of the laser beam. Thus, the flow-rate adjustment mechanism 47 varies the emission mode of the assist gas by varying the flow rate Q of the assist gas supplied into the chamber 36 in the circumferential direction around the optical axis $A_1$, whereby shifting the center axis $A_2$ of the assist gas from the optical axis $A_1$ of the laser beam.

Figure 6:
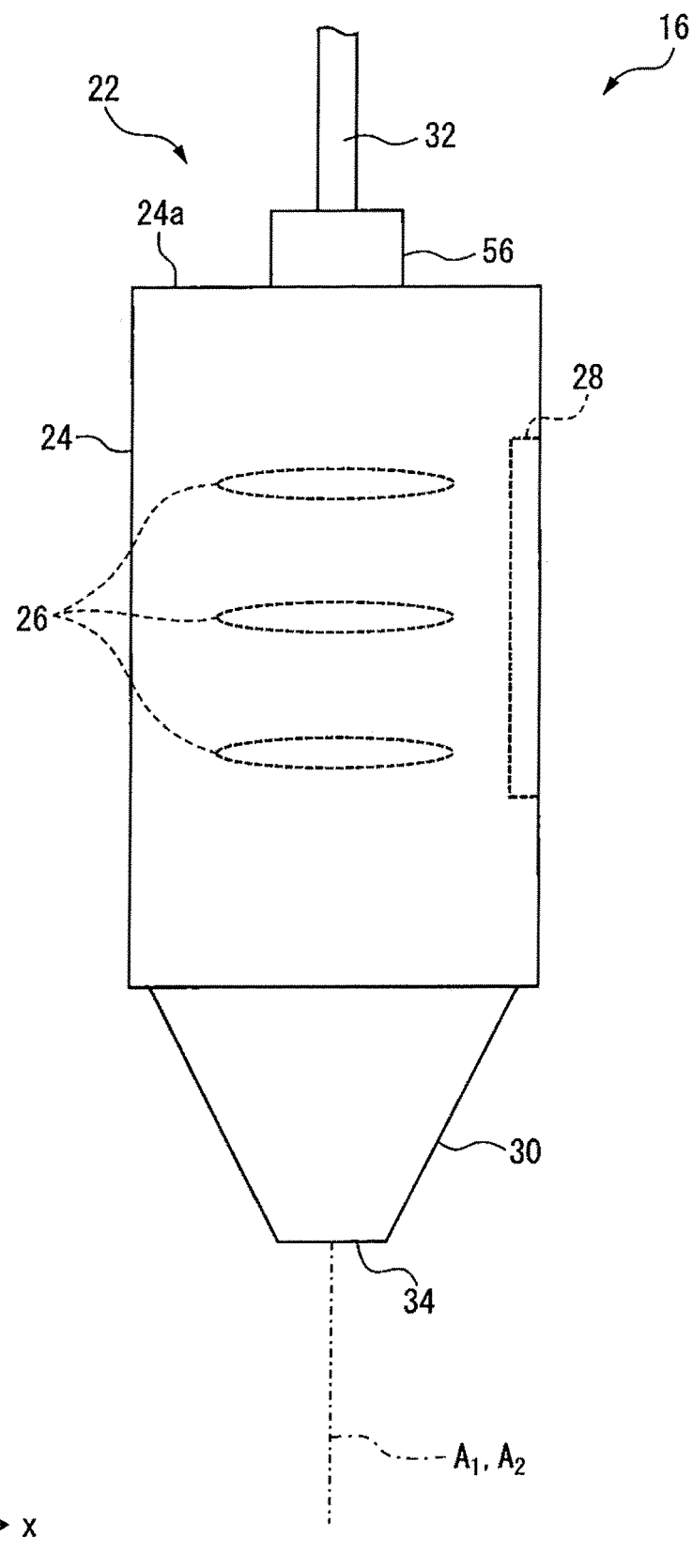
FIG. 6 is a diagram of a moving device according to still another embodiment.

The moving device 22 illustrated in FIG. 6 includes an optical-fiber moving mechanism 56. In the embodiment illustrated in FIG. 6, the optical fiber 32 is connected to a proximal end 24a of the head main body 24 so as to be movable along the x-y plane. The optical-fiber moving mechanism 56 includes e.g. a servomotor or a piezoelectric element, and moves the optical fiber 32 relative to the proximal end 24a. As a result, the position (or angle) of the laser beam entering into the head main body 24 from the optical fiber 32 is changed, whereby optical axis arrangement of the laser beam is varied.

Figure 7:
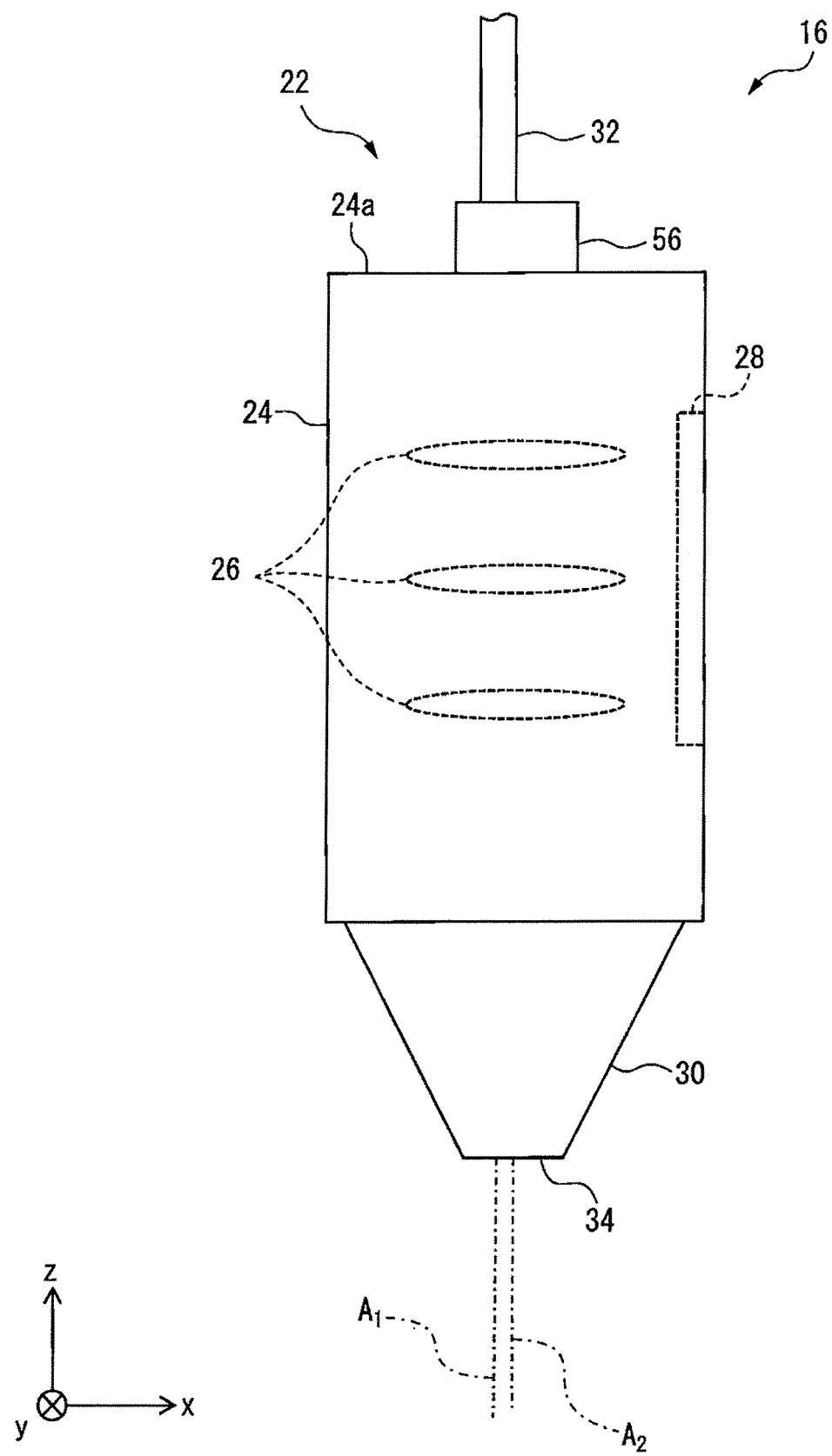
FIG. 7 illustrates a state in which the moving device illustrated in FIG. 6 shifts a center axis of an assist gas from an optical axis of a laser beam.

For example, as illustrated in FIG. 7, the optical-fiber moving mechanism 56 moves the optical fiber 32 to the left from the position illustrated in FIG. 6 relative to the proximal end 24a. As a result, the laser beam entering into the head main body 24 from the optical fiber 32 is shifted leftward, whereby the optical axis $A_1$ of the laser beam emitted through the emission port 34 may be shifted to the left from the position in FIG. 6. Thus, it is possible to shift the center axis $A_2$ of the assist gas from the optical axis $A_1$ of the laser beam.

Figure 8:
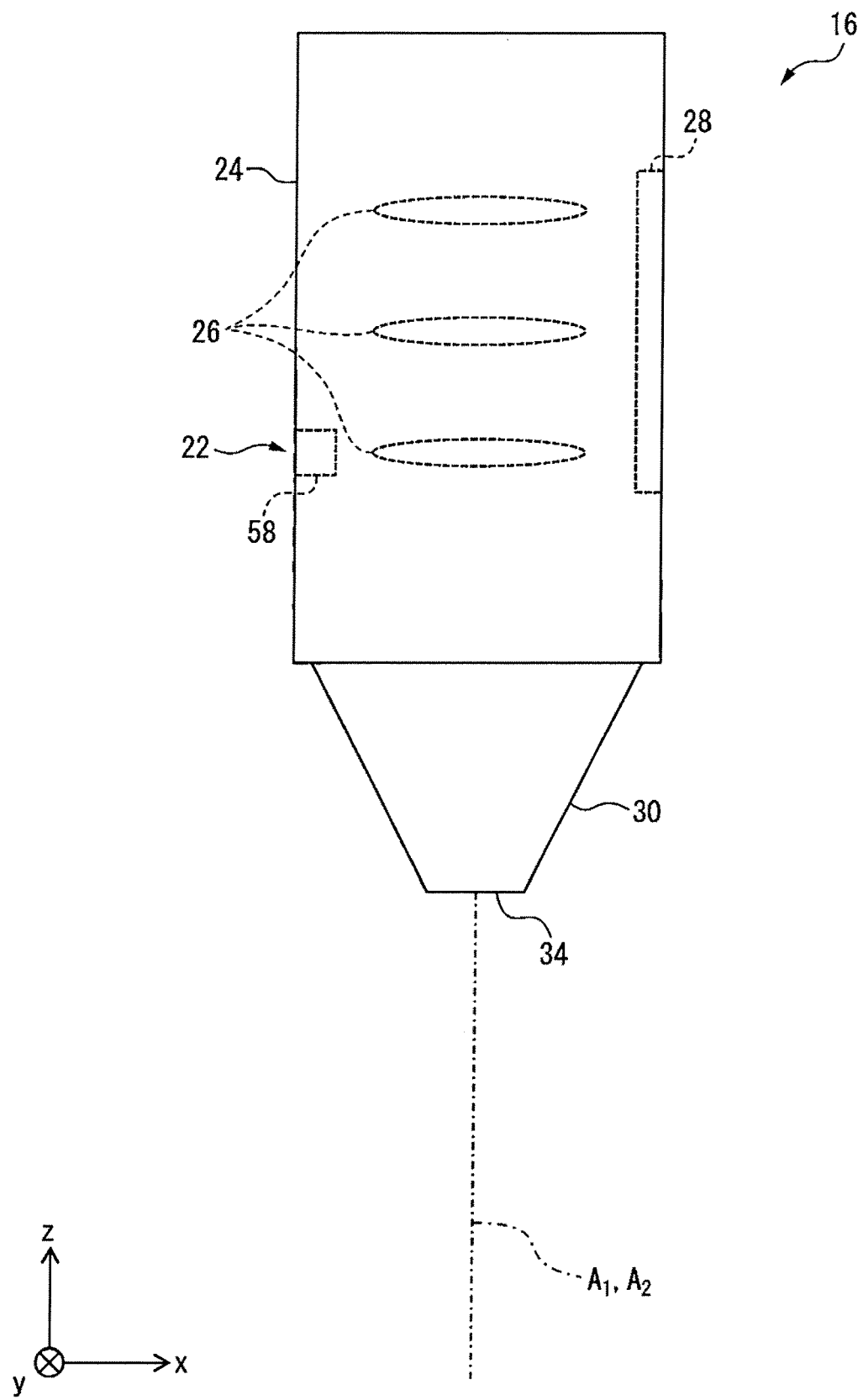
FIG. 8 is a diagram of a moving device according to further another embodiment.

The moving device 22 illustrated in FIG. 8 includes an optical-element moving mechanism 58. Specifically, the optical-element moving mechanism 58 includes e.g. a servomotor or a piezoelectric element, and is disposed inside the head main body 24 to move optical elements 26 (e.g., focus lenses) along the x-y plane. Along with the movement of the optical elements 26, the optical axis of the laser beam guided by the optical elements 26 is also moved along the x-y plane, whereby varying the optical axis arrangement of the laser beam.

Figure 9:
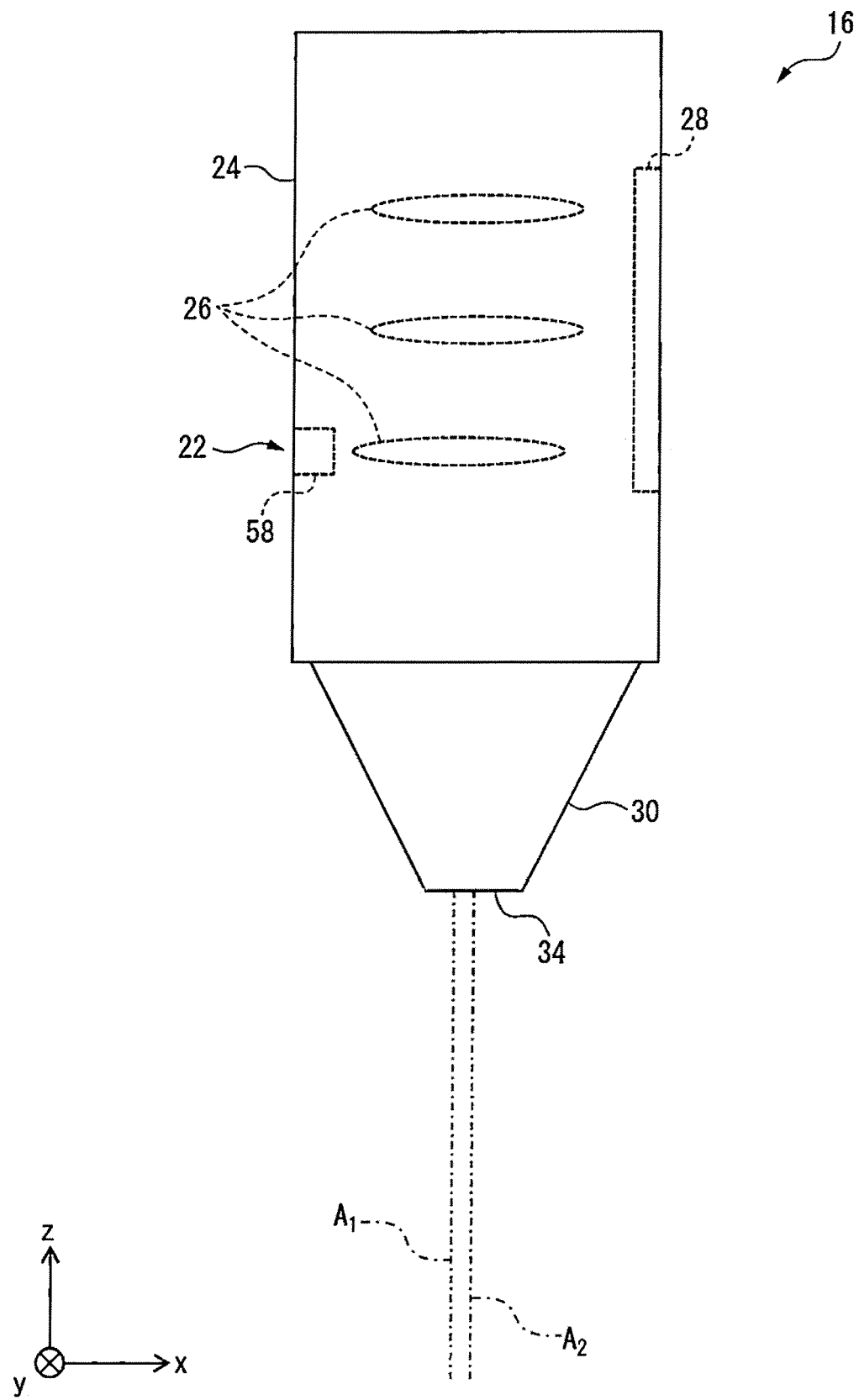
FIG. 9 illustrates a state in which the moving device illustrated in FIG. 8 shifts a center axis of an assist gas from an optical axis of a laser beam.

For example, as illustrated in FIG. 9, the optical-element moving mechanism 58 moves the lowest optical element 26 (focus lens) of the plurality of optical elements 26 to the left from the position illustrated in FIG. 8. As a result, the optical axis arrangement of the laser beam is varied, whereby the optical axis $A_1$ of the laser beam emitted through the emission port 34 may be shifted to the left from the position illustrated in FIG. 7. Thus, it is possible to shift the center axis $A_2$ of the assist gas from the optical axis $A_1$ of the laser beam.

The optical-element moving mechanism 58 may vary the optical axis arrangement of the laser beam by moving any one of the plurality of optical elements 26, or by moving two or more optical elements 26. Further, the lens driver 28 may function as the optical-element moving mechanism 58 to move each of the optical elements 26 in the optical axis $A_1$ direction, along with moving at least one optical element 26 along the x-y plane, in order to vary the optical axis arrangement of the laser beam.

Figure 10:
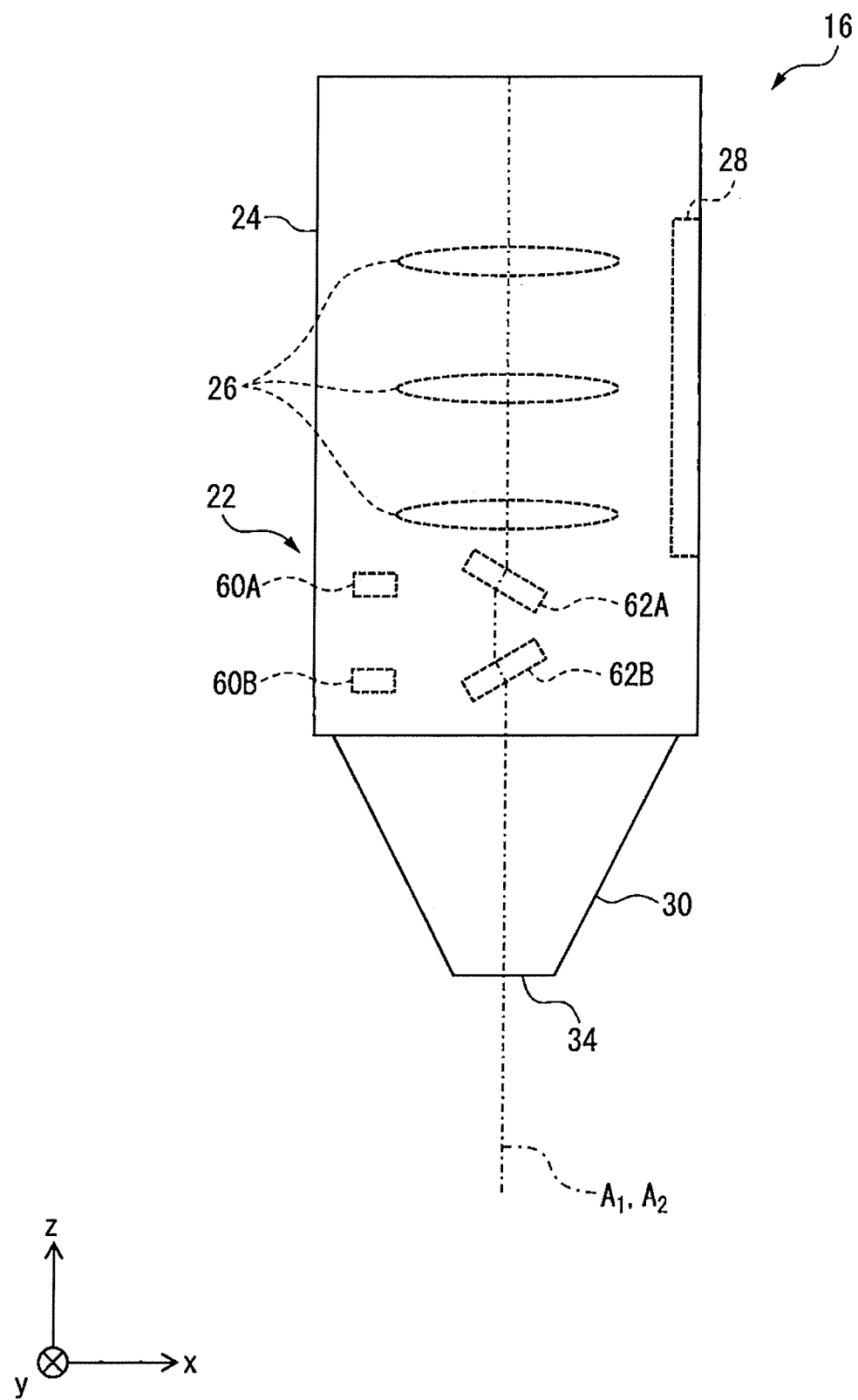
FIG. 10 is a diagram of a moving device according to still another embodiment.

The moving device 22 illustrated in FIG. 10 includes optical-element moving mechanisms 60A and 60B. In the embodiment illustrated in FIG. 10, optical elements 62A and 62B are further provided inside the head main body 24. The optical elements 62A and 62B constitute the optical system of the machining head 16, together with optical elements 26.

The optical element 62A is a transparent flat plate member able to guide a laser beam. The optical element 62A is disposed to be inclined relative to the optical axis (i.e., z-axis direction) of the laser beam incident thereon, and supported inside the head main body 24 so as to be rotatable about the optical axis. Similar to the optical element 62A, the optical element 62B is a transparent flat plate member able to guide a laser beam, disposed to be inclined relative to the optical axis of the laser beam incident on the optical element 62A, and supported inside the head main body 24 so as to be rotatable about the optical axis. The optical elements 62A and 62B are arranged separate from each other in the z-axis direction, and are rotatable independently of each another.

The optical-element moving mechanism 60A includes e.g. a servomotor, and is disposed inside the head main body 24 to rotate the optical element 62A. The optical-element moving mechanism 60B includes e.g. a servomotor, and is disposed inside the head main body 24 to rotate the optical element 62B. The optical-element moving mechanisms 60A and 60B rotate the optical elements 62A and 62B, respectively, thereby varying the optical axial arrangement of the laser beam emitted through the emission port 34.

Figure 11:
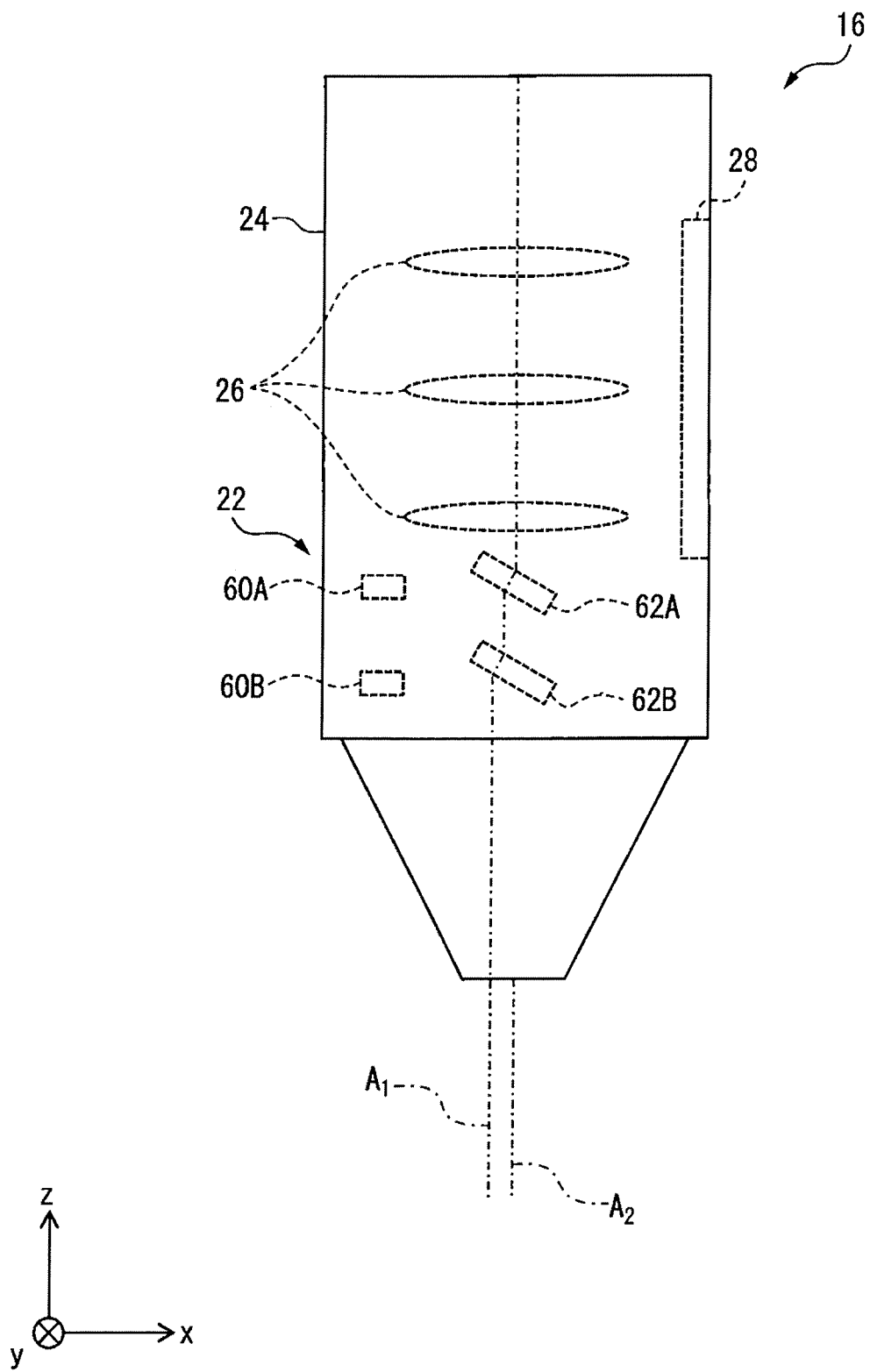
FIG. 11 illustrates a state in which the moving device illustrated in FIG. 10 shifts a center axis of an assist gas from an optical axis of a laser beam.

For example, when the optical-element moving mechanism 60B rotates the optical element 62B from the position illustrated in FIG. 10 to the position illustrated in FIG. 11, the propagation direction of the laser beam incident on the optical element 62B is varied.

As a result, the optical axis arrangement of the laser beam is varied, and the optical axis $A_1$ of the laser beam emitted through the emission port 34 may be shifted to the left from the position illustrated in FIG. 10. In this way, the optical-element moving mechanisms 60A and 60B vary the optical axis arrangement of the laser beam by varying the rotation angles of the optical elements 62A and 62B, respectively, thereby shifting the center axis $A_2$ from the optical axis $A_1$.

Figure 12:
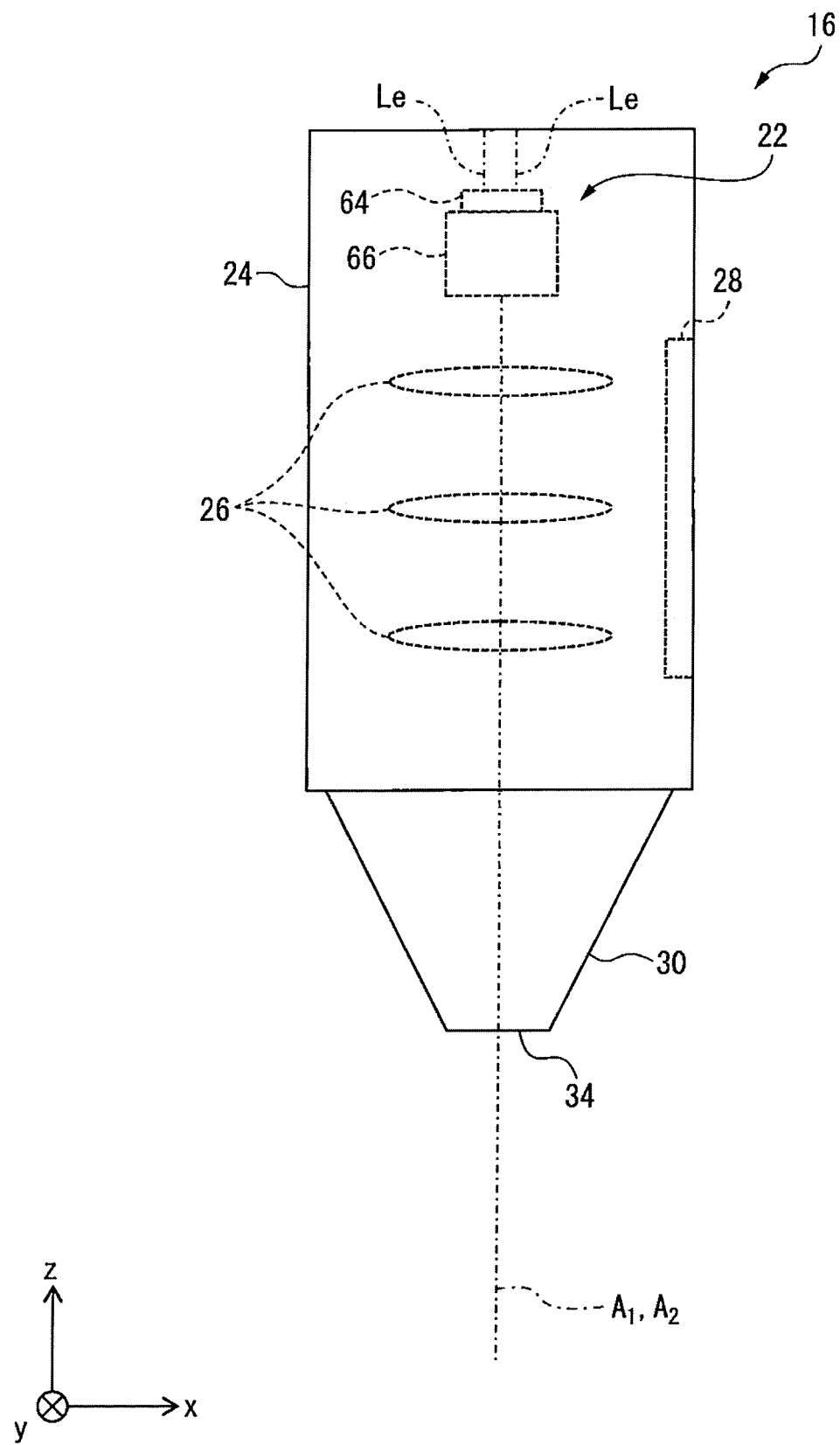
FIG. 12 is a diagram of a moving device according to still another embodiment.

The moving device 22 illustrated in FIG. 12 includes a beam-coupling adjustment mechanism 64. In the embodiment illustrated in FIG. 12, a plurality of laser beams Le enter the head main body 24. For example, the plurality of laser beams Le enter the head main body 24 in such arrangement that the beams are aligned in the circumferential direction around the center axis of the emission port 34 (i.e., the center axis $A_2$ of the assist gas) at substantially equal intervals.

As an example, the laser oscillator 14 emits the plurality of laser beams Le, and the emitted laser beams Le enter the head main body 24 through a plurality of optical fibers 32. In this case, the laser oscillator 14 may include a plurality of laser oscillators, each of which emits a laser beam Le. Alternatively, the laser oscillator 14 may emit a laser beam, and the emitted laser beam may be divided into the plurality of laser beams Le by a beam-divider (not illustrated), wherein the divided beams Le may enter the head main body 24.

A beam-coupling section 66 is further provided inside the head main body 24. The beam-coupling section 66 constitutes the optical system of the machining head 16, together with optical elements 26. The beam-coupling section 66 couples the plurality of laser beams Le having entered the head body 24, and guides the mixed beams to the optical elements 26 as a single laser beam.

The beam-coupling adjustment mechanism 64 adjusts the distribution of the laser beams Le entering the beam-coupling section 66. For example, the beam-coupling adjustment mechanism 64 is configured to adjust the distribution of the plurality of laser beams Le entering the beam-coupling section 66 by blocking at least one of the plurality of laser beams Le by a mirror (a total-reflection mirror or a partial-reflection mirror).

When the distribution of the laser beams Le is adjusted in this manner, the coupling mode of the plurality of laser beams Le in the beam-coupling section 66 becomes non-uniform, and the optical axis $A_1$ of the laser beam emitted through the emission port 34 is displaced along the x-y plane. In this way, the beam-coupling adjustment mechanism 64 adjusts the distribution of the laser beams Le entering the beam-coupling section 66 to make the coupling mode in the beam-coupling section 66 be non-uniform, thereby varying the optical axis arrangement of the laser beam.

The moving device 22 may include at least two of the nozzle moving mechanism 45, the flow-rate adjustment mechanism 47, the optical-fiber moving mechanism 56, the optical-element moving mechanism 58, the optical-element moving mechanism 60, and the beam-coupling adjustment mechanism 64. For example, the moving device 22 may include the nozzle moving mechanism 45 and the optical-element moving mechanism 58 to vary the position of the nozzle 30, along with varying the optical axis arrangement of the laser beam.

Figure 13:
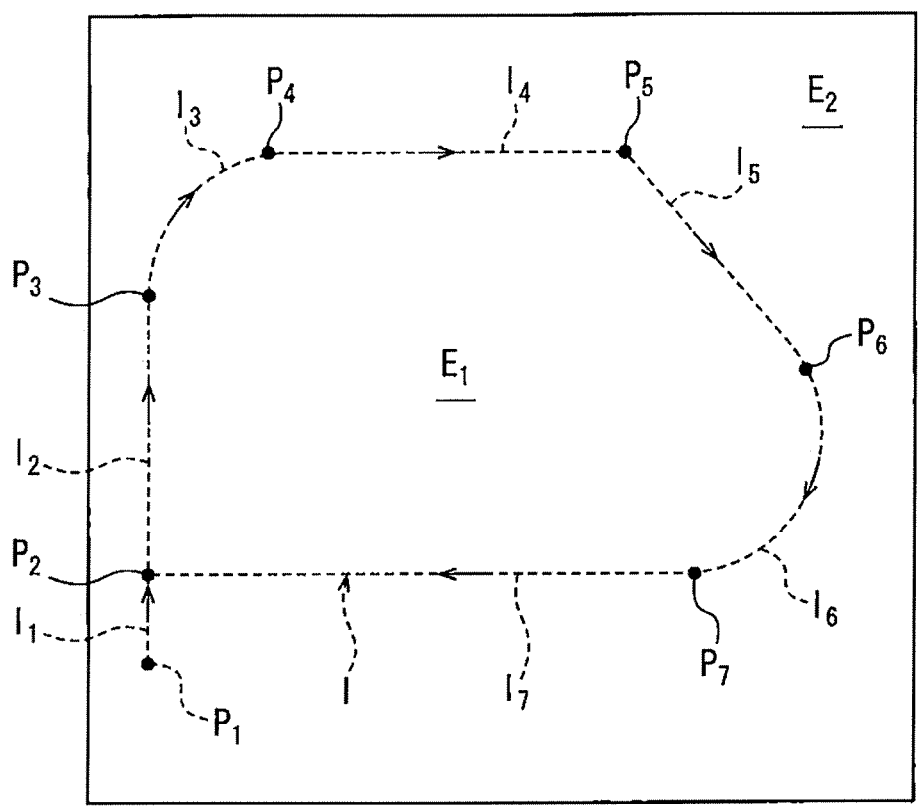
FIG. 13 illustrates an example of a workpiece to be cut.

Next, functions of the laser machine 10 will be described. The laser machine 10 cuts a workpiece W as illustrated in FIG. 13, for example, in accordance with a machining program 72. The machining program 72 is prepared in advance by an operator, and stored in the storage 15. In the machining program 72, a cutting line 1 on the workpiece W, and a product region $E_1$ and a waste region $E_2$ on both sides of the cutting line 1, which are separated by the cutting line 1, are specified.

The product region $E_1$ is a portion of the workpiece W that is used as a product, while the waste region $E_2$ is a portion that is not used as a product. In an example illustrated in FIG. 13, the cutting line 1 includes a plurality of continuous cutting lines $l_1$, $l_2$, $l_3$, $l_4$, $l_5$, $l_6$ and $l_7$. The cutting line $l_1$ linearly extends forward from a point $P_1$, which is a start point of machining, to a point $P_2$. The cutting line $l_2$ is continuously connected with the cutting line $l_1$ in a straight line, and linearly extends forward from the point $P_2$ to a point $P_3$.

The cutting line $l_3$ extends in a curved manner in a right-forward direction from the point $P_3$ to a point $P_4$. The cutting line $l_4$ linearly extends rightward from the point $P_4$ to a point $P_5$. The cutting line $l_5$ linearly extends in a right-rear direction from the point $P_5$ to a point $P_6$. The cutting line $l_6$ extends in a curved manner in a left-rear direction from the point $P_6$ to a point $P_7$. The cutting line $l_7$ linearly extends leftward from the point $P_7$ to the point $P_2$.

Thus, in this embodiment, the cutting lines $l_1$, $l_2$, $l_4$, $l_5$ and $l_7$ are straight lines, while the cutting lines and $l_6$ are curved (e.g., arc-shaped). The laser machine 10 cuts the workpiece W along the cutting lines $l_1$, $l_2$, $l_3$, $l_4$, $l_5$, $l_6$ and $l_7$ between the product region $E_1$ and the waste region $E_2$ in arrow directions in FIG. 13, by the laser beam emitted through the nozzle 30.

In this regard, the cutting quality requirement for the product region $E_1$ may be different from that for the waste region $E_2$ may be different from each other. The cutting quality requirement includes e.g. requirements for a dimension of the dross generated at the cutting spot of the workpiece W, roughness of the cut surface of the workpiece W, and a taper angle of the kerf formed between the product region $E_1$ and the waste region $E_2$ when the workpiece W is cut between the product region $E_1$ and the waste region $E_2$ along the cutting line 1.

As an example, if the cutting quality requirement is for the dimension of the dross, the dimension of the dross formed at the product region $E_1$, which is used as a product, is required to be as small as possible, while the dimension of the dross formed at the waste region $E_2$, which is not used as a product, may be allowed to be relatively large, as the cutting quality requirement.

As another example, if the cutting quality requirement is for the cut surface roughness, the cut surface roughness of the product region $E_1$ is required to be as small as possible, while the cut surface roughness of the waste region $E_2$ may be allowed to be relatively large, as the cutting quality requirement. As yet another example, if the cutting quality requirement is for the taper angle of the kerf, the taper angle of the product region $E_1$ is required to be substantially 0°, while the taper angle of the waste region $E_2$ may be allowed to be relatively large, as the cutting quality requirement.

The inventor of the present invention have focused on a fact that, during cutting along a cutting line between two regions, if the center axis $A_2$ of the assist gas is shifted from the optical axis $A_1$ of the laser beam toward one of two regions, a difference in cutting quality between the two regions occurs, and have found that it is possible to effectively satisfy the cutting quality of the product region $E_1$ by maintaining the center axis $A_2$ to be shifted from the optical axis $A_1$ toward the product region $E_1$ or the waste region $E_2$ during the cutting along the cutting line 1 between the product region $E_1$ and the waste region $E_2$.

Figure 14:
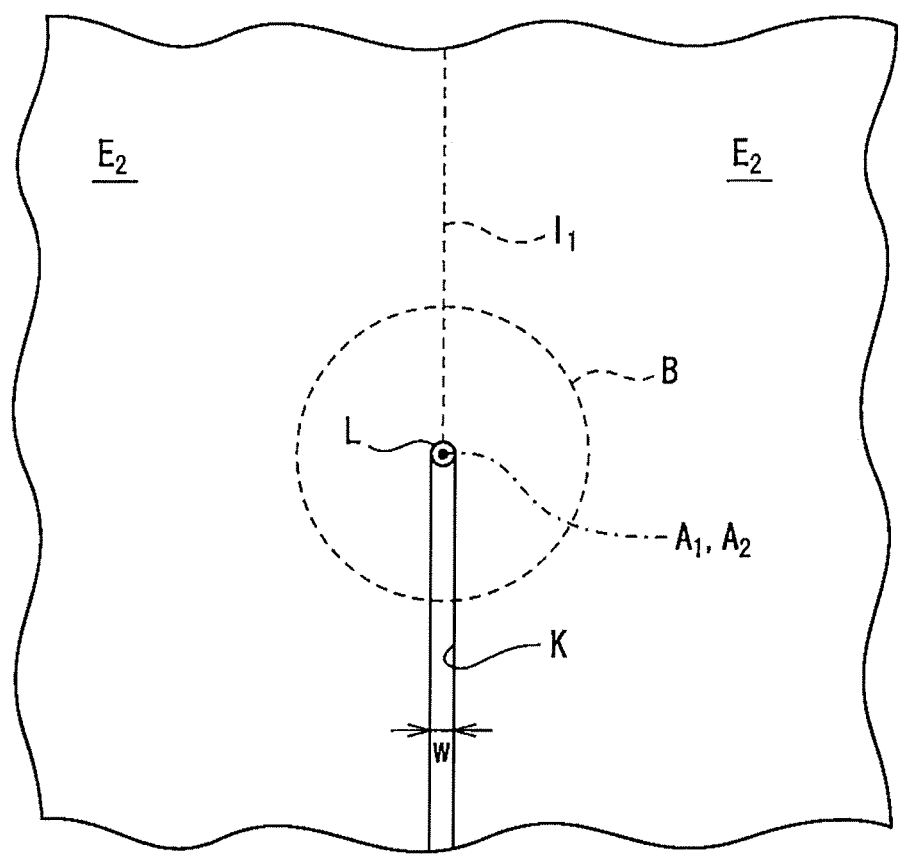
FIG. 14 illustrates a state in which a workpiece is cut while an assist gas and a laser beam being emitted coaxially.

Hereinafter, with reference to FIG. 14 to FIG. 16, examples for shifting the center axis $A_2$ of the assist gas B from the optical axis $A_1$ of the laser beam L will be described. FIG. 14 illustrates an example in which the assist gas B and the laser beam L are emitted coaxially to cut the cutting line $l_1$. As illustrated in FIG. 13, regions on both sides of the cutting line $l_1$ are the waste region $E_2$.

Therefore, the cutting quality requirements are the same on both the sides of the cutting line $l_1$. Accordingly, during cutting the cutting line $l_1$, the laser machine 10 coaxially emits the laser beam L and the assist gas through the nozzle 30 to cut the workpiece W by the laser beam L. As a result, a kerf K is formed in the workpiece W, and the workpiece W is cut along the cutting line $l_1$.

On the other hand, when the workpiece W is cut along the cutting lines $l_2$, $l_3$, $l_4$, $l_5$, $l_6$ and $l_7$, a region on one side and a region on the other side of these cutting lines $l_2$, $l_3$, $l_4$, $l_5$, $l_6$, and $l_7$ are the product region $E_1$ and the waste regions $E_2$, the cutting quality requirements of which are different. In the present embodiment, the laser machine 10 maintains the center axis $A_2$ to be shifted from the optical axis $A_1$ toward the product region $E_1$ or the waste region $E_2$ in response to the difference in the cutting quality requirements for the product region $E_1$ and the waste region $E_2$, during the cutting along the cutting lines $l_2$, $l_3$, $l_4$, $l_5$, $l_6$ and $l_7$ between the product region $E_1$ and the waste region $E_2$.

Figure 15:
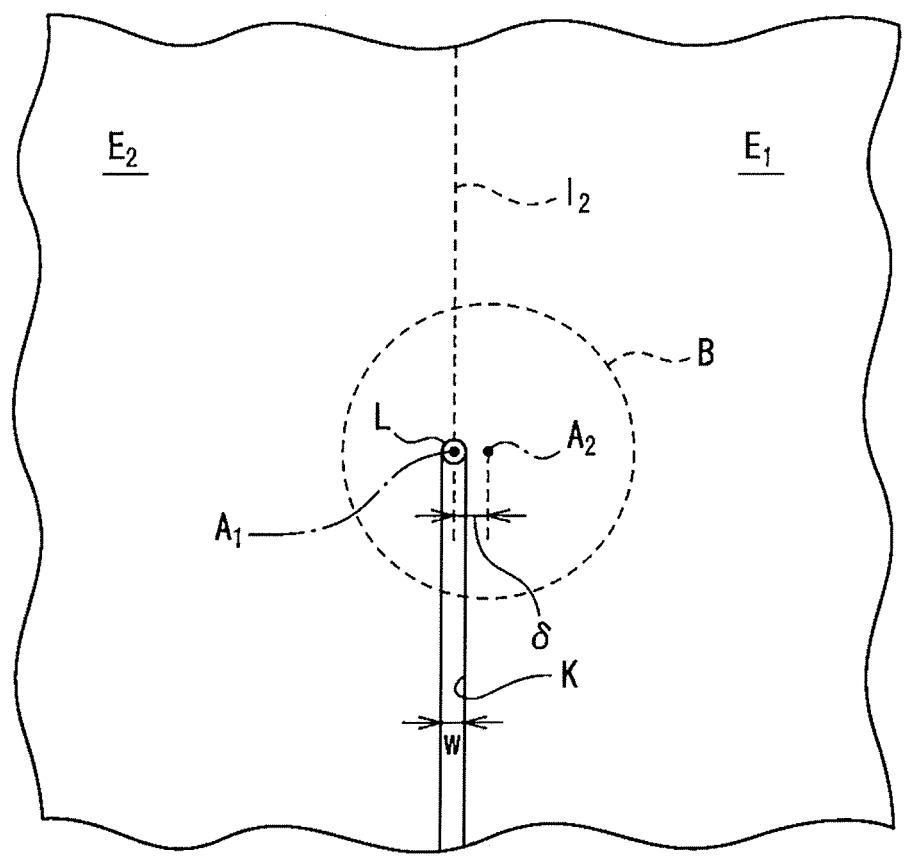
FIG. 15 illustrates a state in which a workpiece is cut while an assist gas and a laser beam being emitted non-coaxially.

For example, in an example illustrated in FIG. 15, the laser machine 10 cuts the workpiece W along the cutting line $l_2$ between the product region $E_1$ and the waste region $E_2$ by the laser beam L. In this example, the laser machine 10 maintains the center axis $A_2$ of the assist gas B to be shifted from the optical axis $A_1$ of the laser beam L toward the product region $E_1$ by a shift amount δ, during the cutting of the cutting line $l_2$.

When the center axis $A_2$ is shifted in this manner, the rate of the assist gas B blown onto the product region $E_1$ at the cutting point of the workpiece W may be greater than the rate of the assist gas B blown onto the waste region $E_2$. Accordingly, even when a supply pressure SP of the assist gas to the nozzle 30, which is defined as a machining condition, is set to be lower than a machining condition for when the assist gas B and the laser beam L are emitted coaxially (hereinafter, referred to as "normal operation"), it is possible to make a flow speed of the assist gas B blown onto the product region $E_1$ at the cutting spot to be sufficient.

As a result, even when the machining condition (e.g., the supply pressure SP) is set to be lower than that for the normal operation, a molten material of the workpiece W caused by the laser beam L may be blown off by the assist gas B blown onto the product region $E_1$ at a sufficient flow speed, whereby it is possible to make the dimension of the dross formed on a back surface (i.e., a surface on the lower side) of the product region $E_1$ to be a value which can satisfy the cutting quality requirement.

Figure 16:
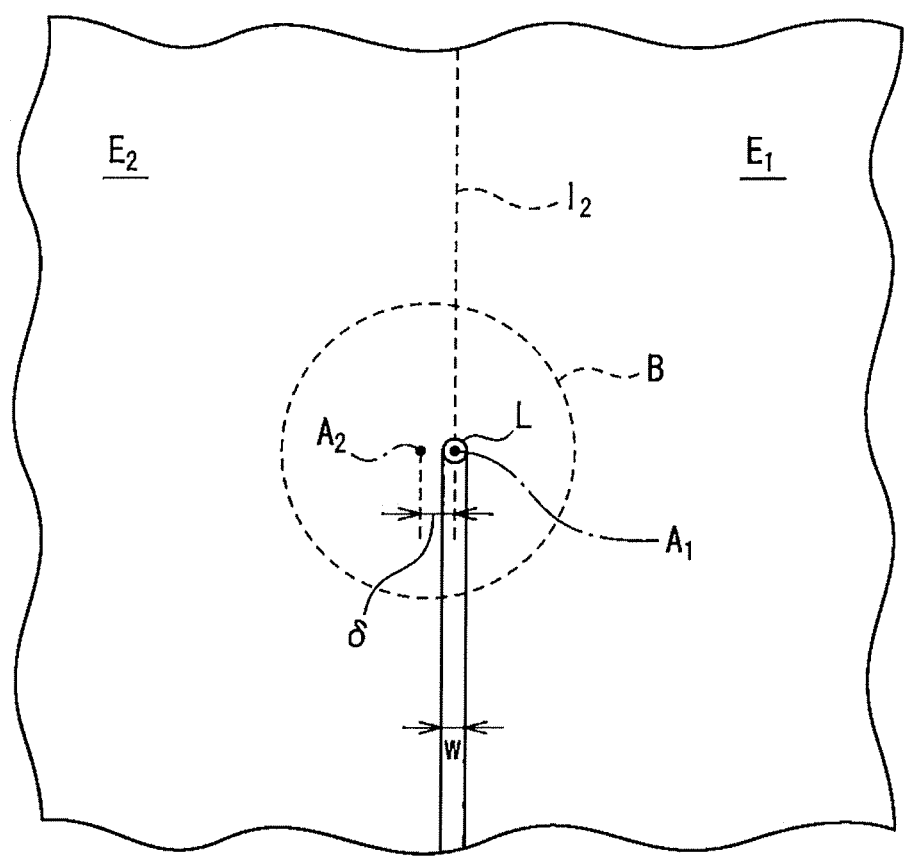
FIG. 16 also illustrates a state in which a workpiece is cut while an assist gas and a laser beam being emitted non-coaxially.

On the other hand, in an example illustrated in FIG. 16, the laser machine 10 maintains the center axis $A_2$ of the assist gas B to be shifted from the optical axis $A_1$ of the laser beam L toward the waste region $E_2$ by a shift amount δ during the cutting along the cutting line $l_2$ between the product region $E_1$ and the waste region $E_2$. The inventor of the present invention have discovered that the roughness of the cut surface when the workpiece is cut by the laser beam becomes larger (i.e., coarser) in some cases as the flow speed of the assist gas B blown onto the cutting spot is larger during the cutting. This suggests that the roughness of the cut surface may become smaller (smoother) as the flow speed of the assist gas B blown onto the cutting spot is smaller.

When the center axis $A_2$ of the assist gas B is shifted toward the waste region $E_2$ as illustrated in FIG. 16, the rate of the assist gas B blown onto the product region $E_1$ at the cutting spot becomes small, which may reduce the flow speed of the assist gas B blown onto the product region $E_1$ at the cutting spot. Accordingly, if the roughness of the cut surface of the product region $E_1$ is required to be small as the cutting quality requirement, it is possible to make the roughness of the cut surface of the product region $E_1$ to be a value satisfying the cutting quality requirement, by shifting the center axis $A_2$ toward the waste region $E_2$ as illustrated in FIG. 16.

The control of shifting the center axis $A_2$ from the optical axis $A_1$ toward the product region $E_1$ or the waste region $E_2$ as described above is also applicable to cutting along the cutting lines $l_3$, $l_4$, $l_5$, $l_6$ and $l_7$ between the product region $E_1$ and the waste region $E_2$. In this manner, the laser machine 10 maintains a state in which the center axis $A_2$ is shifted from the optical axis $A_1$ toward the product region $E_1$ or the waste region $E_2$ in response to the difference in the cutting quality requirements, during cutting along the cutting lines $l_2$, $l_3$, $l_4$, $l_5$, $l_6$ and $l_7$ between the product region $E_1$ and the waste region $E_2$.

Referring again to FIG. 1 and FIG. 2, in the present embodiment, the storage 15 stores a data table 70. In the data table 70, data of the machining conditions for cutting the workpiece W using the machining head 16, and shift amounts δ by which the center axis $A_2$ of the assist gas B is shifted from the optical axis $A_1$ of the laser beam L are stored in association with each other.

An example of the data table 70 is described in Table 1 below.

TABLE 1

Machining Condition

| Workpiece Material | Workpiece Thickness | Machining Speed | Nozzle Diameter | Supply Pressure | Focus Position | Output Characteristic Value | Shift Amount |
|---|---|---|---|---|---|---|---|
| Material 1 | $t_1$ | $v_1$ | $\phi_1$ | $SP_1$ | $z_1$ | $OP_1$ | $\delta_1$ |
| Material 2 | $t_2$ | $v_2$ | $\phi_2$ | $SP_2$ | $z_2$ | $OP_2$ | $\delta_2$ |
| Material 3 | $t_3$ | $v_3$ | $\phi_3$ | $SP_3$ | $z_3$ | $OP_3$ | $\delta_3$ |
| . | . | . | . | . | . | . | . |
| . | . | . | . | . | . | . | . |
| . | . | . | . | . | . | . | . |
| Material n | $t_n$ | $v_n$ | $\phi_n$ | $SP_n$ | $z_n$ | $OP_n$ | $\delta_n$ |

As illustrated in Table 1, in the data table 70, the machining condition data includes a material of the workpiece W to be machined, a thickness t of the workpiece W, a machining speed v at which the workpiece W is cut, a nozzle diameter $\phi$ of the machining head 16, a supply pressure SP of the assist gas, a focus position z of the laser beam, and an output characteristic value OP of the laser beam.

The material of the workpiece is e.g. stainless steel (SUS301, SUS304, etc.), nickel, copper, etc. The thickness t of the workpiece W is a thickness in the z-axis direction (or the direction of the optical axis $A_1$ of the laser beam L to be radiated) when the workpiece W is set on the work table 38. The machining speed v is a speed of the laser beam L relative to the workpiece W when cutting the workpiece W, and may be an average speed, a maximum speed, or a lowest speed. The nozzle diameter $\phi$ is a diameter (or radius) of the emission port 34 of the nozzle 30.

The supply pressure SP is a pressure of the assist gas supplied from the assist gas supply device 18 into the chamber 36 of the machining head 16. The focus position z of the laser beam L is a focus position of the laser beam L focused by the optical element (focus lens) 26, and is represented as a z-axis coordinate. The output characteristic value OP of the laser beam L includes e.g. laser power of the laser beam L or a laser power command value transmitted to the laser oscillator 14; or a frequency or a duty ratio when the laser oscillator 14 emits a PW (pulse oscillation) laser beam.

In the data table 70, the shift amounts $\delta$ are stored in association with the various machining conditions. Note that, two different data tables 70A and 70B may be prepared for a case in which the center axis $A_2$ is to be shifted from the optical axis $A_1$ toward the product region $E_1$ (e.g., a case in which the cutting quality requirement is a dimension of the dross), and for a case in which the center axis $A_2$ is to be shifted from the optical axis $A_1$ toward the waste region $E_2$ (e.g., when the cutting quality requirement is roughness of the cut surface), respectively.

The shift amounts $\delta$ stored in the data table 70 are obtained as optimal values able to satisfy the cutting quality requirement (dross dimension, cut surface roughness, etc.) of the product region $E_1$ when laser machining is performed under the corresponding machining conditions. The machining conditions and the shift amounts $\delta$ in the data table 70 may be obtained by an experimental (empirical rule) or a simulation technique, or by machine learning described later.

By referring to the data table 70, the optimal shift amount $\delta$, which is able to satisfy the cutting quality requirement under the corresponding machining conditions, can be uniquely determined, when the machining conditions are determined. For example, if an operator inputs, as the machining conditions, the material of the workpiece W as "material 2" and the thickness t thereof as "$t_2$", the processor 13 determines other machining conditions such that the machining speed v is "$v_2$", the nozzle diameter $\phi$ is "$\phi_2$", the supply pressure SP is "$SP_2$", the focus position z is "$z_2$" and the output characteristic value is "$OP_2$", and automatically determines the shift amount $\delta$ as "$\delta_2$".

Next, the details of the laser machining according to the present embodiment will be described. As a preparation process for the laser machining, for example, the processor 13 receives input of information on the cutting quality requirement. As the information on the cutting quality requirements, the operator inputs information such as the dimension of the dross or the roughness of the cut surface, and then the processor 13 determines, from the input information on the cutting quality requirements, the direction in which the center axis $A_2$ is to be shifted (i.e., the direction toward the product region $E_1$ or the direction toward the waste region $E_2$). Alternatively, the operator may directly input to the control device 12 the direction in which the axis $A_2$ is to be shifted.

Further, the processor 13 receives the machining condition (e.g., the material and the thickness t of the workpiece) from the operator. Then, the processor 13 determines the shift amount $\delta$ by applying the input machining condition to the data table 70 corresponding to the input cutting quality requirement (i.e., the direction in which the center axis $A_2$ is to be shifted). Hereinafter, a case is described in which the received cutting quality requirement is for the dross dimension, and the center axis $A_2$ of the assist gas B is to be shifted from the optical axis $A_1$ toward the product region $E_1$ during cutting between the product region $E_1$ and the waste region $E_2$.

The processor 13 of the control device 12 performs laser machining to cut the workpiece W, in accordance with the machining program 72 in which the determined machining condition and shift amount $\delta$ are defined. Specifically, the processor 13 operates the moving mechanism 20 to arrange the machining head 16 with respect to the workpiece W such that the optical axis $A_1$ of the laser beam L intersects the point $P_1$ (FIG. 13).

Subsequently, the processor 13 sends a command to the assist gas supply device 18 so as to start the supply of the assist gas to the nozzle 30, and also sends a command to the laser oscillator 14 so as to emit the laser beam from the laser oscillator 14. As a result, the laser beam L and the assist gas B are emitted from the emission port 34 of the nozzle 30, and piercing is performed on the point $P_1$ by the laser beam L, whereby a through hole is formed at the point $P_1$. When the piercing is performed, the moving device 22 arranges the laser beam L and the assist gas B coaxially with each other.

Next, the processor 13 operates the moving mechanism 20 to move the laser beam L forward with respect to the workpiece W, and cuts the workpiece W along the cutting line $l_1$ from the point $P_1$ to the point $P_2$. In the machining program 72, regions on both sides of the cutting line $l_1$ from the point $P_1$ to the point $P_2$ (third and fourth regions) are both specified as the waste region $E_2$. Accordingly, because the cutting quality requirements are not different in the regions on both sides of the cutting line $l_1$, the processor 13 maintains the laser beam L and the assist gas B in a coaxial state while cutting the workpiece W along the cutting line $l_1$.

When the laser beam L reaches the point $P_2$ (or immediately before reaching there), the processor 13 operates the moving device 22 so as to shift the center axis $A_2$ from the optical axis $A_1$ toward the product region $E_1$ in accordance with the shift amount $\delta$. As a result, the center axis $A_2$ of the assist gas B is shifted from the optical axis $A_1$ by the shift amount $\delta$ toward the product region $E_1$, as illustrated in FIG. 15.

Then, the processor 13 operates the moving mechanism 20 to linearly move the laser beam L forward with respect to the workpiece W while maintaining the center axis $A_2$ to be shifted from the optical axis $A_1$, and cuts the workpiece W by the laser beam L along the cutting line $l_2$ between the product region $E_1$ and the waste region $E_2$ from the point $P_2$ to the point $P_3$.

Next, the processor 13 moves the laser beam L in a curved manner in the right-forward direction with respect to the workpiece W, and cuts the workpiece W along the cutting line $l_3$ from the point $P_3$ to the point $P_4$. Next, the processor 13 linearly moves the laser beam L to the right with respect to the workpiece W from the point $P_4$ to the point $P_5$, and cuts the workpiece W along the cutting line $l_4$, and subsequently, moves the laser beam L linearly in the right-rear direction with respect to the workpiece W from the point $P_5$ to the point $P_6$, and cuts the workpiece W along the cutting line $l_5$.

Next, the processor 13 moves the laser beam L in a curved manner in the left-rear direction with respect to the workpiece W, and cuts the workpiece W along the cutting line $l_6$ from the point $P_6$ to the point $P_7$, and subsequently, moves the laser beam to the left with respect to the workpiece W from the point $P_7$ to the point $P_2$, and cuts the workpiece W along the cutting line $l_7$. As a result, the product region $E_1$ of the workpiece W is cut off from the waste region $E_2$.

The processor 13 maintains the state in which the center axis $A_2$ of the assist gas B is shifted from the optical axis $A_1$ toward the product region $E_1$ during the cutting along the cutting lines $l_2$, $l_3$, $l_4$, $l_5$, $l_6$ and $l_7$ between the product region $E_1$ and the waste region $E_2$. For example, the processor 13 controls the moving device 22 so as to shift the center axis $A_2$ toward the product region $E_1$ in a direction orthogonal to the machining direction (i.e., the direction in which the laser beam L moves relative to the workpiece W) and parallel to the x-y plane.

Note that, if the received cutting quality requirement is for the roughness of the cut surface, the processor 13 may control the moving device 22 so as to shift the center axis $A_2$ of the assist gas B from the optical axis $A_1$ toward the waste region $E_2$ during the cutting along the cutting lines $l_2$, $l_3$, $l_4$, $l_5$, $l_6$ and $l_7$ between the product region $E_1$ and the waste region $E_2$, in the present embodiment.

As discussed above, in the present embodiment, the control device 12 maintains the center axis $A_2$ to be shifted from the optical axis $A_1$ toward the product region $E_1$ or the waste region $E_2$ in response to the difference in the cutting quality requirements (dross dimension, or cut surface roughness), during the cutting along the cutting lines $l_2$, $l_3$, $l_4$, $l_5$, $l_6$ and $l_7$ between the product region $E_1$ and the waste region $E_2$. According to this configuration, if the product region $E_1$ and the waste region $E_2$ having different cutting quality requirements are specified on both sides of the cutting spot (kerf K) on the workpiece W, it is possible to effectively satisfy the cutting quality requirement of the product region $E_1$.

Further, in a case in which the cutting quality requirement is for the dross dimension for example, even when the supply pressure SP of the assist gas as the machining condition is set to be lower as described above, the flow speed of the assist gas B blown onto the product region $E_1$ at the cutting spot may be sufficient, and thus it is possible to make the dimension of the dross formed at the cutting spot of the product region $E_1$ to be a value that satisfies the cutting quality requirement. Therefore, it is possible to satisfy the cutting quality requirement of the product region $E_1$ along with setting the machining condition to be low.

Note that, in the embodiment described above, the laser beam L and the assist gas are coaxially emitted through the nozzle 30 while the control device 12 cuts the cutting line $l_1$. However, the control device 12 may shift the center axis $A_2$ from the optical axis $A_1$ toward the product region $E_1$ or the waste region $E_2$ at the time of piercing or immediately after the piercing, and may maintain the state in which the center axis $A_2$ is shifted from the optical axis $A_1$ during the cutting of the cutting line $l_1$.

Figure 17:
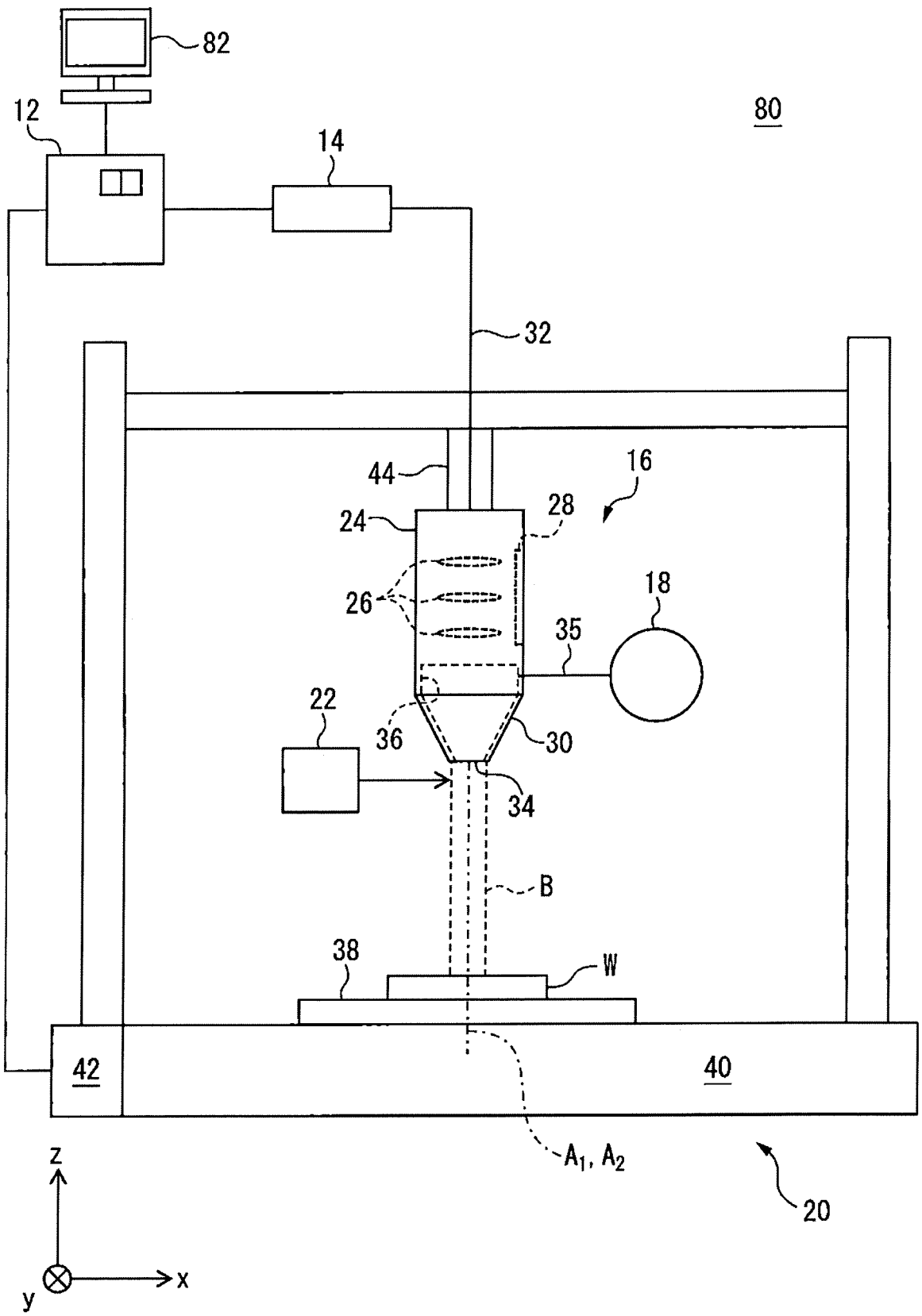
FIG. 17 is a diagram of a laser machine according to another embodiment.
Figure 18:
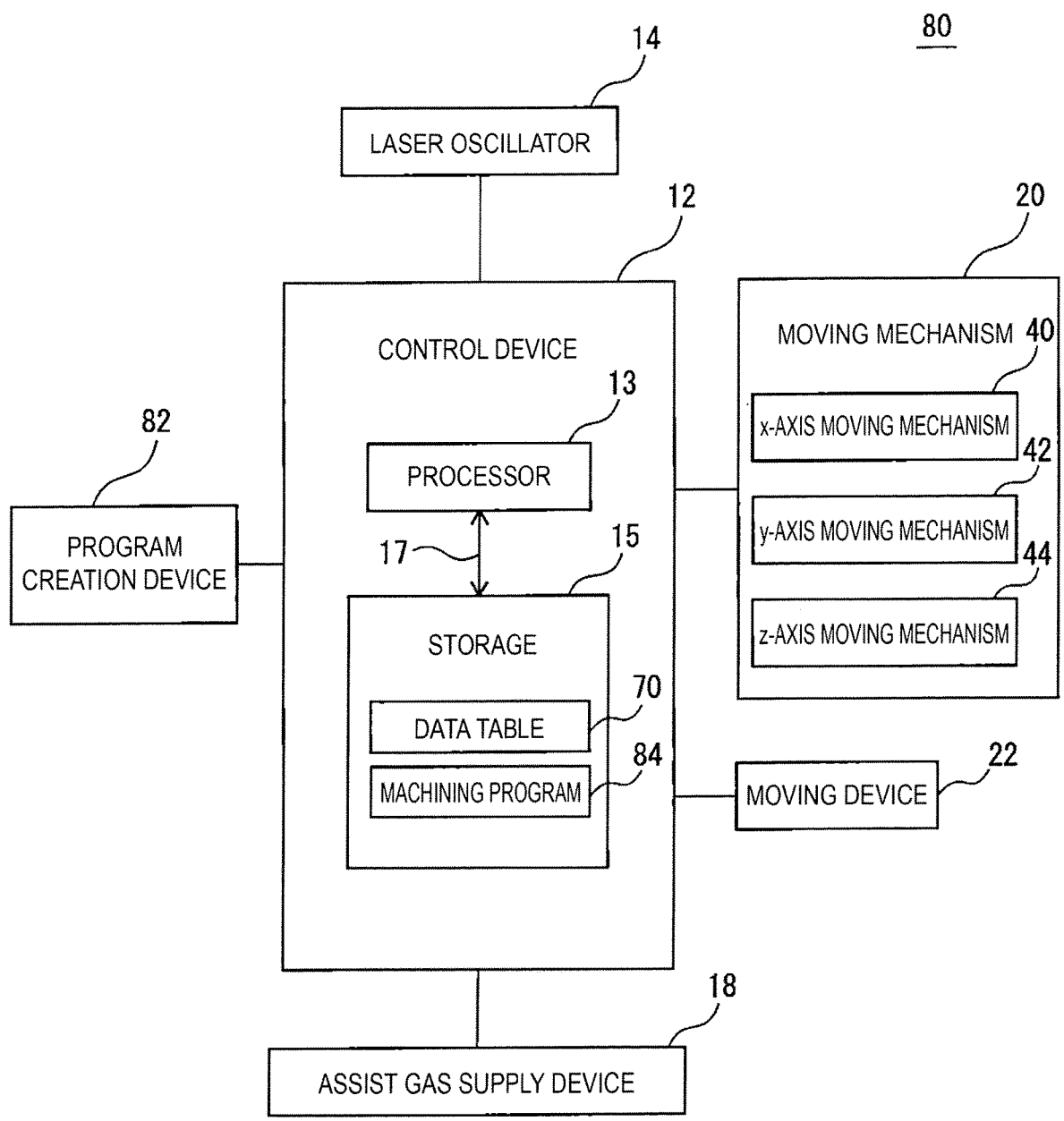
FIG. 18 is a block diagram of the laser machine illustrated in FIG. 17.

Next, a laser machine 80 according to another embodiment will be described with reference to FIG. 17 and FIG. 18. The laser machine 80 differs from the above-mentioned laser machine 10 in that the laser machine 80 further includes a program creation device 82. The program creation device 82 is e.g. a computer such as a CAD and CAM, and includes a processor, a storage, an input device (a keyboard, mouse, touch panel, etc.), and a display (an LCD, organic EL, etc. Not illustrated).

An operator manipulates the input device to create drawing data of a workpiece to be machined while viewing the display of the program creation device 82. Hereinafter, a case is described in which the operator creates drawing data of the workpiece W illustrated in FIG. 13 using the program creation device 82.

The operator manipulates the input device of the program creation device 82 to specify the cutting line l, the product region $E_1$, and the waste region $E_2$ based on image information of the workpiece W, while viewing an image of the created drawing data of the workpiece W. Based on image information of the cutting line l, product region $E_1$, and waste region $E_2$, which have been specified by the operator, the processor of the program creation device 82 automatically determines a machining speed v when cutting between the product region $E_1$ and the waste region $E_2$ along the cutting line l.

As an example, the processor of the program creation device 82 determines the machining speed v so as to change the machining speed v depending on a shape of the trajectory of the cutting line l. For example, if the cutting speeds v when cutting between the product region $E_1$ and the waste region $E_2$ along the cutting lines $l_1$, $l_2$, $l_3$, $l_4$, $l_5$, $l_6$ and $l_7$ are defined as cutting speeds $v_{11}$, $v_{12}$, $v_{13}$, $v_{14}$, $v_{15}$, $v_{16}$, and $v_{17}$, respectively, the cutting speeds $V_{11}$, $v_{12}$, $v_{14}$, $v_{15}$ and $v_{17}$ when cutting along the linear cutting lines $l_1$, $l_2$, $l_4$, $l_5$ and $l_7$ are set to a predetermined speed $v_H$.

On the other hand, the processor of the program creation device 82 sets the cutting speeds $v_{13}$ and $v_{16}$ when cutting along the curved cut lines $l_3$ and $l_6$ to a speed $v_L$ smaller than the speed $V_H$ (i.e., $v_L<v_H$). In this manner, the processor of the program creation device 82 sets the machining speed v so as to change the machining speed v in response to the trajectory-shape of the cutting line l.

Note that the cutting speeds $v_{11}$, $v_{12}$, $v_{14}$, $v_{15}$ and $v_{17}$ may be set to be greater than the cutting speeds $v_{13}$ and $v_{16}$, and to be different from each other. The cutting speeds $v_{13}$ and $v_{16}$ may also be set to be different from each another. Instead of manually specifying the cutting line l, the product region $E_1$ and the waste region $E_2$ by the operator, the processor of the program creation device 82 may automatically specify the cutting line l, the product region $E_1$, and the waste region $E_2$ based on the drawing data of the workpiece W created by the operator.

Next, the operator manipulates the input device of the program creation device 82 to input the data of respective machining conditions. Specifically, the operator inputs the material of the workpiece W, the thickness t of the workpiece W, the nozzle diameter ϕ of the machining head 16, the supply pressure SP of the assist gas, the focus position z of the laser beam, and the output characteristic value OP of the laser beam, among the above-discussed machining conditions.

On the other hand, the cutting speed v is determined in response to the cutting line 1. Subsequently, the operator manually sets the shift amount δ such that it changes in accordance with the determined machining speed v. At this time, the operator can select the shift amount δ suitable for the machining speed v, with reference to the data table 70 stored in the storage 15.

More specifically, the shift amount δ may be determined to be smaller as the machining speed v is larger. In this case, the shift amount δ when cutting between the product region $E_1$ and the waste region $E_2$ along the cutting lines $l_1$, $l_2$, $l_4$, $l_5$ and $l_7$ at the cutting speed $v_H$ is set to $δ_H$, while the shift amount δ when cutting between the product region $E_1$ and the waste region $E_2$ along the cutting lines $l_3$ and $l_6$ at the cutting speed $v_L$ may be set to $δ_L$ greater than $δ_H$ (i.e., $δ_L>δ_H$).

Instead of manually setting the shift amount δ by the operator, the processor of the program creation device 82 may automatically set the shift amounts $δ_H$ and $δ_L$ in accordance with the cutting speeds $v_H$ and $v_L$. In this case, the processor may refer to the data table 70 and read out the optimal shift amounts $δ_H$ and $δ_L$ from the data table 70 from the determined cutting speeds $v_H$ and $v_L$, and the data of the machining conditions other than the machining speed v.

In this way, a machining program 84 (FIG. 18) is created by the program creation device 82. In this machining program 84, the cutting line l, the product region $E_1$, and the waste region $E_2$ are specified on the workpiece W, and the material and thickness t of the workpiece W, the nozzle diameter ϕ, the supply pressure SP, the focus position z, and the output characteristic value OP of the laser beam L, as well as the machining speeds $v_H$ and $v_L$ determined in response to the cutting line l, are defined as the machining conditions. Furthermore, in the machining program 84, the shift amount δ that is set in accordance with the machining speeds $v_H$ and $v_L$ is also defined. The machining program 84 created by the program creation device 82 is stored in the storage 15 of the control device 12.

When the workpiece W is cut along the cutting line l in accordance with the machining program 84 as mentioned above, the processor 13 changes the positional relationship between the center axis $A_2$ of the assist gas B and the optical axis $A_1$ of the laser beam L in response to the machining speed v, during cutting between the product region $E_1$ and the waste region $E_2$ along the cutting line l.

Specifically, the processor 13 operates the moving device 22 so as to maintain the center axis $A_2$ to be shifted from the optical axis $A_1$ toward the product region $E_1$ (or the waste region $E_2$) by the shift amount $δ_H$ during cutting along the cutting lines $l_1$, $l_2$, $l_4$, $l_5$ and $l_7$, while changing the shift amount δ so as to maintain the center axis $A_2$ to be shifted from the optical axis $A_1$ toward the product region $E_1$ (or the waste region $E_2$) by the shift amount $δ_L$ ($>δ_H$) during cutting along the cutting lines $l_3$ and $l_6$.

Note that, when executing the machining program to cut the workpiece W, the processor 13 may acquire the machining speed v (i.e., movement speed of the laser beam L relative to the workpiece W) and control the shift amount δ by changing the positional relationship between the center axis $A_2$ and the optical axis $A_1$ in accordance with the acquired machining speed v.

The machining speed v can be obtained from the feedback transmitted from the servomotor of the moving mechanism 20 (e.g., a rotation speed transmitted from an encoder configured to detect the rotation speed of the servomotor). In this case, the encoder provided in the servomotor of the moving mechanism 20 constitutes a machining speed acquisition section configured to acquire, the machining speed v.

As an example, the processor 13 may control the shift amount δ to $δ_L$ if the machining speed v acquired during cutting of the workpiece is smaller than a first threshold value $v_{th1}$ (i.e., $v<v_{th1}$), while setting the shift amount δ to $δ_H$ ($<δ_L$) if the machining speed v is greater than the first threshold value $v_{th1}$ ($v≥v_{th1}$).

The processor 13 may set a total of "n" threshold values (n is an integer of 2 or greater) from the first threshold value $v_{th1}$ to an n-th threshold value $v_{th(n)}$ for the machining speed v, and control the shift amount δ in multiple stages depending on the magnitude of the machining speed v such that the shift amount δ is smaller as the machining speed v is larger. Moreover, the processor 13 may acquire acceleration instead of the machining speed v.

As described above, in the present embodiment, the operator or the program creation device 82 determines the machining speeds $v_H$ and $v_L$ based on the image information of the workpiece W, and the control device 12 changes the positional relationship between the center axis $A_2$ and the optical axis $A_1$ in response to the determined machining speeds $v_H$ and $v_L$ during cutting along the cutting line l.

If the workpiece W is cut at a higher machining speed v, a width w in the direction orthogonal to the machining direction of the kerf K formed between the product region $E_1$ and the waste region $E_2$ may be smaller than that in a case where the cutting is performed at a lower machining speed v. If the kerf-width w is small in this way, it is possible to satisfy the cutting quality requirement of the product region $E_1$ even when the shift amount δ of the center axis $A_2$ is set to be small. According to the present embodiment, since the positional relationship between the central axis $A_2$ and the optical axis $A_1$ is finely controlled in accordance with the machining speeds $v_H$ and $v_L$ during the laser machining, it is possible to more effectively satisfy the cutting quality requirement of the product region $E_1$.

In addition, in the present embodiment, the processor of the program creation device 82 automatically determines the machining speeds $v_H$ and $v_L$ based on the image information of the workpiece W. According to this configuration, it is possible to simplify the work for preparing the machining program 84. Further, in the present embodiment, if the processor of the program creation device 82 automatically sets the shift amounts $\delta_H$ and $\delta_L$ in accordance with the cutting speeds $v_H$ and $v_L$, the work for preparing the machining program 84 can be further simplified.

Figure 19:
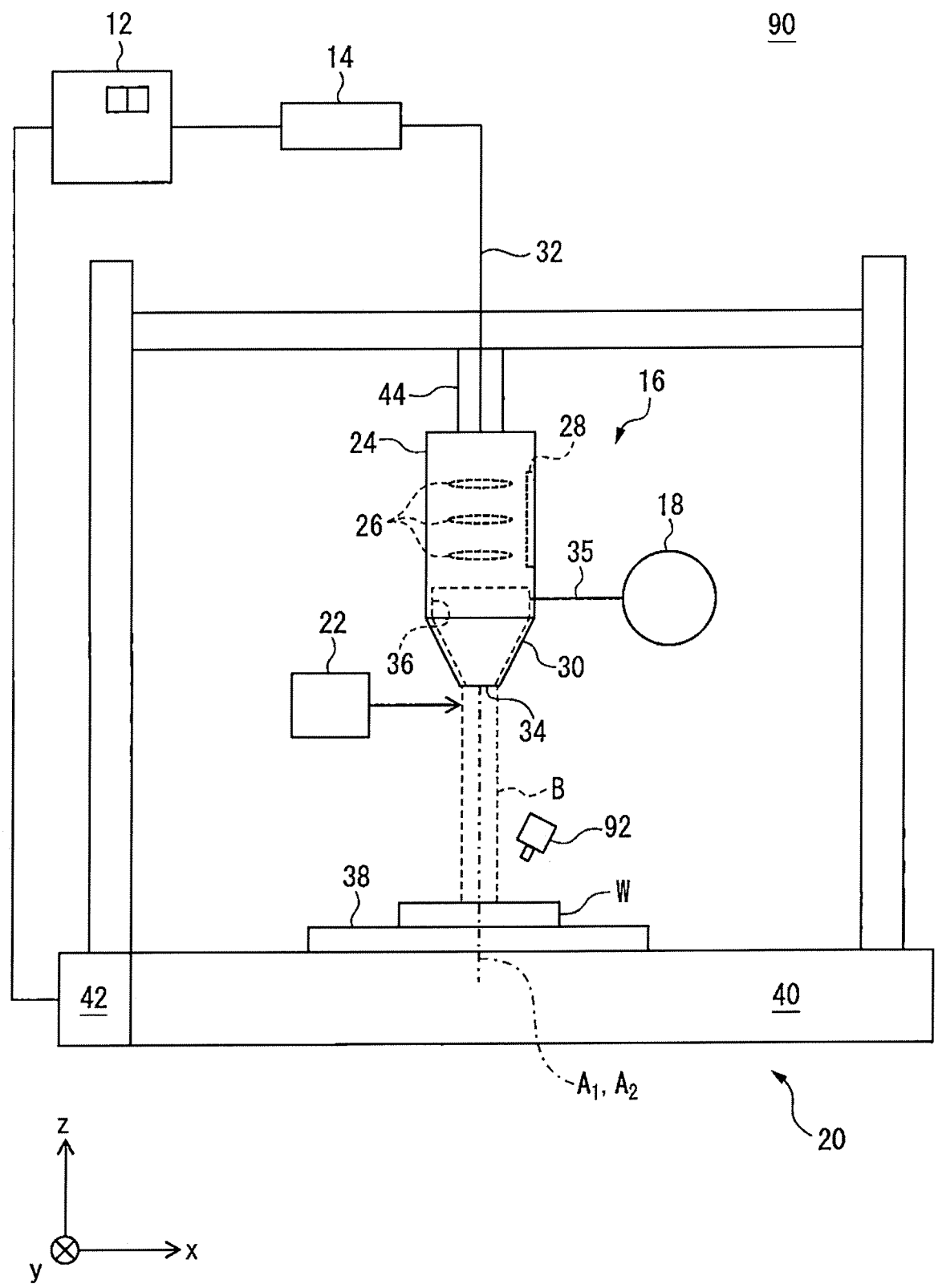
FIG. 19 is a diagram of a laser machine according to still another embodiment.
Figure 20:
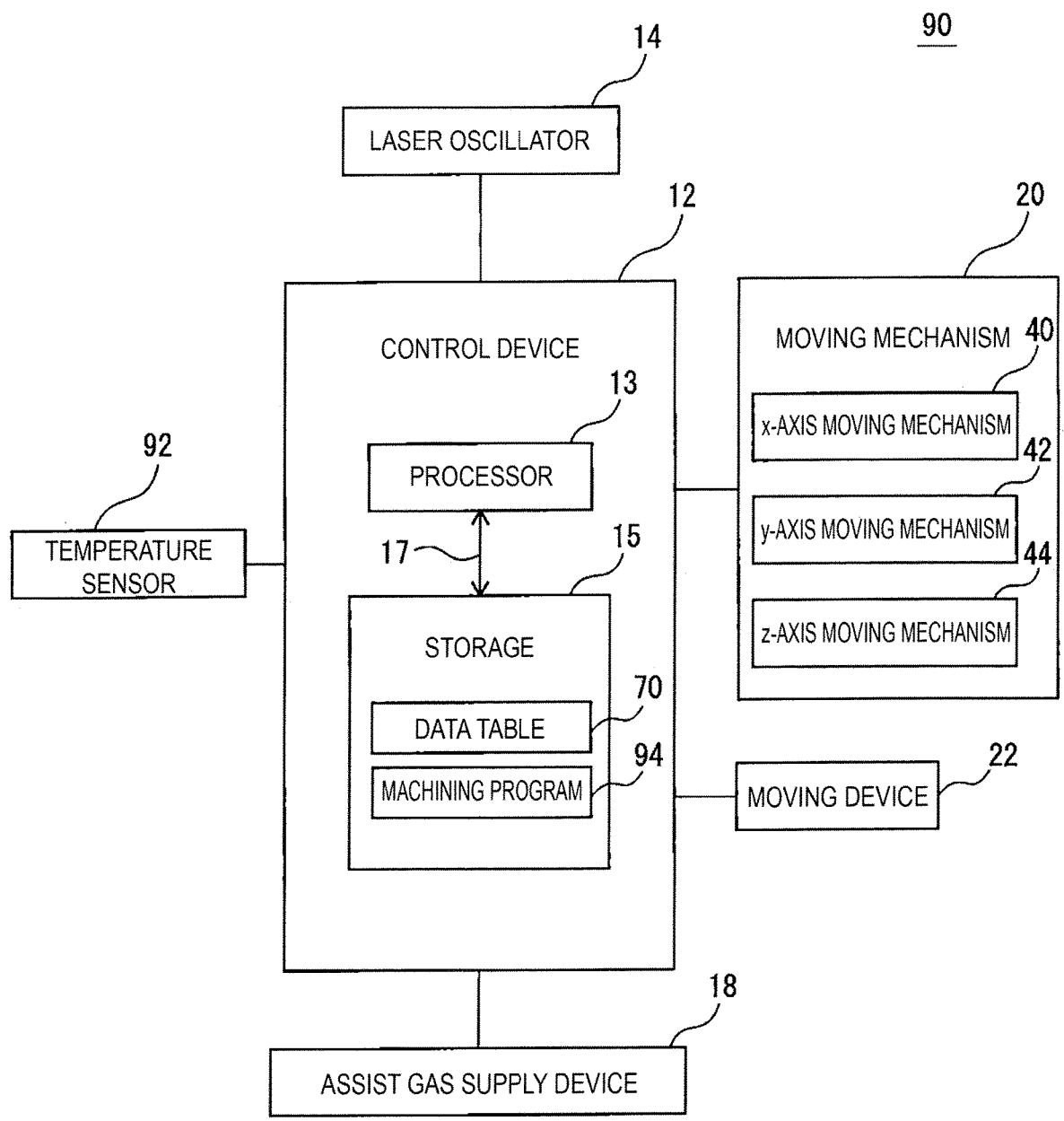
FIG. 20 is a block diagram of the laser machine illustrated in FIG. 19.

Next, a laser machine 90 according to still another embodiment will be described with reference to FIG. 19 and FIG. 20. The laser machine 90 differs from the above-described laser machine 10 in that the laser machine 90 further includes a temperature sensor 92. The temperature sensor 92 detects a temperature T of the workpiece W while the workpiece W is cut by the laser beam L. As an example, the temperature sensor 92 detects a temperature $T_1$ of a front surface (or upper surface) of the product region $E_1$ on one side of the formed kerf K, during the cutting of the workpiece W.

As another example, the temperature sensor 92 detects the temperature $T_1$ on the front surface of the product region $E_1$ on one side of the formed kerf K and the temperature $T_2$ on a front surface of the waste region $E_2$ on the other side of the kerf K, during the cutting of the workpiece W. In this case, one temperature sensor 92 may detect the temperatures $T_1$ and $T_2$ on both sides of the kerf K, or the temperature sensor 92 may include a first temperature sensor 92A configured to detect the temperature $T_1$ of the product region $E_1$ and a second temperature sensor 92B configured to detect the temperature $T_2$ of the waste region $E_2$.

The temperature sensor 92 detects the temperature T of the workpiece W at a position near an optical axis $A_1$ on rear side of the movement direction of the laser beam L relative to the workpiece W. In other words, the temperature sensor 92 detects the temperature T of the workpiece W on one side (or both sides) of the kerf K immediately after the formation of the kerf K by the laser beam L.

The control device 12 controls the moving device 22 so as to change the positional relationship between the 0 center axis $A_2$ of the assist gas and the optical axis $A_1$ of the laser beam L in response to the temperature T detected by the temperature sensor 92, during cutting between the product region $E_1$ and the waste region $E_2$ along the cutting line l. Such control is described below.

Since the temperature of the dross generated by laser machining is high, if the dross of a large dimension is generated on a rear surface of the product region $E_1$ or the waste region $E_2$, the heat of the dross is conducted from the rear surface to the front surface, whereby the temperature on the front surface increases compared to a case where no dross is generated. Thus, the temperature T of the product region $E_1$ and the waste region $E_2$ during laser machining is considered to correlate with the cutting quality (dross dimension).

In the present embodiment, the control device 12 changes the shift amount $\delta$ of the center axis $A_2$ from the optical axis $A_1$ in accordance with the temperature detected by the temperature sensor 92 during cutting the workpiece W along the cutting line l. Hereinafter, an operation flow of the laser machine 90 will be described with reference to FIG. 21.

Figure 21:
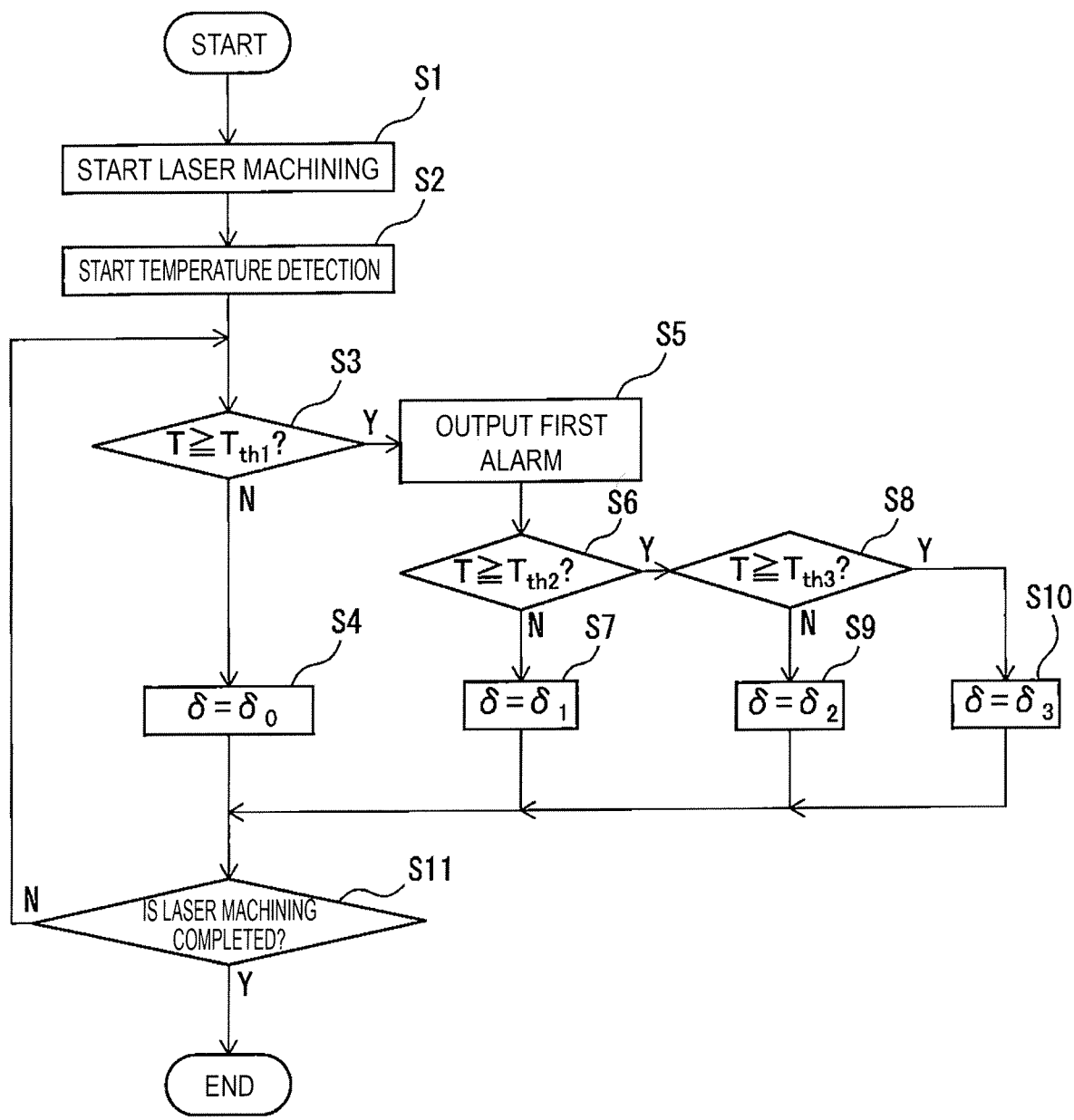
FIG. 21 is a flowchart illustrating an example of an operation flow of the laser machine illustrated in FIG. 19.

The processor 13 of the control device 12 carries out the flow illustrated in FIG. 21 in accordance with a machining program 94 stored in the storage 15. Accordingly, various commands for carrying out the flow illustrated in FIG. 21 are defined in the machining program 94. The flow illustrated in FIG. 21 is started when the processor 13 receives a laser-machining-start command from an operator, a host controller, or the machining program 94.

In step S1, the processor 13 starts laser machining. Specifically, similarly to the above-described embodiment, the processor 13 performs piercing by the laser beam L at the point $P_1$, and then controls the moving mechanism 20 so as to move the laser beam L relative to the workpiece W to cut the workpiece W between the product region $E_1$ and the waste region $E_2$ along the cutting lines $l_1, l_2, l_3, l_4, l_5, l_6$ and $l_7$. Upon the piercing and during cutting the waste region $E_2$ along the cutting line $l_1$, the processor 13 coaxially emits the assist gas B and the laser beam.

During cutting between the product region $E_1$ and the waste region $E_2$ along the cutting lines $l_2, l_3, l_4, l_5, l_6$ and $l_7$, the processor 13 operates the moving device 22 so as to maintain the center axis $A_2$ of the assist gas B to be shifted from the optical axis $A_1$ of the laser beam L toward the product region $E_1$. Here, the processor 13 shifts the center axis $A_2$ from the optical axis $A_1$ by an initial shift amount $\delta_0$ when the laser beam L reaches the point $P_2$ which is a starting point of the cutting line $l_2$.

This initial shift amount $\delta_0$ may be determined from the data table 70. For example, when the operator determines the machining conditions (e.g., the material and the thickness t of the workpiece W) prior to laser machining, the processor 13 may read out from the data table 70 the shift amount $\delta$ corresponding to the determined machining conditions, and determine it as the initial shift amount $\delta_0$.

In step S2, the processor 13 starts the detection of the temperature T by the temperature sensor 92. As an example, if the temperature sensor 92 detects, as the temperature T, the temperature $T_1$ on the front surface of the product region $E_1$, the processor 13 consecutively (e.g., periodically) acquires, from the temperature sensor 92, the temperature $T_1$ detected by the temperature sensor 92 during the cutting of the workpiece W.

As another example, if the temperature sensor 92 detects, as the temperature T, the temperature $T_1$ on the front surface of the product region $E_1$ and the temperature $T_2$ on the front surface of the waste region $E_2$, the processor 13 consecutively (e.g., periodically) acquires, from the temperature sensor 92, the temperatures $T_1$ and $T_2$ detected by the temperature sensor 92 during the cutting of the workpiece W by the laser beam L.

In step S3, the processor 13 determines whether or not the temperature T most-recently acquired from the temperature sensor 92 is equal to or greater than the first threshold value $T_{th1}$. As an example, if the temperature $T_1$ is acquired from the temperature sensor 92, the processor 13 determines whether or not the most-recently acquired temperature $T_1$ is equal to or greater than a first threshold value $T_{th1\_1}$ ($T_1 \geq T_{th1\_1}$). The first threshold $T_{th1\_1}$ is predetermined for the temperature $T_1$ and stored in the storage 15.

As another example, if the temperatures $T_1$ and $T_2$ are acquired from the temperature sensor 92, the processor 13 calculates a temperature difference $T_A$ between the most-recently acquired temperatures $T_1$ and $T_2$ (i.e., $T_A = T_1 - T_2$), and determines whether or not the temperature difference $T_A$ is equal to or greater than a first threshold value $T_{th1\_2}$ ($T_A \geq T_{th1\_2}$). The first threshold $T_{th1\_2}$ is predetermined for the temperature difference $T_A$ and stored in the storage 15.

Alternatively, the processor 13 calculates a temperature ratio $R_T$ of the temperature $T_1$ and the temperature $T_2$ that are most-recently acquired (i.e., $R_T = T_1/T_2$), and determines whether or not the temperature ratio $R_T$ is equal to or greater than a first threshold value $T_{th1\_3}$ ($R_T \geq T_{th1\_3}$). The first threshold $T_{th1\_3}$ is predetermined for the temperature ratio $R_T$ and stored in the storage 15.

In this regard, the temperature $T_1$ directly indicates the temperature on the front surface of the product region $E_1$, and the temperature difference $T_A$ and the temperature ratio $R_T$ indicate the temperature on the front surface of the product region $E_1$ as a relative value with respect to the temperature on the front surface of the waste region $E_2$. Accordingly, any of the temperatures $T_1$, $T_A$, and $R_T$ may be considered to correlate with cutting quality (dross dimension) of the product region $E_1$.

When the processor 13 determines that the temperature T ($T_1$, $T_A$, or $R_T$) is equal to or greater than the first threshold value $T_{th1}$ ($T_{th1\_1}$, $T_{th1\_2}$, or $T_{th1\_3}$) (i.e., determines YES), it proceeds to step S5. On the other hand, when the processor 13 determines that the temperature T is smaller than the first threshold value $T_{th1}$ (i.e., determines NO), it proceeds to step S4.

In step S4, the processor 13 controls the moving device 22 such that the shift amount δ of the center axis $A_2$ from the optical axis $A_1$ is equal to the initial shift amount $δ_0$. Due to this, the center axis $A_2$ is maintained to be shifted from the optical axis $A_1$ toward the product region $E_1$ by the initial shift amount $δ_0$.

In step S5, the processor 13 outputs a first alarm. For example, the processor 13 generates an audio or image signal indicative of "There is possibility that cutting quality requirement (dross dimension) of product region is not satisfied", and outputs it through a speaker or display (not illustrated) provided at the control device 12.

In step S6, the processor 13 determines whether or not the temperature T most-recently acquired from the temperature sensor 92 is equal to or greater than a second threshold value $T_{th2}$ ($>T_{th1}$). As an example, if the temperature $T_1$ is acquired from the temperature sensor 92, the processor 13 determines whether the most-recently acquired temperature $T_1$ is equal to or greater than a second threshold value $T_{th2\_1}$ (i.e., $T_1 \geq T_{th2\_1}$). The second threshold value $T_{th2\_1}$ is predetermined for the temperature $T_1$ as a value greater than the first threshold value $T_{th1\_1}$ (i.e., $T_{th2\_1} > T_{th1\_1}$), and is stored in the storage 15.

As another example, if the temperatures $T_1$ and $T_2$ are acquired from the temperature sensor 92, the processor 13 determines whether the most-recently calculated temperature difference $T_A$ ($=T_1-T_2$) is equal to or greater than a second threshold value $T_{th2\_2}$ ($T_A \geq T_{th2\_2}$). The second threshold value $T_{th2\_2}$ is predetermined for the temperature difference $T_A$ as a value greater than the first threshold value $T_{th1\_2}$ (i.e. $T_{th2\_2} > T_{th1\_2}$), and is stored in the storage 15.

Alternatively, the processor 13 determines whether the most-recently calculated temperature ratio $R_T$ is equal to or greater than a second threshold value $T_{th2\_3}$ ($R_T \geq T_{th2\_3}$). The second threshold value $T_{th2\_3}$ is predetermined for the temperature ratio $R_T$ as a value greater than the first threshold value $T_{th1\_3}$ (i.e., $T_{th2\_3} > T_{th1\_3}$) and is stored in the storage 15.

When the processor 13 determines that the temperature T ($T_1$, $T_A$, or $R_T$) is equal to or greater than the second threshold value $T_{th2}$ ($T_{th2\_1}$, $T_{th2\_2}$, or $T_{th2\_3}$) (i.e., determines YES), it proceeds to step S8. On the other hand, when the processor 13 determines that the temperature T is smaller than the second threshold value $T_{th2}$ (i.e., determines NO), it proceeds to step S4.

In step S7, the processor 13 controls the moving device 22 such that the shift amount δ of the center axis $A_2$ from the optical axis $A_1$ is equal to a first shift amount $δ_1$. The first shift amount $δ_1$ is predetermined as a value greater than the initial shift amount $δ_0$ (i.e., $δ_1 > δ_0$). Due to this, the center axis $A_2$ is maintained to be shifted from the optical axis $A_1$ toward the product region $E_1$ by the first shift amount $δ_1$.

In step S8, the processor 13 determines whether or not the temperature T most-recently acquired from the temperature sensor 92 is equal to or greater than a third threshold value $T_{th3}$ ($>T_{th2}$). As an example, if the temperature $T_1$ is acquired from the temperature sensor 92, the processor 13 determines whether the most-recently acquired temperature $T_1$ is equal to or greater than a third threshold value $T_{th3\_1}$ (i.e., $T_1 \geq T_{th3\_1}$). The third threshold value $T_{th3\_1}$ is predetermined for the temperature $T_1$ as a value greater than the second threshold value $T_{th2\_1}$ (i.e., $T_{th3\_1} > T_{th2\_1}$) and is stored in the storage 15.

As another example, if the temperatures $T_1$ and $T_2$ are acquired from the temperature sensor 92, the processor 13 determines whether the most-recently calculated temperature difference $T_A$ ($=T_1-T_2$) is equal to or greater than a third threshold value $T_{th3\_2}$ (i.e., $T_A \geq T_{th3\_2}$). The third threshold value $T_{th3\_2}$ is predetermined for the temperature difference $T_A$ as a value greater than the second threshold value $T_{th2\_2}$ (i.e., $T_{th3\_2} > T_{th2\_2}$), and is stored in the storage 15.

Alternatively, the processor 13 determines whether the most-recently calculated temperature ratio $R_T$ is equal to or greater than a third threshold value $T_{th3\_3}$ (i.e., $R_T \geq T_{th3\_3}$). The third threshold value $T_{th3\_3}$ is predetermined for the temperature ratio $R_T$ as a value greater than the second threshold value $T_{th2\_3}$ (i.e., $T_{th3\_3} > T_{th3\_3}$), and is stored in the storage 15.

When the processor 13 determines that the temperature T ($T_1$, $T_A$, or $R_T$) is equal to or greater than the third threshold value $T_{th3}$ ($T_{th3\_1}$, $T_{th3\_2}$, or $T_{th3\_3}$) (i.e., determines YES), it proceeds to step S10. On the other hand, when the processor 13 determines that the temperature T is smaller than the third threshold value $T_{th3}$ (i.e., determines NO), it proceeds to step S9.

In step S9, the processor 13 controls the moving device 22 such that the shift amount δ of the center axis $A_2$ from the optical axis $A_1$ is equal to a second shift amount $δ_2$. The second shift amount $δ_2$ is predetermined as a value greater than the first shift amount $δ_1$ (i.e., $δ_2 > δ_1$). Due to this, the center axis $A_2$ is maintained to be shifted from the optical axis $A_1$ toward the product region $E_1$ by the second shift amount $δ_2$.

On the other hand, when it is determined YES in step S8, in step S10, the processor 13 controls the moving device 22 such that the shift amount δ of the center axis $A_2$ from the optical axis $A_1$ is equal to a third shift amount $δ_3$. The third shift amount $δ_3$ is predetermined as a value greater than the second shift amount $δ_2$ (i.e., $δ_3 > δ_2$).

Due to this, the center axis $A_2$ is maintained to be shifted from the optical axis $A_1$ toward the product region $E_1$ by the third shift amount $δ_3$. The first shift amount $δ_1$, the second shift amount $δ_2$, and the third shift amount $δ_3$ described above may be obtained as parameters correlated with the temperature T and cutting quality (dross dimension), using e.g. an experimental or simulation technique.

An additional data table, in which the first shift amount $δ_3$, second shift amount $δ_2$ and third shift amount $δ_3$; and the temperature T ($T_{i1}$, $T_A$, $R_T$) are stored in association with each other, may be created to be separate from the data table 70 (or to be incorporated in the data table 70), and the processor 13 may refer to the additional data table to determine the shift amount δ in response to the detected temperature T.

In step S11, the processor 13 determines whether the laser machining is completed. For example, the processor 13 determines whether the laser beam L reaches the point $P_2$ which is an end point of the cutting line $l_7$, from a command included in the machining program 94 or from the feedback of the servomotors of the moving mechanism 20. The processor 13 determines YES when the laser beam L reaches the point $P_2$ of the cutting line $l_7$, and ends the flow illustrated in FIG. 21. On the other hand, the processor 13 determines NO when the laser beam L does not reach the point $P_2$ of the cutting line $l_7$, and returns to step S3.

As discussed above, in the present embodiment, the processor 13 changes the positional relationship between the center axis $A_2$ and the optical axis $A_1$ in response to the temperature T ($T_1$, $T_A$, $R_T$) correlated with the cutting quality (dross dimension) of the product region $E_1$, during cutting along the cutting lines $l_2$, $l_3$, $l_4$, $l_5$, $l_6$ and $l_7$ between the product region $E_1$ and the waste region $E_2$.

More specifically, the processor 13 changes the shift amount $\delta$ in response to the magnitude of the temperature T, so as to be the initial shift amount $\delta_0$ if $T<T_{th1}$ is satisfied, to be the first shift amount $\delta_1$ if $T_{th1} \leq T < T_{th2}$ is satisfied, to be the second shift amount $\delta_2$ if $T_{th2} \leq T < T_{th3}$ is satisfied, and to be the third shift amount $\delta_3$ if $T_{th3} \leq T$ is satisfied.

According to this configuration, the shift amount $\delta$ of the center axis $A_2$ toward the product region $E_1$ can be greater as the probability that the dimension of the dross generated on the product region $E_1$ gets large is greater (i.e., the temperature T is higher), whereby it is possible to increase the rate of the assist gas B blown onto the product region $E_1$. As a result, the dimension of the dross generated on the product region $E_1$ can be reduced by controlling the shift amount $\delta$.

Further, since the above-described temperature difference $T_A$ and temperature ratio $R_T$ relatively indicate the temperature on the front surface of the product region $E_1$ as comparison with the temperature on the front surface of the waste region $E_2$, even when the temperature of the product region $E_1$ gets significantly high by the laser beam L, the influence of the temperature rise by the laser beam L can be eliminated, and the dimension of the dross formed at the product region $E_1$ can be precisely and quantitatively evaluated by the temperature difference $T_A$ and the temperature ratio $R_T$.

In the present embodiment, the processor 13 maintains the state in which the center axis $A_2$ is shifted from the optical axis $A_1$ toward the product region $E_1$ during laser machining. However, the processor 13 may maintain a state in which the center axis $A_2$ is shifted from the optical axis $A_1$ toward the waste region $E_2$ during laser machining. Depending on the machining condition (e.g., supply pressure SP), the flow speed of the assist gas in the kerf K may increase to reduce the dross dimension when the center axis $A_2$ is shifted toward the waste region $E_2$.

Figure 22:
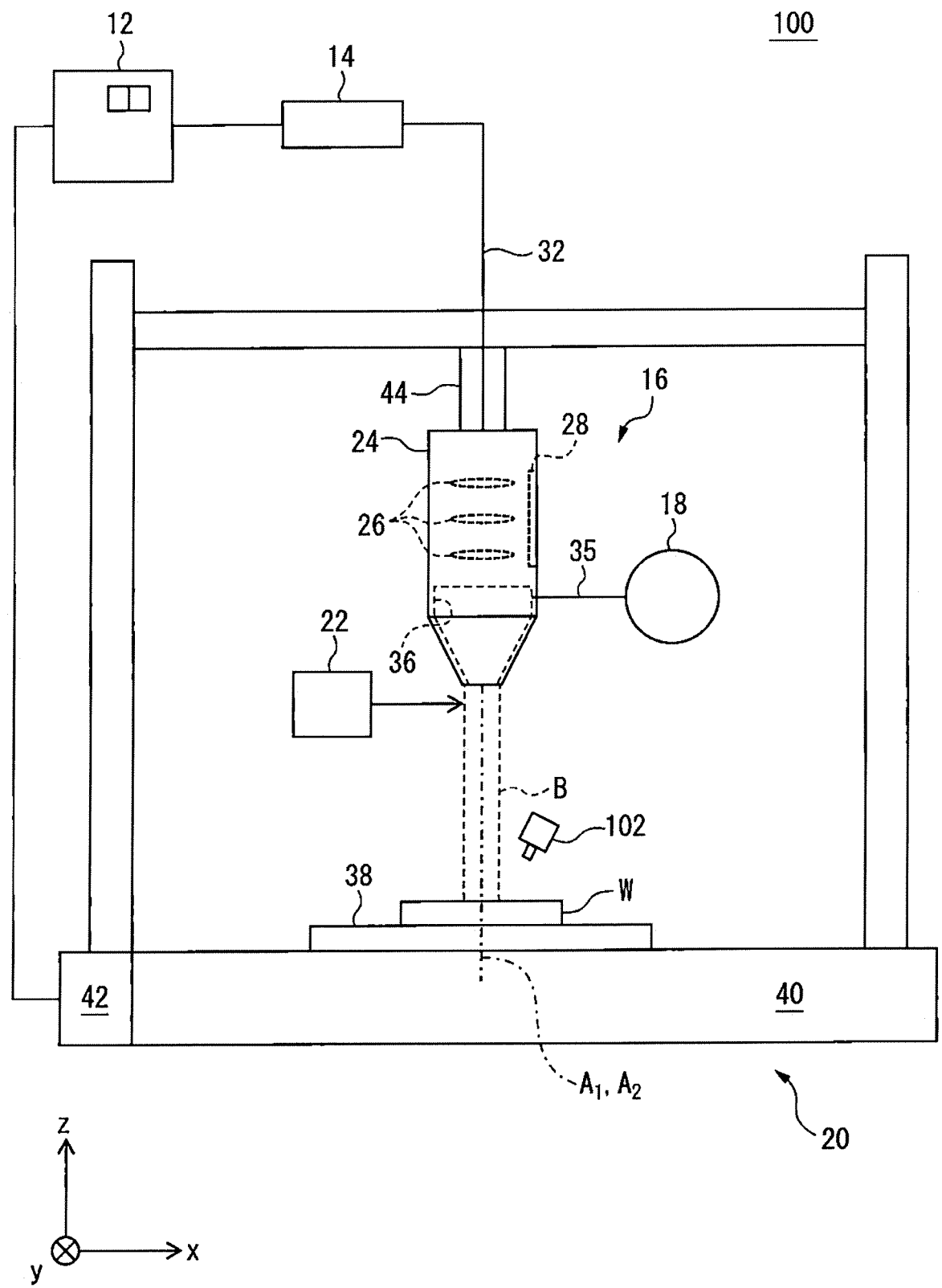
FIG. 22 is a diagram of a laser machine according to yet another embodiment.
Figure 23:
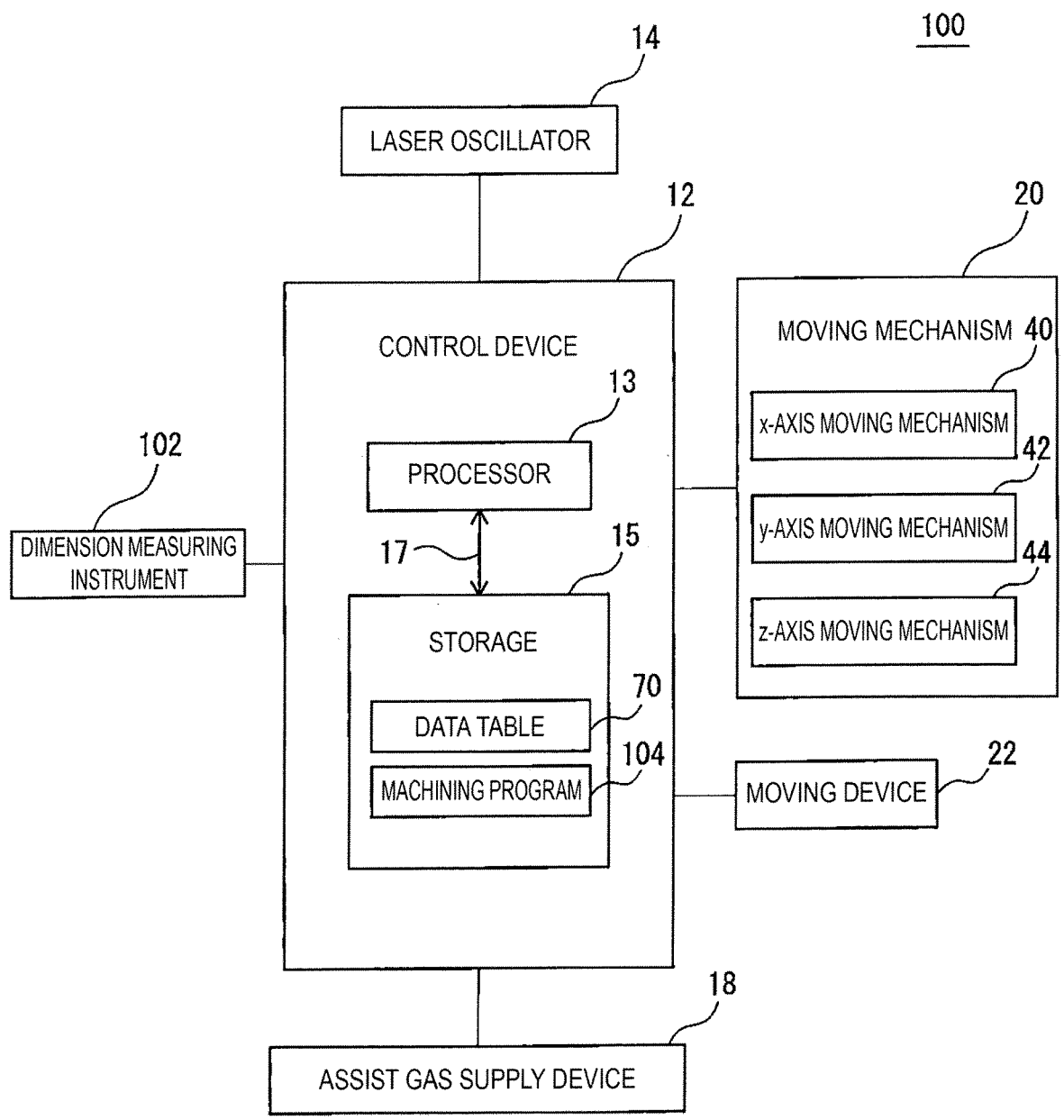
FIG. 23 is a block diagram of the laser machine illustrated in FIG. 22.

Next, a laser machine 100 according to still another embodiment will be described with reference to FIG. 22 and FIG. 23. The laser machine 100 differs from the above-described laser machine 10 in that the laser machine 100 further includes a dimension measuring instrument 102. The dimension measuring instrument 102 includes e.g. an optical displacement meter, a camera, or a vision sensor, and measures the width w of the kerf K formed between the product region $E_1$ and the waste region $E_2$ during cutting the workpiece W by the laser beam L.

The control device 12 changes the positional relationship between the center axis $A_2$ of the assist gas and the optical axis $A_1$ of the laser beam L in response to the kerf-width w measured by the dimension measuring instrument 102, during cutting between the product region $E_1$ and the waste region $E_2$ along the cutting line 1. In this regard, if the kerf-width w is small, even when the shift amount $\delta$ of the center axis $A_2$ from the optical axis $A_1$ is reduced, it is possible to satisfy the cutting quality requirement (dross dimension, cut surface roughness, etc.) of the product region $E_1$.

Accordingly, in the present embodiment, the control device 12 changes the shift amount $\delta$ of the center axis $A_2$ from the optical axis $A_1$ in response to the kerf-width w measured by the dimension measuring instrument 102, during cutting between the product region $E_1$ and the waste region $E_2$ along the cutting line 1. Below, an operation flow of the laser machine 100 will be described with reference to FIG. 24. Note that, in FIG. 24, processes similar as those in the flow illustrated in FIG. 21 is assigned the same step numbers, and redundant descriptions thereof will be omitted.

Figure 24:
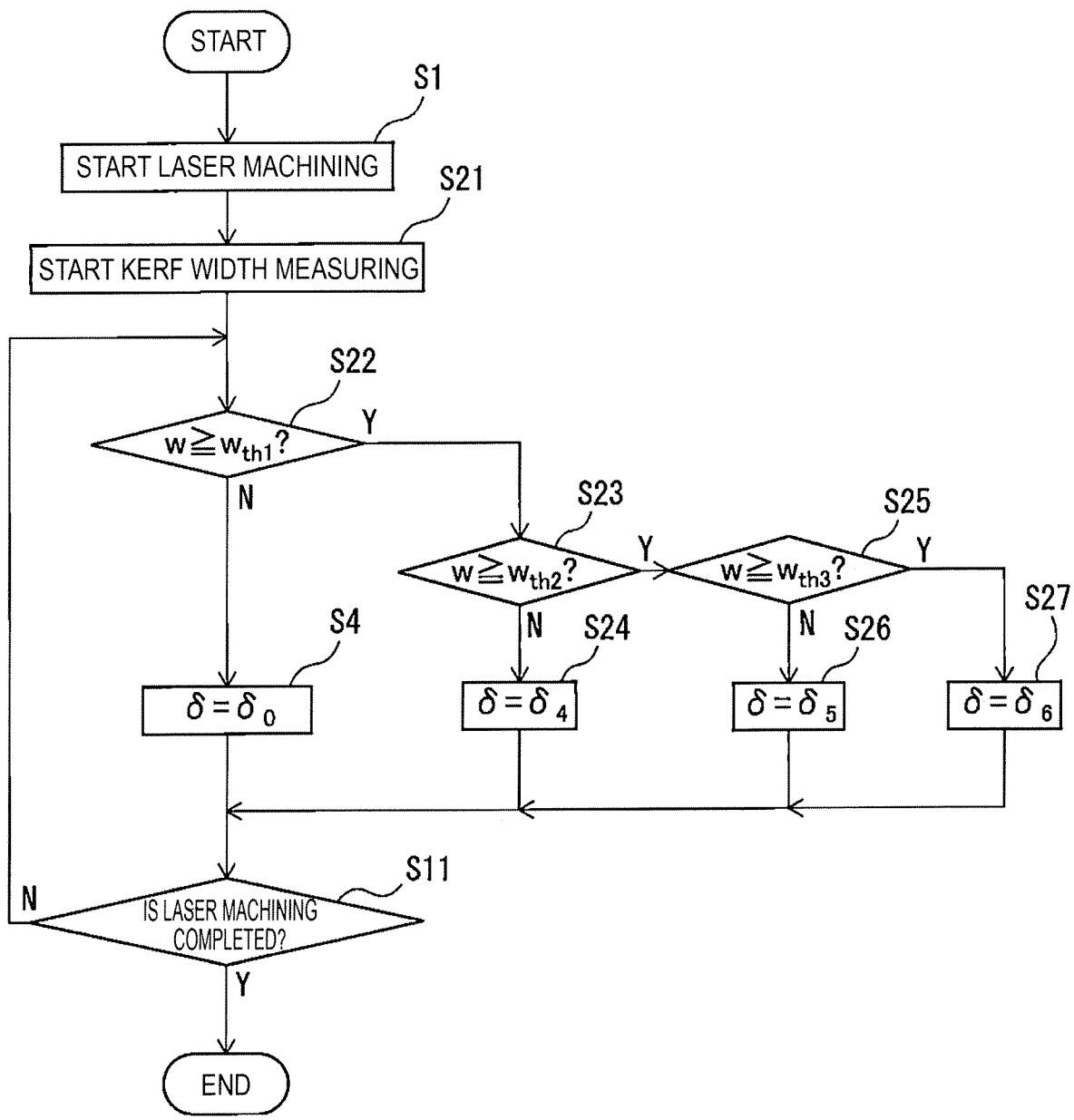
FIG. 24 is a flowchart illustrating an example of an operation flow of the laser machine illustrated in FIG. 22.

The processor 13 of the control device 12 carries out the flow illustrated in FIG. 24 in accordance with a machining program 104 stored in the storage 15. Accordingly, various commands for carrying out the flow illustrated in FIG. 24 are defined in the machining program 104. The flow illustrated in FIG. 24 is started when the processor 13 receives a laser-machining-start command from an operator, a host controller, or the machining program 104.

In step S1, the processor 13 starts laser machining, and shifts the center axis $A_2$ of the assist gas B from the optical axis $A_1$ of the laser beam L toward the product region $E_1$ (or the waste region $E_2$) by the initial shift amount $\delta_0$ when the laser beam L reaches the point $P_2$ which is the starting point of the cutting line $l_2$.

In step S21, the processor 13 starts measurement of the kerf-width w by the dimension measuring instrument 102. Specifically, the processor 13 consecutively (e.g., periodically) acquires from the dimension measuring instrument 102 the kerf-width w measured by the dimension measuring instrument 102 during cutting the workpiece W.

In step S22, the processor 13 determines whether or not the kerf-width w most-recently acquired from the dimension measuring instrument 102 is equal to or greater than a first threshold value $w_{th1}$. The first threshold value $w_{th1}$ is predetermined for the kerf-width w, and is stored in the storage 15. When the processor 13 determines that the kerf-width w is equal to or greater than the first threshold value $w_{th1}$ (i.e., determines YES), it proceeds to step S23. On the other hand, when the processor 13 determines that the kerf-width w is smaller than the first threshold value $w_{th1}$ (i.e., determines NO), it proceeds to step S4.

In step S23, the processor 13 determines whether or not the kerf-width w most-recently acquired from the dimension measuring instrument 102 is equal to or greater than a second threshold value $w_{th2}$. The second threshold value $w_{th2}$ is predetermined for the kerf-width w as a value greater than the first threshold value $w_{th1}$ (i.e., $w_{th2} > w_{th1}$), and is stored in the storage 15. When the processor 13 determines that the kerf-width w is equal to or greater than the second threshold value $w_{th2}$ (i.e., determines YES), it proceeds to step S25. On the other hand, when the processor 13 determines that the kerf-width w is smaller than the second threshold value $w_{th2}$ (i.e., determines NO), it proceeds to step S24.

In step S24, the processor 13 controls the moving device 22 such that the shift amount $\delta$ of the center axis $A_2$ from the optical axis $A_1$ is equal to a first shift amount $\delta_4$. The first shift amount $\delta_4$ is predetermined as a value greater than the initial shift amount $\delta_0$ (i.e. $\delta_4 > \delta_0$). Due to this, the center axis $A_2$ is maintained to be shifted from the optical axis $A_1$ toward the product region $E_1$ (or the waste region $E_1$) by the first shift amount $\delta_4$.

In step S25, the processor 13 determines whether or not the kerf-width w most-recently acquired from the dimension measuring instrument 102 is equal to or greater than a third threshold value $w_{th3}$. The third threshold value $w_{th3}$ is predetermined for the kerf-width w as a value greater than the second threshold value $w_{th2}$ (i.e., $w_{th3} > w_{th2}$), and is stored in the storage 15. When the processor 13 determines that the kerf-width w is equal to or greater than the third threshold value $w_{th3}$ (i.e., determines YES), it proceeds to step S27. On the other hand, when the processor 13 determines that the kerf-width w is smaller than the third threshold value $w_{th3}$ (i.e., determines NO), it proceeds to step S26.

In step S26, the processor 13 controls the moving device 22 such that the shift amount δ of the center axis $A_2$ from the optical axis $A_1$ is equal to a second shift amount $δ_5$. The second shift amount $δ_5$ is predetermined as a value greater than the first shift amount $δ_4$ (i.e., $δ_5>δ_4$). Due to this, the center axis $A_2$ is maintained to be shifted from the optical axis $A_1$ toward the product region $E_1$ (or the waste region $E_1$) by the second shift amount $δ_5$.

When it is determined YES in step S25, in step S27, the processor 13 controls the moving device 22 such that the shift amount δ of the center axis $A_2$ from the optical axis $A_1$ is equal to a third shift amount $δ_6$. The third shift amount $δ_6$ is predetermined as a value greater than the second shift amount $δ_5$ (i.e., $δ_6>δ_5$).

Due to this, the center axis $A_2$ is maintained to be shifted from the optical axis $A_1$ toward the product region $E_1$ (or the waste region $E_1$) by the third shift amount $δ_6$. The first shift amount $δ_4$, the second shift amount $δ_5$, and the third shift amount $δ_6$ described above may be obtained as parameters correlated with the kerf-width w and the cutting quality (dross dimension, cut surface roughness, etc.), by e.g. an experimental or simulation technique.

Further, an additional data table, in which the first shift amount $δ_4$, second shift amount $δ_5$ and third shift amount $δ_6$; and the kerf-width w are stored in association with each other, may be created to be separate from the data table 70 (or to be incorporated in the data table 70), and the processor 13 may refer to the additional data table to determine the shift amount δ in response to the measured kerf-width w.

As discussed above, in the present embodiment, the processor 13 changes the positional relationship between the center axis $A_2$ and the optical axis $A_1$ in response to the kerf-width w during cutting along the cutting lines $l_2$, $l_3$, $l_4$, $l_5$, $l_6$ and $l_7$ between the product region $E_1$ and the waste region $E_2$. More specifically, the processor 13 changes the shift amount δ in response to the magnitude of the kerf-width w, so as to be the initial shift amount $δ_0$ if $w<w_{th1}$ is satisfied, to be the first shift amount $δ_4$ if $w_{th1}≤w<w_{th2}$ is satisfied, to be the second shift amount $δ_5$ if $w_{th2}≤w<w_{th3}$ is satisfied, and to be the third shift amount $δ_6$ if $w_{th3}<w$ is satisfied.

As the kerf-width w gets larger, it may be necessary to increase the shift amount δ of the center axis $A_2$ in order to increase the rate of the assist gas B blown onto the cutting spot of the product region $E_1$. According to the present embodiment, the positional relationship between the center axis $A_2$ and the optical axis $A_1$ is changed in response to the kerf-width w, whereby it is possible to finely adjust the rate of the assist gas B blown onto the product region $E_1$. As a result, the cutting quality requirement (dross dimension) of the product region $E_1$ can be more effectively satisfied.

In the above laser machines 80, 90, and 100, the processor 13 determines the shift amount δ, by which the center axis $A_2$ is shifted from the optical axis $A_1$, in response to the machining speed v, the temperature T, and the kerf-width w. However, the processor 13 may determine the shift amount δ in response to a requirement to be achieved in the cutting process of the workpiece W.

As an example, the operator selects a high-speed cutting, a high-precision cutting, or a gas-saving cutting, as the requirement to be achieved. If the requirement of the high-speed cutting is selected, the processor 13 performs laser machining in a high-speed mode in which the machining speed v is controlled to be faster than that in the normal machining condition defined in the data table 70. For example, the processor 13 sets the shift amount δ to be smaller than the normal shift amount defined in the data table 70 when performing the laser machining in the high-speed mode.

If the requirement of the high-precision cutting is selected, the processor 13 sets the machining speed v to be slower than that in the normal machining condition defined in the data table 70, and performs the laser machining in a high-precision mode in which the processor 13 controls the moving mechanism 20 precisely such that the laser beam L accurately passes on the cutting line 1. For example, the processor 13 sets the shift amount δ to be larger than the normal shift amount defined in the data table 70 when performing the laser machining in the high-precision mode.

If the requirement of the gas-saving cutting is selected, the processor 13 performs the laser machining in a gas-saving mode in which the supply pressure SP is set to be lower than that in the normal machining condition defined in the data table 70. For example, the processor 13 sets the shift amount δ to be larger than the normal shift amount defined in the data table 70 when performing the laser machining in the gas-saving mode. In this manner, by determining the shift amount δ in response to the requirement to be achieved in the cutting process of the workpiece W, it is possible to effectively satisfy the cutting quality requirement of the product region E1, as well as the above-mentioned requirement to be achieved.

Figure 25:
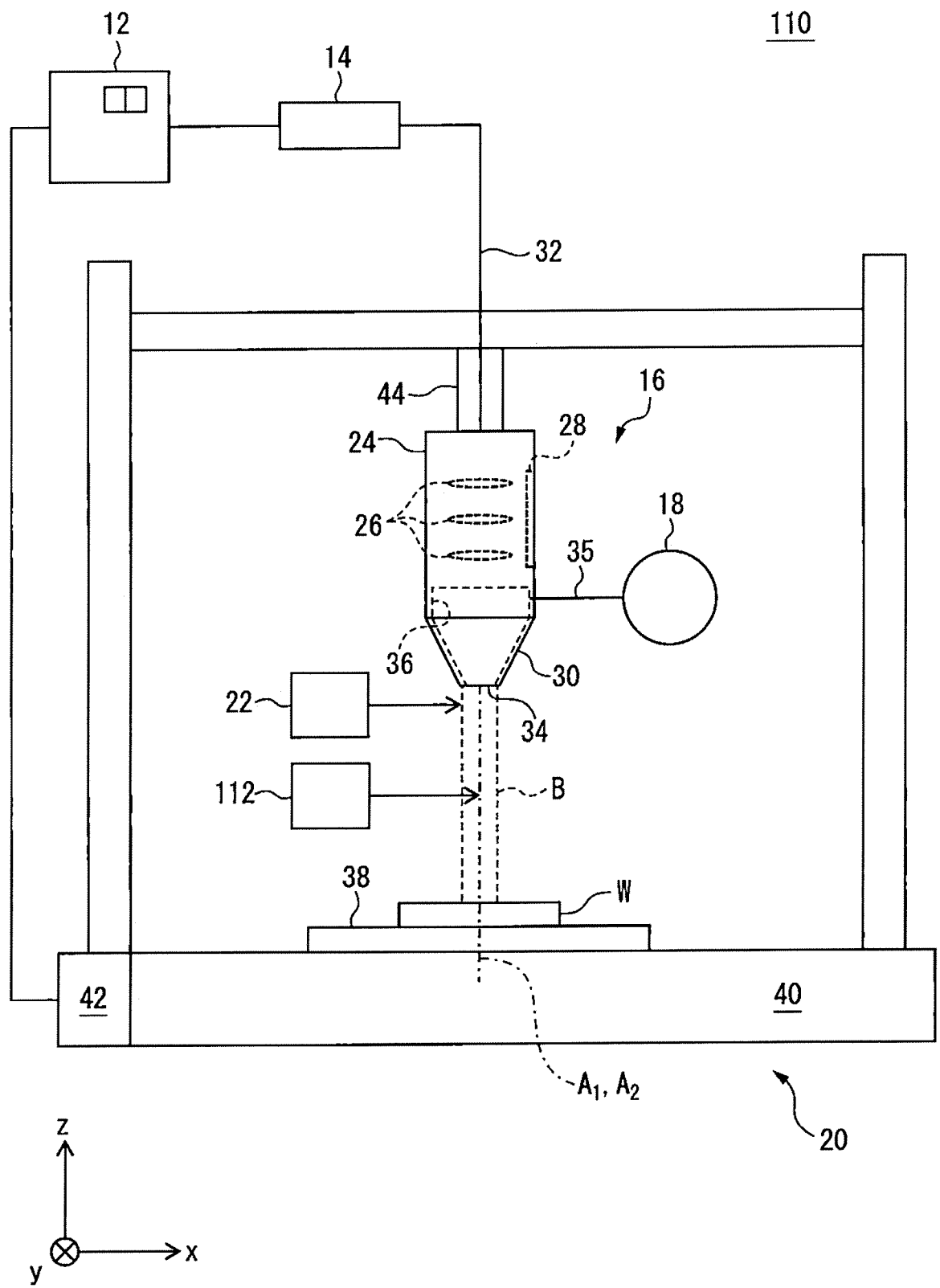
FIG. 25 is a diagram of a laser machine according to further another embodiment.
Figure 26:
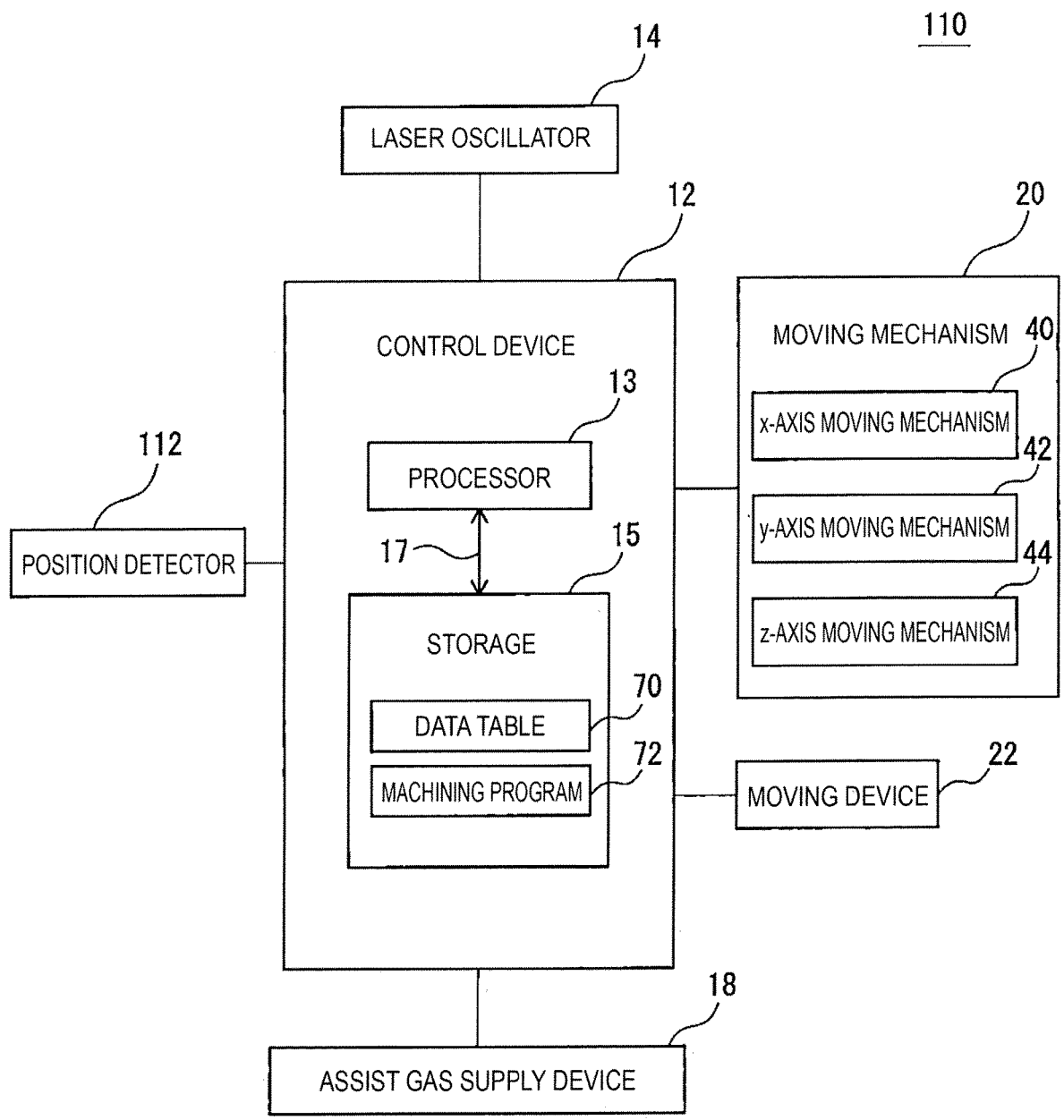
FIG. 26 is a block diagram of the laser machine illustrated in FIG. 25.

Next, a laser machine 110 according to still another embodiment will be described with reference to FIG. 25 and FIG. 26. The laser machine 110 differs from the above-described laser machine 10 in that the laser machine 110 further includes a position detector 112. The position detector 112 checks the positional relationship between the optical axis $A_1$ of the laser beam L and the center axis $A_2$ of the assist gas B emitted through the nozzle 30, before or during laser machining.

As an example, the position detector 112 includes e.g. a camera, a vision sensor, or a beam profiler (e.g., of a knife-edge type), and is disposed on the optical axis $A_1$ of the laser beam L. In this case, the position detector 112 directly detects the laser beam L emitted through the nozzle 30, and also detects the center point of the emission port 34 of the nozzle 30. The position detector 112 can detect the positional relationship between the optical axis $A_1$ and the center axis $A_2$ (e.g., coordinates of the x-y plane) based on the detected data of the laser beam L and the exit port center point.

For example, the position detector 112 detects the positional relationship between the optical axis $A_1$ and the central axis $A_2$ when the moving device 22 shifts the state of the optical axis $A_1$ and the center axis $A_2$ from the coaxial arrangement to the non-coaxial arrangement, in response to a predetermined command value from the control device 12, prior to laser machining. Using the data of the thus-detected positional relationship, an operator can calibrate correlation between the command value from the control device 12 and the shift amount δ. As a result, the processor 13 can operate the moving device 22 so as to precisely shift the center axis $A_2$ from the optical axis $A_1$ in the target direction by the target shift amount δ, during the laser machining.

As another example, if the moving device 22 includes the servomotor, the position detector 112 includes an encoder configured to detect the rotation angle of the servomotor of the moving device 22. The rotation angle of the servomotor is information indicating the positional relationship between the optical axis $A_1$ and the center axis $A_2$ (coordinates of the x-y plane). The processor 13 of the control device 12 may acquire the rotation angle from the position detector 112, and check the positional relationship between the optical axis $A_1$ and the center axis $A_2$ from the acquired rotation angle. In this example, the position detector 112 can detect the positional relationship between the optical axis $A_1$ and the center axis $A_2$ during the laser machining.

For example, if the position detector 112 including the encoder is applied to the above-described laser machine 80, 90, or 110, the processor 13 may check the position of the center axis $A_2$ relative to the optical axis $A_1$ based on the rotation angle acquired from the position detector 112, when changing the positional relationship between the center axis $A_2$ and the optical axis $A_1$ in response to the machining speed v, the temperature T, or the kerf-width w. Thus, during the laser machining, the processor 13 can accurately control the shift amount δ of the center axis $A_2$ in response to the machining speed v, the temperature T, or the kerf-width w, along with checking the position of the center axis $A_2$ relative to the optical axis $A_1$.

Next, a machine learning apparatus 120 according to an embodiment will be described with reference to FIG. 27. The machine learning apparatus 120 is for learning the shift amount δ when the laser beam L and the assist gas B emitted through the nozzle 30 are shifted from a coaxial state to a non-coaxial state. The machine learning apparatus 120 may be constituted of a computer including a processor and a storage, or software such as a learning algorithm. For example, the machine-learning apparatus 120 may be used to create the data table 70 described above.

Figure 28:
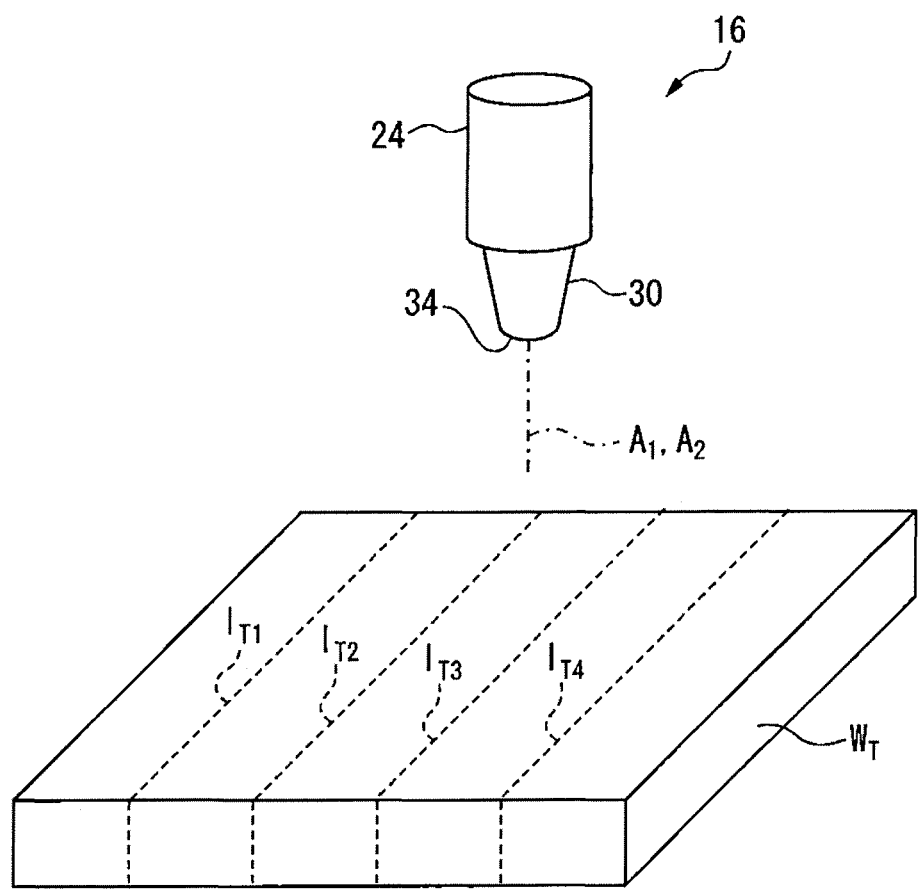
FIG. 28 is a diagram for explaining trial laser machining with respect to a trial workpiece.

In order to learn the shift amount δ, in the present embodiment, the laser machine 10 repeatedly performs trial laser machining to cut a trial workpiece $W_T$ in accordance with a trial machining program 121. An example of the trial work $W_T$ is illustrated in FIG. 28. The workpiece $W_T$ is a rectangular flat plate member. In the trial machining program 121, a plurality of cutting lines $l_{T1}, l_{T2}, l_{T3}$, and $l_{T4}$ are specified on the workpiece $W_T$.

In the trial laser machining, the laser machine 10 sequentially cuts the workpiece $W_T$ forward from a rear end to a front end along the cutting lines $l_{T1}, l_{T2}, l_{T3}$, and $l_{T4}$ in accordance with the trial machining program 121, under optionally set machining conditions (a material and a thickness t of the workpiece W, a machining speed v, a nozzle diameter φ, a supply pressure SP, a focus position z, and an output characteristic value OP of the laser beam L).

During the cutting of the cutting lines $l_{T1}, l_{T2}, l_{T3}$ and $l_{T4}$, the laser machine 10 emits the laser beam L and the assist gas B through the nozzle 30, and maintains the center axis $A_2$ of the assist gas B to be shifted from the optical axis $A_1$ of the laser beam L in an optional direction by an optional shift amount δ. The laser machine 10 randomly changes the shift amount δ and the shift direction of the center axis $A_2$ every time one cutting line $l_{T1}, l_{T2}, l_{T3}$ or $l_{T4}$ is cut. The trial laser machining as discussed above is repeatedly performed on a plurality of workpieces $W_T$.

Figure 29:
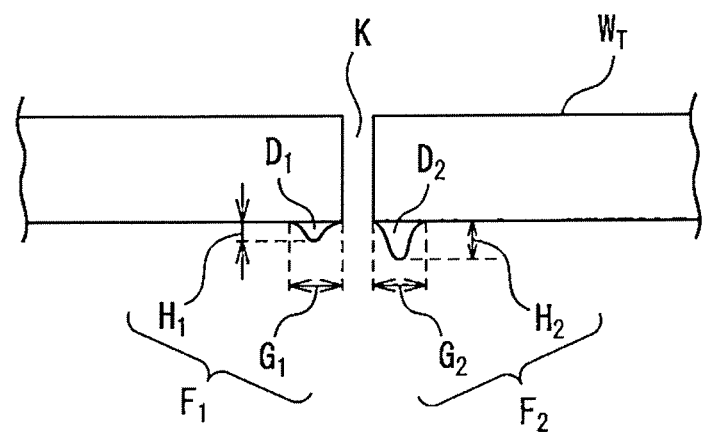
FIG. 29 illustrates an aspect of dross generated in a workpiece by trial laser machining.

After cutting the workpiece $W_T$ along one cutting line $l_{T1}, l_{T2}, l_{T3}$ or $l_{T4}$, a measuring section 125 measures the dimension of the dross generated at a cutting spot of the workpiece $W_T$. FIG. 29 illustrates an example of the dross generated on a rear surface of the workpiece $W_T$, as a result of the trial laser machining. In the example illustrated in FIG. 29, as a result of the trial laser machining, the kerf K is formed at the cutting spot of the workpiece $W_T$, wherein the dross $D_1$ is generated on the left side of the kerf K, while the dross $D_2$ is generated on the right side of the kerf K.

A dimension $F_1$ of the dross $D_1$ includes e.g. a height $H_1$ of the dross $D_1$ in the z-axis direction, or an area (maximum occupancy area) $G_1$ in the x-y plane of the dross $D_1$. Similarly, a dimension $F_2$ of the dross $D_2$ includes e.g. a height $H_2$ of the dross $D_2$ in the z-axis direction, or an area (maximum occupancy area) $G_2$ in the x-y plane of the dross $D_2$. The measuring section 125 includes e.g. a dimension measurement gauge, a camera, or a vision sensor, and measures the dimensions $F_1$ and $F_2$ of the dross $D_1$ and $D_2$, respectively.

Figure 27:
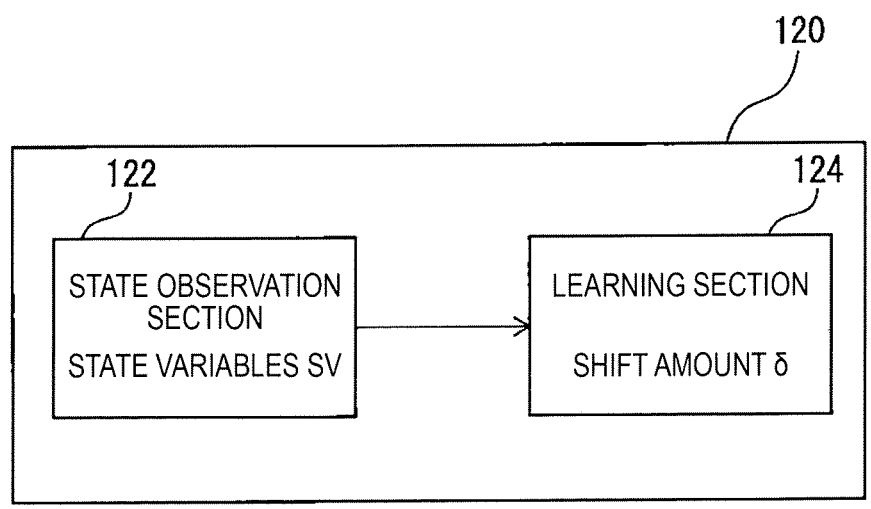
FIG. 27 is a block diagram of a machine learning apparatus according to an embodiment.

As illustrated in FIG. 27, the machine learning apparatus 120 includes a state-observation section 122 and a learning section 124. The state-observation section 122 observes machining condition data included in the machining program 121 given to the laser machine 10 for performing the trial laser machining, and measurement data of the dimension $F_1, F_2$ of the dross $D_1, D_2$ generated when the machining program 121 is executed, as a state variable SV representing the current state of the environment in which the workpiece $W_T$ is cut.

The measurement data includes the individual dimensions $F_1$ and $F_2$ of the dross $D_1$ and $D_2$ on both sides of the cutting spot (or the kerf K) of the workpiece $W_T$, or a dimension difference $\Delta F$ ($=|F_2-F_1|$) between the dross $D_1$ and $D_2$. The machining condition data includes e.g. at least one of the material and thickness t of the workpiece $W_T$, the machining speed v, the nozzle diameter φ, the supply pressure SP, the focus position z, and the output characteristic value OP of the laser beam L. The learning section 124 learns the shift amount δ in association with the cutting quality of the workpiece $W_T$, using the state variables SV (i.e., the machining condition data, and the measurement data $F_1, F_2, \Delta F$)$^s$. In the present embodiment, the cutting quality is the dross dimension.

The learning section 124 learns the shift amount δ of the center axis $A_2$ from the optical axis $A_1$ in accordance with any learning algorithm generally referred to as machine learning. The learning section 124 is able to iteratively perform learning based on a data set including the state variables SV obtained by repeatedly performing the trial laser machining.

By repeating such a learning cycle, the learning section 124 is able to automatically identify a feature implying a correlation between the cutting quality (dross dimension=measurement data $F_1, F_2, \Delta F$) and the shift amount δ. At the beginning of the learning algorithm, the correlation between the shift amount δ and the measurement data $F_1, F_2, \Delta F$ is substantially unknown, however, as the learning is advanced, the learning section 124 gradually identifies the feature and consequently interprets the correlation.

When the correlation between the shift amount δ and the measurement data $F_1, F_2, \Delta F$ is interpreted to a level reliable to some extent, learning results iteratively outputted by the learning section 124 can be used to select an action (i.e., decision-making) of how much the center axis $A_2$ should be shifted to meet the cutting quality requirement when the workpiece $W_T$ of the current state is cut.

That is, as the learning algorithm is advanced, the learning section 124 is able to make the shift amount δ to gradually approach an optimal solution, wherein the shift amount δ represents the correlation between the current state of the workpiece $W_T$ and the action of how much the center axis $A_2$ should be shifted to meet the cutting quality requirement when the workpiece $W_T$ of the current state is cut. The cutting quality requirement in this case is that any one of the dimensions $F_1$ and $F_2$ becomes zero (or a value close to zero), for example.

As described above, in the machine learning apparatus 120, the learning section 124 learns the shift amount δ of the center axis $A_2$ from the optical axis $A_1$ in accordance with the machine learning algorithm, using the state variables SV (the machining condition data, and the dimensions $F_1$ and $F_2$) observed by the state-observation section 122. According to the machine learning apparatus 120, by using the learning result of the learning section 124, it is possible to automatically and accurately obtain the shift amount δ.

When the shift amount δ can be automatically obtained, it is possible to quickly determine the shift amount δ necessary for satisfying the cutting quality requirement from the machining condition data. Accordingly, the work for determining the shift amount δ under various machining conditions can be significantly simplified. In addition, since the shift amount δ is learned based on a vast data set, the optimal shift amount δ for satisfying the cutting quality requirement (dross dimension) can be acquired with high precision.

In the machine learning apparatus 120, the learning algorithm executed by the learning section 124 is not limited, and any learning algorithm known as machine learning, such as supervised learning, unsupervised learning, reinforcement learning, or a neural network, may be employed.

Figure 30:
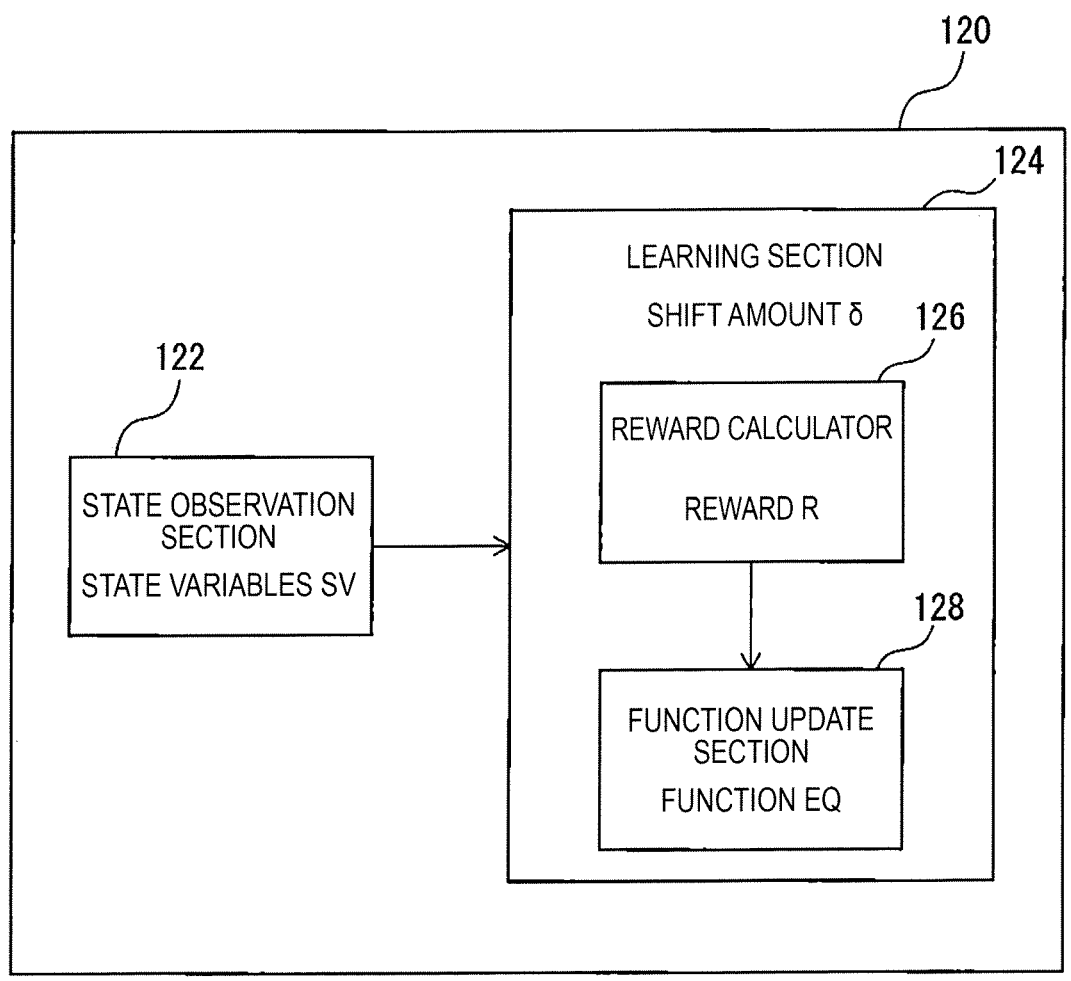
FIG. 30 is a block diagram of a machine learning apparatus according to another embodiment.

FIG. 30 shows an embodiment of the machine learning apparatus 120 illustrated in FIG. 1, and illustrates a configuration including a learning section 124 configured to perform reinforcement learning as an example of the learning algorithm. The reinforcement learning is a technique to iterative, in a trial and error manner, a cycle in which the current state (i.e., input) of an environment where a learning object is present is observed and a predetermined action (i.e., output) is carried out in the current state, and a certain reward for this action is given, and whereby learning a scheme (in the present embodiment, shift amount δ) that maximizes the total sum of the rewards, as an optimal solution.

In the machine learning apparatus 120 illustrated FIG. 30, the learning section 124 includes a reward calculator 126 configured to obtain a reward R associated with the dimensions $F_1$, $F_2$, ΔF of the dross $D_1$, $D_2$, and a function-update section 128 configured to update a function EQ representing a value of the shift amount δ using the reward R. The learning section 124 learns the shift amount δ by the function-update section 128 repeating the update of the function EQ.

An example of the reinforcement learning algorithm executed by the learning section 124 will be described below. The algorithm according to this example is known as Q-learning, which is a technique in which a state "s" of an action subject and an action "a" selectable by the action subject in the state s are taken as independent variables, and a function EQ (s, a) representing an action value is learned when the action a is selected in the state s.

To select the action a that makes the value function EQ highest in the state s brings an optimal solution. Q-learning is started in a state where the correlation between the state s and the action a is unknown, trials and errors to select various actions in arbitrary state s are repeated, whereby the value function EQ is iteratively updated to approach an optimal solution. When an environment (i.e., state s) changes as a result of selecting the action a in the state s, a reward r (i.e., weighting of the action a) in response to the environment change is obtained, and the value function EQ can be approach the optimal solution in a relatively short time by guiding the learning to select the action a to obtain a higher reward r.

An update formula for the value function EQ can be generally expressed as Formula (1) given below.

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In Formula (1), $s_t$ and $a_t$ are a state and an action at time t, respectively, and the state is changed to $s_{t+1}$ by action $a_t$. Here, $r_{t+1}$ is a reward obtained by changing the state from $s_t$ to $s_{t+1}$. The term of max Q means Q when the action a is taken to obtain (or to be considered to obtain at time t) a maximum value Q at time t+1. Further, α and γ are a learning coefficient and a discount rate, respectively, and are optionally set as 0<α≤1 and 0<γ≤1.

When the learning section 124 performs Q learning, the state variable SV observed by the state-observation section 122 corresponds to the state s of the update formula, and the action (i.e., shift amount δ) of how much the center axis $A_2$ should be shifted from the optical axis $A_1$ when cutting the workpiece $W_T$ in the current state corresponds to the action a of the update formula. The reward R obtained by the reward calculator 126 corresponds to the reward r of the update formula. Therefore, the function-update section 128 repeatedly updates the function EQ representing the value of the shift amount δ when cutting the workpiece $W_T$ in the current state, by Q learning using the reward R.

As an example, the reward calculator 126 obtains different rewards R depending on the dimension difference ΔF (=|$F_2$−$F_1$|) between the dross $D_1$ and $D_2$ on both sides of the cutting spot (or kerf K) of the workpiece $W_T$. For example, the reward R obtained by the reward calculator 126 is a positive (plus) reward R when the dimension difference ΔF occurs between the dimension $F_1$ of the dross $D_1$ and the dimension $F_2$ of the dross $D_2$, while it is a negative (minus) reward R when the dimension difference ΔF does not occur. The absolute values of the positive and negative rewards R may be the same or may be different from each other.

The reward calculator 126 may give the reward R whose absolute value becomes larger as the dimension difference ΔF is larger. For example, the reward R=+1 may be given in a case of 0<ΔF≤$ΔF_{th1}$, the reward R=+2 may be given in a case of $ΔF_{th1}$<ΔF≤$ΔF_{th2}$, and the reward R=+5 may be given in a case of $ΔF_{th2}$<ΔF. By obtaining the reward R weighted by the conditions in this manner, Q-learning can be convergent to the optimal solution in a relatively short time.

As another example, the reward calculator 126 obtains different rewards R depending on individual dimensions $F_1$ and $F_2$ of the dross $D_1$ and $D_2$ on both sides of the cutting spot (or kerf K) of the workpiece $W_T$. For example, the reward R obtained by the reward calculator 126 is a positive reward R when one of the dimensions $F_1$ and $F_2$ is smaller than the threshold value $F_{th1}$, while the other one of the dimensions $F_1$ and $F_2$ is greater than the threshold value $F_{th2}$. The threshold values $F_{th1}$ and $F_{th2}$ may be defined as the same value ($F_{th1}$=$F_{th2}$) or different values from each other (e.g., $F_{th1}$<$F_{th2}$).

On the other hand, the reward R obtained by the reward calculator 126 is a negative reward R when the dimensions $F_1$ and $F_2$ are substantially the same. Alternatively, in a case where the threshold value $F_{th1}$ is smaller than threshold value $F_{th2}$, the reward R obtained by the reward calculator 126 is a negative reward R when the dimensions $F_1$ and $F_2$ satisfy $F_{th1}<F_1<F_{th2}$ and $F_{th1}<F_2<F_{th2}$.

The reward calculator 126 may obtain different rewards R depending on a difference in machining condition data, in addition to the dimensions $F_1$ and $F_2$, or the dimension difference $\Delta F$. For example, the reward calculator 126 gives a positive reward R when the dimension difference $\Delta F$ occurs and the supply pressure SP in the machining condition data is smaller than a reference value $SP_R$. The reference value $SP_R$ may be predetermined by the operator from the past heuristics, for example.

The function-update section 128 may have an action value table in which the state variables SV and the reward R are compiled in association with an action value (e.g., a numeric value) represented by the function EQ. In this case, the act of the function-update section 128 to update the function EQ is synonymous with the act of the function-update section 128 to update the action value table.

Since the correlation between the current state of the environment and the shift amount δ is unknown at the beginning of Q learning, various state variables SV and rewards R are prepared in the action value table in association with randomly defined the action values (function EQ). When acquiring the dimensions $F_1$ and $F_2$, or the dimension difference $\Delta F$, the reward calculator 126 can immediately calculate the reward R corresponding to the acquired information, and then the calculated value of the reward R is written into the action value table.

As Q learning is advanced using the reward R corresponding to the dross dimension ($F_1$, $F_2$, $\Delta F$), the learning is guided to select an action (i.e., shift amount δ) able to obtain a higher reward R. Then, in response to the state of the environment (i.e., state variables SV) caused to change as a result of carrying out the selected action in the current state, the action value (function EQ) regarding the action carried out in the current state is rewritten and the action value table is updated.

By repeating this update, the action value (function EQ) represented in the action value table is rewritten to be larger as the action (shift amount δ) is more appropriate. In this manner, the correlation between the current state of the environment (dross dimension of $F_1$, $F_2$, $\Delta f$) and the corresponding action (shift amount δ), which was unknown at first, becomes gradually apparent.

Figure 31:
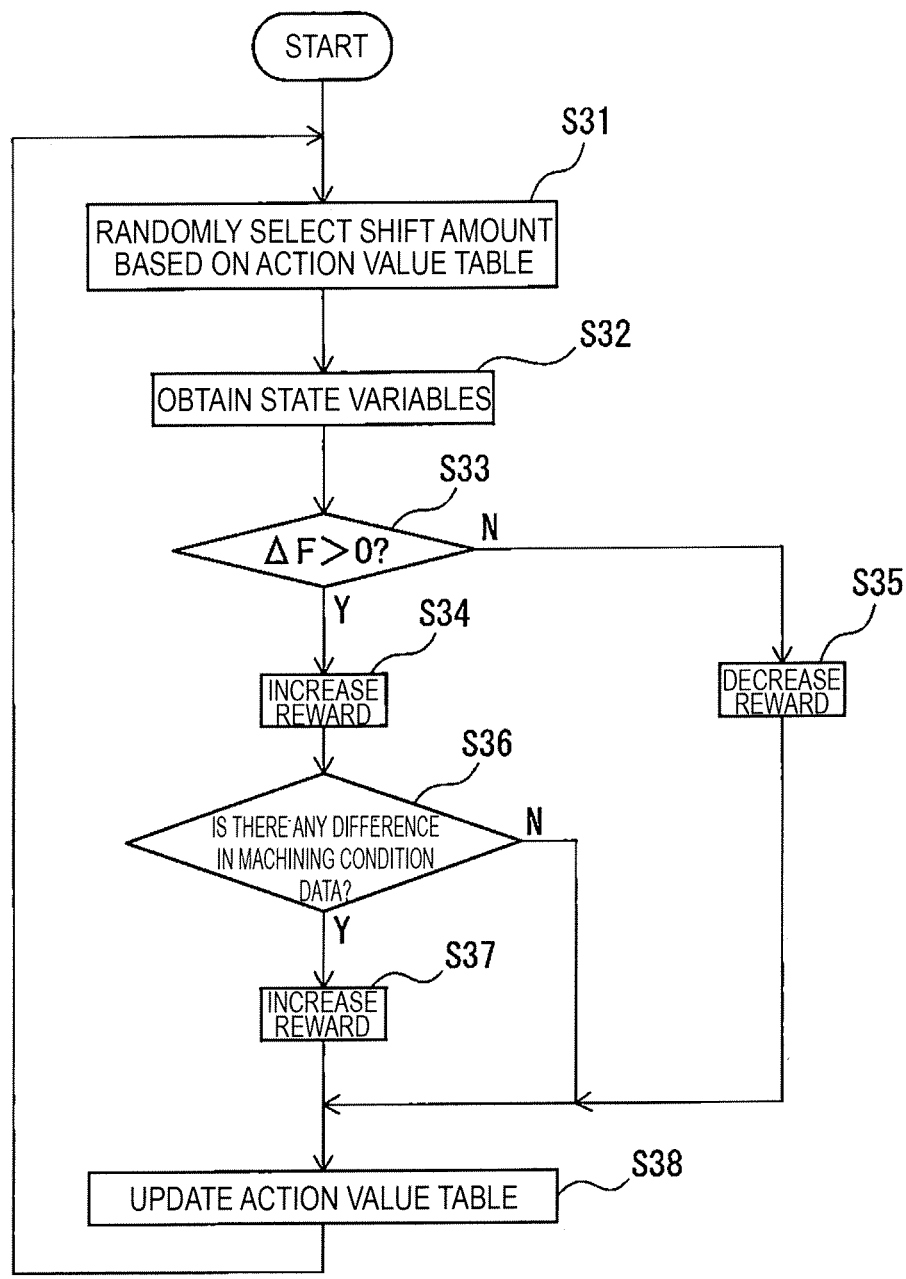
FIG. 31 is a flowchart illustrating an example of a learning flow carried out by the machine learning apparatus illustrated in FIG. 30.

Next, an example of a flow of Q learning performed by the learning section 124 will be further described with reference to FIG. 31. In this flow, the learning section 124 performs Q learning using the reward R in response to the dimension difference $\Delta F$ and the machining condition data. In step S31, the function-update section 128 randomly selects the shift amount δ as an action to be carried out in the current state indicated by the state variables SV having been observed by the state-observation section 122, with reference to the action value table at this time.

In step S32, the function-update section 128 acquires the dimension difference $\Delta F$ as the state variable SV in the current state observed by the state-observation section 122. Specifically, the laser machine 10 performs trial laser machining in accordance with the shift amount δ selected in step S1 under optional machining conditions. The state-observation section 122 observes, as the state variables SV, the machining condition data when the trial laser machining is performed, and the dimension difference $\Delta F$ obtained as a result of the trial laser machining. The function-update section 128 acquires the state variables SV observed by the state-observation section 122.

In step S33, the function-update section 128 determines whether or not the dimensional difference $\Delta F$ acquired in step S32 is greater than zero. When the dimension difference $\Delta F$ is greater than zero, the function-update section 128 determines YES, and proceeds to step S34. On the other hand, when the dimension difference $\Delta F$ is zero, the function-update section 128 determines NO, and proceeds to step S35. Note that the function-update section 128 may determine YES if the dimension difference $\Delta F$ is greater than a threshold value $\Delta F_{th0}$ (>0) predetermined as a value close to zero.

In step S34, the reward calculator 126 obtains a positive reward R. At this time, the reward calculator 126 may obtain the reward R such that the larger the dimension difference $\Delta F$ is, the larger the absolute value of the reward R is, as described above. The reward calculator 126 applies the obtained positive reward R to the update formula of the function EQ. By giving the reward R in response to the dimension difference $\Delta F$ in this manner, the learning by the learning section 124 is guided to select an action in which the dimension difference $\Delta F$ increases (in other words, one of the dimensions $F_1$ and $F_2$ becomes smaller than the other).

On the other hand, when it is determined NO in step S33, in step S35, the reward calculator 126 obtains a negative reward R, and applies it to the update formula of the function EQ. Note that, in this step S35, the reward calculator 126 may apply the reward R=0 to the update formula of the function EQ, instead of giving the negative reward R.

In step S36, the function-update section 128 determines whether there is a difference in the machining condition data obtained in step S32, for which a positive reward R it to be given. For example, the function-update section 128 determines whether or not the supply pressure SP in the machining condition data is smaller than the reference value $SP_R$, and determines YES when the supply pressure SP is smaller than the reference value $SP_R$.

Alternatively, the function-update section 128 may determine whether or not the machining speed v in the machining condition data is greater than a reference value $v_R$, and may determine YES when the machining speed v is greater than the reference value $v_R$. When the function-update section 128 determines YES, it proceeds to step S37. On the other hand, when the function-update section 128 determines NO, it proceeds to step S38.

In step S37, the reward calculator 126 obtains a positive reward R. The reward R that is to be obtained at this time may be predetermined by the operator as a value corresponding to the machining condition data, the difference of which has been determined in above step S36. For example, if the difference in the supply pressure SP as the machining condition data is determined in step S36, the reward calculator 126 gives a positive reward R in response to the supply pressure SP. By giving the reward R in response to the supply pressure SP in this manner, the learning by the learning section 124 is guided to select an action to reduce the supply pressure SP (i.e., the consumption of the assist gas).

On the other hand, if the difference in the machining speed v as the machining condition data is determined in step S36, the reward calculator 126 gives a positive reward R in response to the machining speed v. By giving the reward R in response to the machining speed v in this manner, the learning by the learning section 124 is guided to select an action to increase the machining speed v (i.e., to reduce a cycle time). The reward calculator 126 applies the obtained positive reward R to the update formula of the function EQ.

In step S38, the function-update section 128 updates the action value table, using the state variables SV in the current state, the reward R, and the action value (the function EQ after being updated). In this manner, the learning section 124 iteratively updates the action value table by repeating steps S31 to S38, so as to advance the learning of the shift amount δ.

Figure 32:
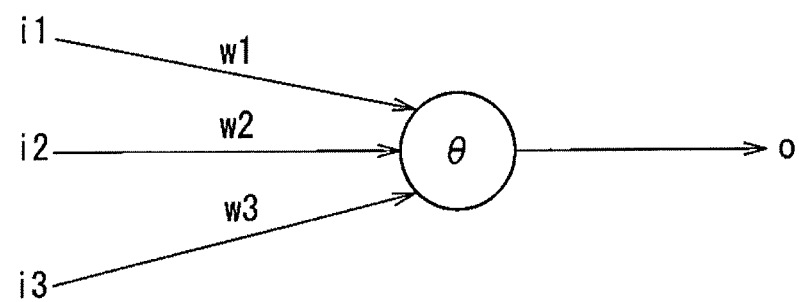
FIG. 32 schematically illustrates a neuron model.
Figure 33:
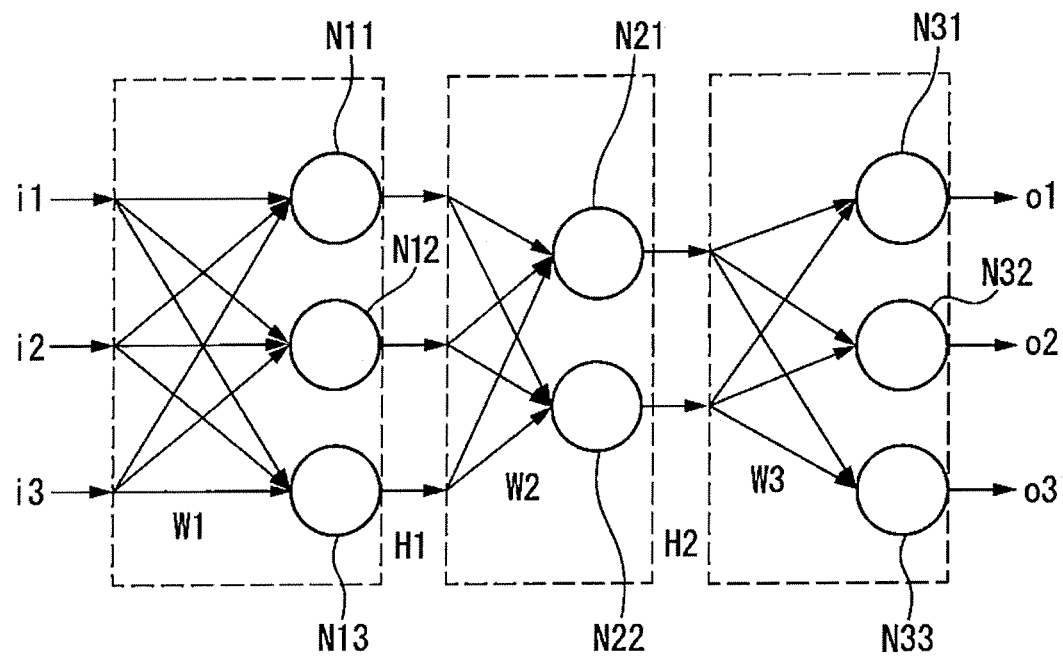
FIG. 33 schematically illustrates a multi-layer neural network model.

When advancing the above-described reinforcement learning, a neural network may be used, instead of Q learning. FIG. 32 schematically illustrates a neuron model. FIG. 33 schematically illustrates a three-layer neural network model constituted by combining the neurons illustrated in FIG. 32. The neural network may be constituted by, for example, a processor, a storage device, and the like imitating a neuron model.

The neuron illustrated in FIG. 32 outputs a result "o" with respect to a plurality of inputs "i" (inputs i1 to i3 as an example in the drawing). Each individual input i (i1, i2, or i3) is multiplied by a weight w (w1, w2, or w3). The relationship between the input i and the result o may be represented by Formula (2) given below. Any of the input i, result o, and weight w is a vector. In Formula (2), θ is a bias, and $f_k$ is an activation function.

$$y = f_k(\Sigma_{i=1}^{n} x_i w_i - \theta) \quad (2)$$

In the three-layer neural network illustrated in FIG. 33, a plurality of inputs i (inputs i1 to i3, as an example in the drawing) are inputted from the left side, and a plurality of results o (results o1 to o3, as an example in the drawing) are outputted from the right side. In the illustrated example, each of the inputs i1, i2, and i3 is multiplied by the corresponding weight (collectively represented as W1), and any of the individual inputs i1, i2, and i3 is inputted to three neurons N11, N12, and N13.

In FIG. 33, each output of the neurons N11 to N13 is collectively represented as H1. H1 may be regarded as feature vectors achieved by extracting feature amounts of input vectors. In the illustrated example, each individual feature vector H1 is multiplied by the corresponding weight (collectively represented as W2), and any of the individual feature vectors H1 is inputted to two neurons N21 and N22. The feature vectors H1 represent features between the weight W1 and the weight W2.

In FIG. 33, each output of the neurons N21 to N22 is collectively represented as H2. H2 may be regarded as feature vectors achieved by extracting feature amounts of the feature vectors H1. In the illustrated example, each individual feature vector H2 is multiplied by the corresponding weight (collectively represented as W3), and any of the individual feature vectors H2 is inputted to three neurons N31, N32, and N33. The feature vectors H2 represent features between the weight W2 and the weight W3. Lastly, the neurons N31 to N33 output the results o1 to o3, respectively.

In the machine learning apparatus 120, it is possible to output the shift amount δ (result o) by the learning section 124 carrying out the arithmetic operation of the multi-layer structure according to the above-described neural network while taking the state variables. SV as the input i. There are a learning mode and a value prediction mode in the operation mode of the neural network. For example, the weight W may be learned in the learning mode by using a learning data set, and a value judgment may be made in the value prediction mode by using the learned weight W. In the value prediction mode, detection, classification, reasoning, or the like may also be performed.

The above-mentioned configuration of the machine learning apparatus 120 may be described as a machine learning method (or software) executed by a processor of a computer. This machine learning method comprises, by the processor, observing the machining condition data included in the machining program 121 given to the laser machine 10, and the measurement data of the dimensions $F_1$, $F_2$, ΔF of the dross $D_1$, $D_2$ generated at the cutting spot (or kerf K) of the workpiece $W_T$ when executing the machining program 121, as the state variables SV representing the current state of the environment where the workpiece $W_T$ is cut; and learning the shift amount δ in association with the cutting quality (dross dimension) of the workpiece $W_T$ using the state variables SV.

Figure 34:
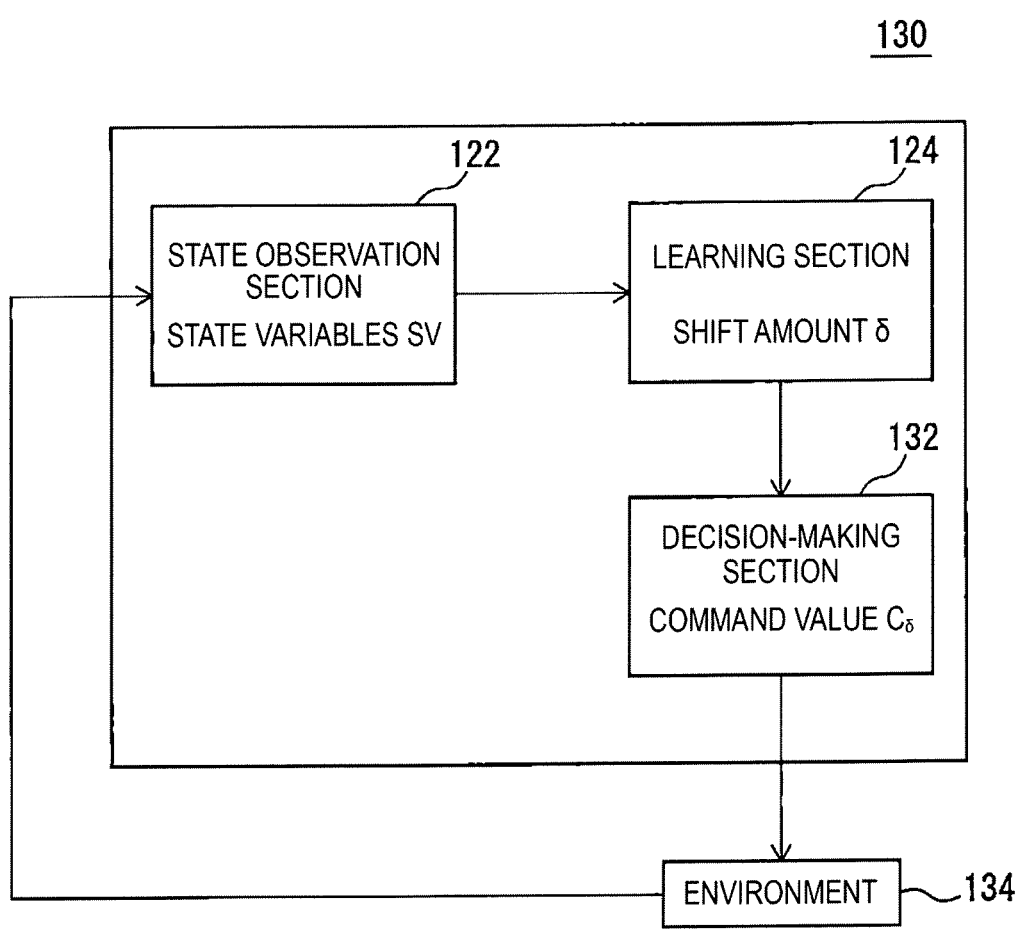
FIG. 34 is a block diagram of a machine learning apparatus according to still another embodiment.

FIG. 34 illustrates a machine learning apparatus 130 according to another embodiment. The machine learning apparatus 130 differs from the above-described machine learning apparatus 120 in that the machine learning apparatus 130 further includes a decision-making section 132. The decision-making section 132 outputs a command value Cδ of the shift amount δ to be commanded to the laser machine 10, based on the learning result by the learning section 124.

When the decision-making section 132 outputs the shift amount δ, the state of an environment 134 (dross dimension $F_1$, $F_2$, ΔF) changes accordingly. A state-observation section 122 observes state variables SV, wherein the dross dimension $F_1$, $F_2$, ΔF generated when the machining program 121 is executed in accordance with the command value Cδ outputted by the decision-making section 132 is observed as the measurement data for the next learning cycle.

The learning section 124 learns the shift amount δ by updating e.g. the value function EQ (i.e., an action value table) using the changed state variables SV. The decision-making section 132 outputs the command value Cδ in response to the state variables SV, under the learned shift amount δ. By repeating this cycle, the machine learning apparatus 130 advances the learning of the shift amount δ, and gradually improves reliability of the shift amount δ.

The machine learning apparatus 130 can bring about an effect similar to the above-described machine learning device 120. In particular, the machine learning apparatus 130 can change the state of the environment 134 by the output of the decision-making section 132. On the other hand, in the machine learning apparatus 130, a function corresponding to the decision-making section for reflecting the learning result of the learning section 124 in the environment may be achieved by an external device (e.g., the control device 12).

As a modification of the above-described machine learning apparatus 120 or 130, the state-observation section 122 may further observe, as the state variable SV, measurement data of the kerf-width w on the rear surface of the workpiece $W_T$. The kerf-width w in the rear surface may be measured by e.g. the dimension measuring instrument 102 described above. The learning section 124 may learn the shift amount δ, further using the kerf-width w as the state variable.

For example, in the machine learning apparatus 120 illustrated in FIG. 30, the reward calculator 126 may obtain a negative reward R when the kerf-width w is zero (or equal to or smaller than a threshold value close to zero). If the kerf-width w in the rear surface of the workpiece $W_T$ is zero when performing the trial laser machining, the laser beam L does not penetrate the workpiece $W_T$. In this case, the dross $D_1$ and $D_2$ are not formed actually. By making the reward R be negative in this case, it is possible to guide the learning by the learning section 124 to select an action for preventing the kerf-width w in the rear surface from being zero.

Figure 35:
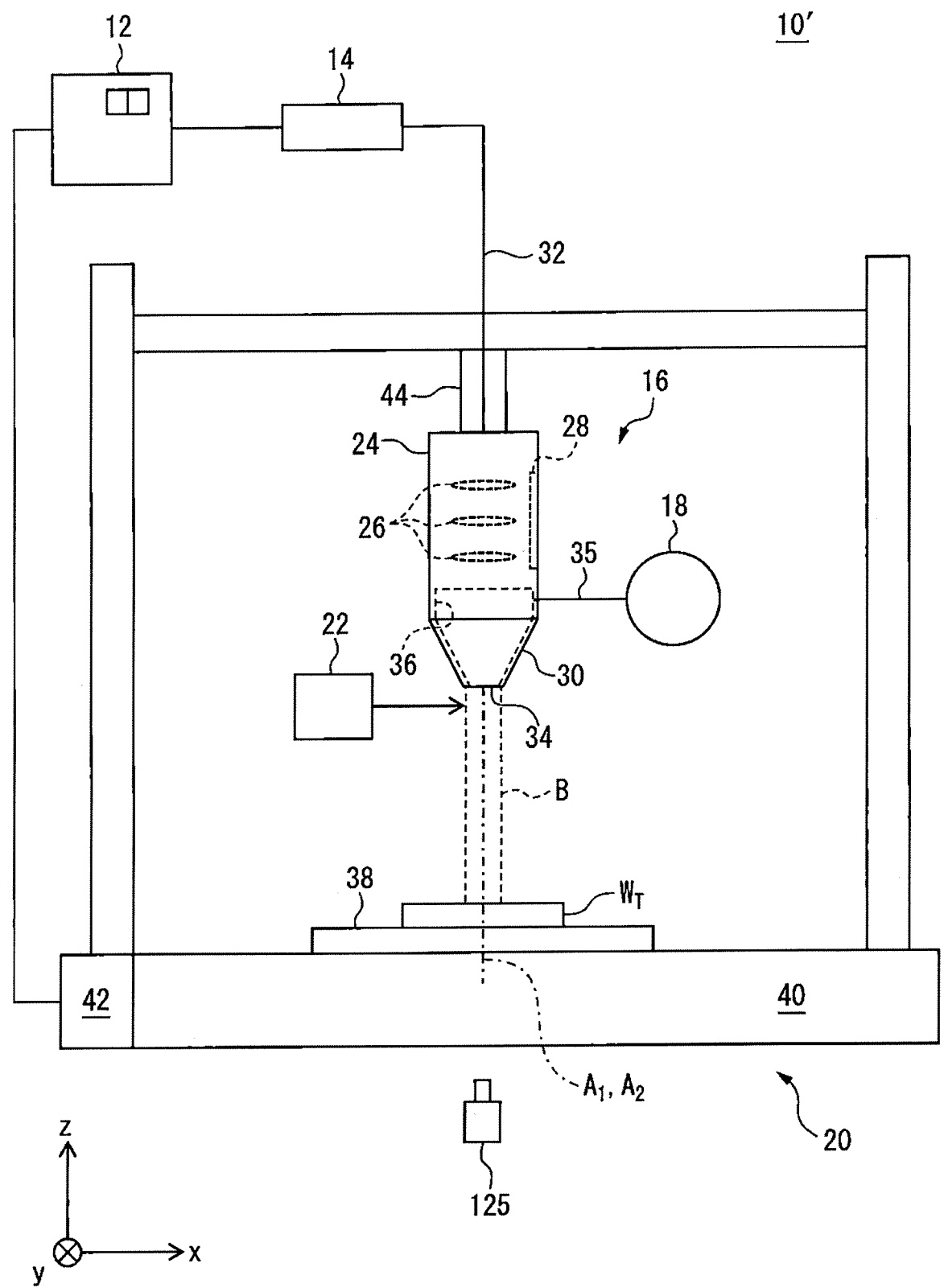
FIG. 35 illustrates a mode in which the learning apparatus illustrated in FIG. 34 is mounted in the laser machine illustrated in FIG. 1.
Figure 36:
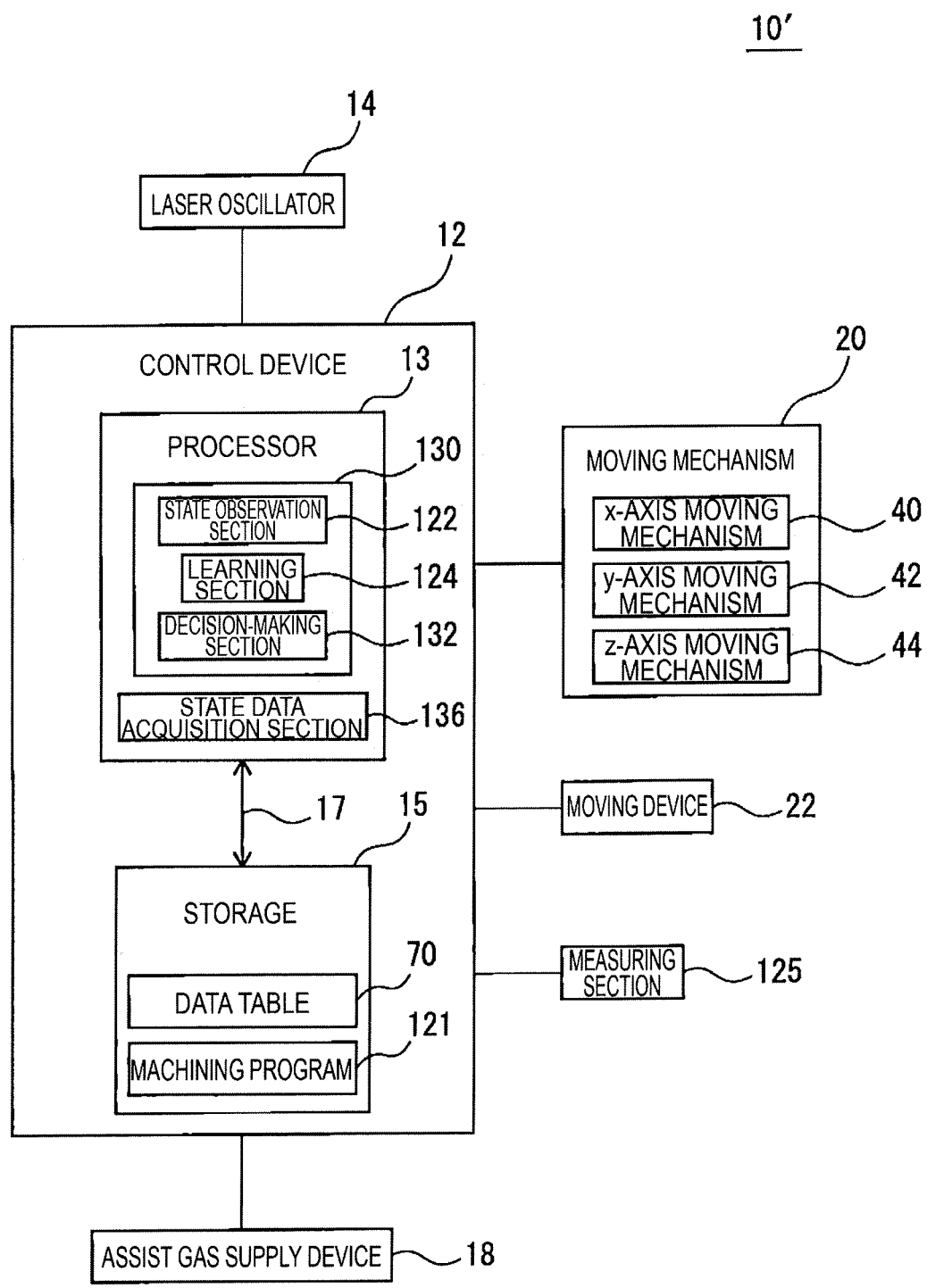
FIG. 36 is a block diagram of the laser machine illustrated in FIG. 35.

The above-described machine learning apparatus 120 or 130 may be installed in the laser machine 10. With reference to FIG. 35 and FIG. 36, a laser machine 10', in which the machine learning apparatus 130 is installed, will be described below. The laser machine 10' further includes the above-described measuring section 125, and performs the trial laser machining on the trial workpiece $W_T$ set on the work table 38.

As illustrated in FIG. 36, the processor 13 functions as the machine learning apparatus 130 (i.e., the state-observation section 122, learning section 124, and decision-making section 132). The measuring section 125 measures the dimensions $F_1$ and $F_2$ of the dross $D_1$ and $D_2$, and the control device 12 acquires the measurement data $F_1$, $F_2$, $\Delta F$ from the data transmitted from the measuring section 125.

The processor 13 acquires machining condition data (the material and thickness t of the workpiece $W_T$, the machining speed v, the nozzle diameter $\phi$, the supply pressure SP, the focus position z, and the output characteristic value of the laser beam L) included in the machining program 121 for performing the trial laser machining. The machining condition data may be inputted by an operator via the input device (the keyboard, mouse, touch panel, etc. Not illustrated) provided at the control device 12, for example. In this manner, the processor 13 functions as a state-data acquisition section 136 configured to acquire the machining condition data and measurement data.

According to the present embodiment, the control device 12 of the laser machine 10' includes the machine learning apparatus 130, which makes it possible to automatically and precisely obtain the shift amount $\delta$ optimal for the cutting quality (dross dimension) using the learning result of the learning section. 124 when the trial laser machining is repeatedly performed.

Figure 37:
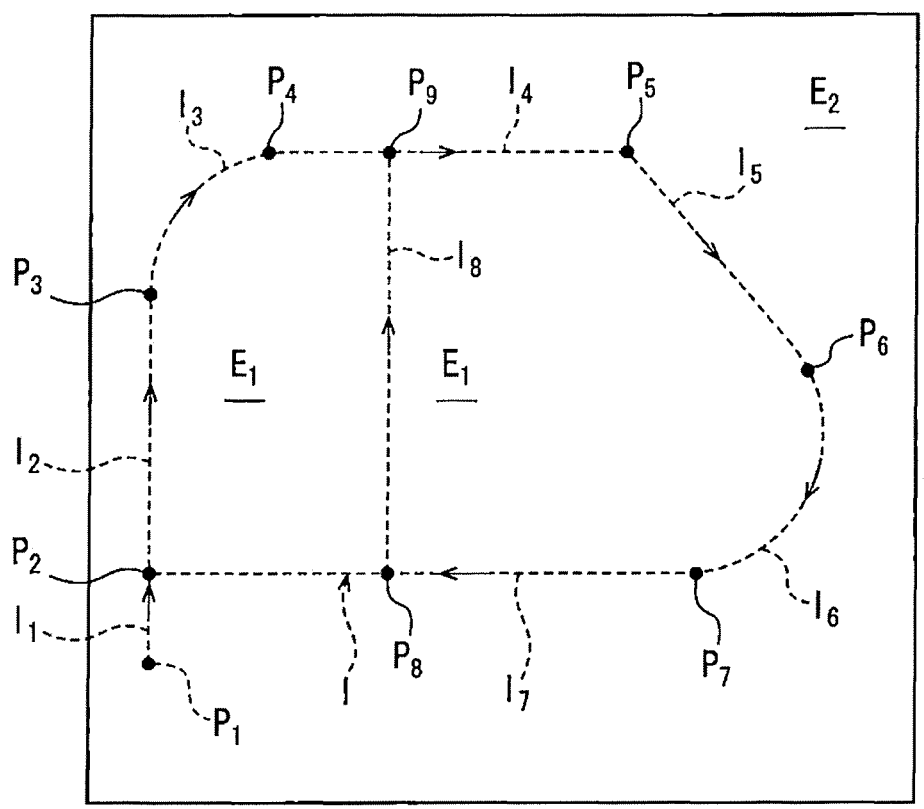
FIG. 37 illustrates an example of a workpiece in which an additional cutting line is specified.

Note that, in the machining program 72, 84, 94, or 104, an additional cutting line traversing the product region $E_1$ may be specified on the workpiece W. Such a modification of the workpiece W is illustrated in FIG. 37. In a workpiece W' illustrated in FIG. 37, a cutting line $l_8$ extending linearly from a point $P_8$ to a point $P_9$ is further specified, in addition to cutting lines $l_1$ to $l_7$. In this case, in the machining program 72, 84, 94, or 104, regions on both sides of the cutting line $l_8$ are both specified as the product region $E_1$.

For example, the control device 12 of the laser machine 10, 80, 90, 100 or 110 cuts the workpiece W along the cutting line $l_8$ between the left side region (third region) and the right side region (fourth region) of the product region $E_1$, after cutting the workpiece W along the cutting lines $l_1$ to $l_7$. Since the cutting quality requirements do not differ between the regions on both sides of the cutting line $l_8$, the processor 13 maintains a state in which the laser beam L and the assist gas B are coaxial during the cutting of the product region $E_1$ along the cutting line $l_8$.

The flow illustrated in FIG. 21 is described as an example of the operation of the laser machine 90 described above. However, another example of the operation flow of the laser machine 90 is also conceivable. Hereinafter, with reference to FIG. 38, another example of the operation flow of the laser machine 90 will be described. In the flow illustrated in FIG. 38, processes similar to those of the flow illustrated in FIG. 21 are assigned the same step number, and redundant descriptions thereof will be omitted.

Figure 38:
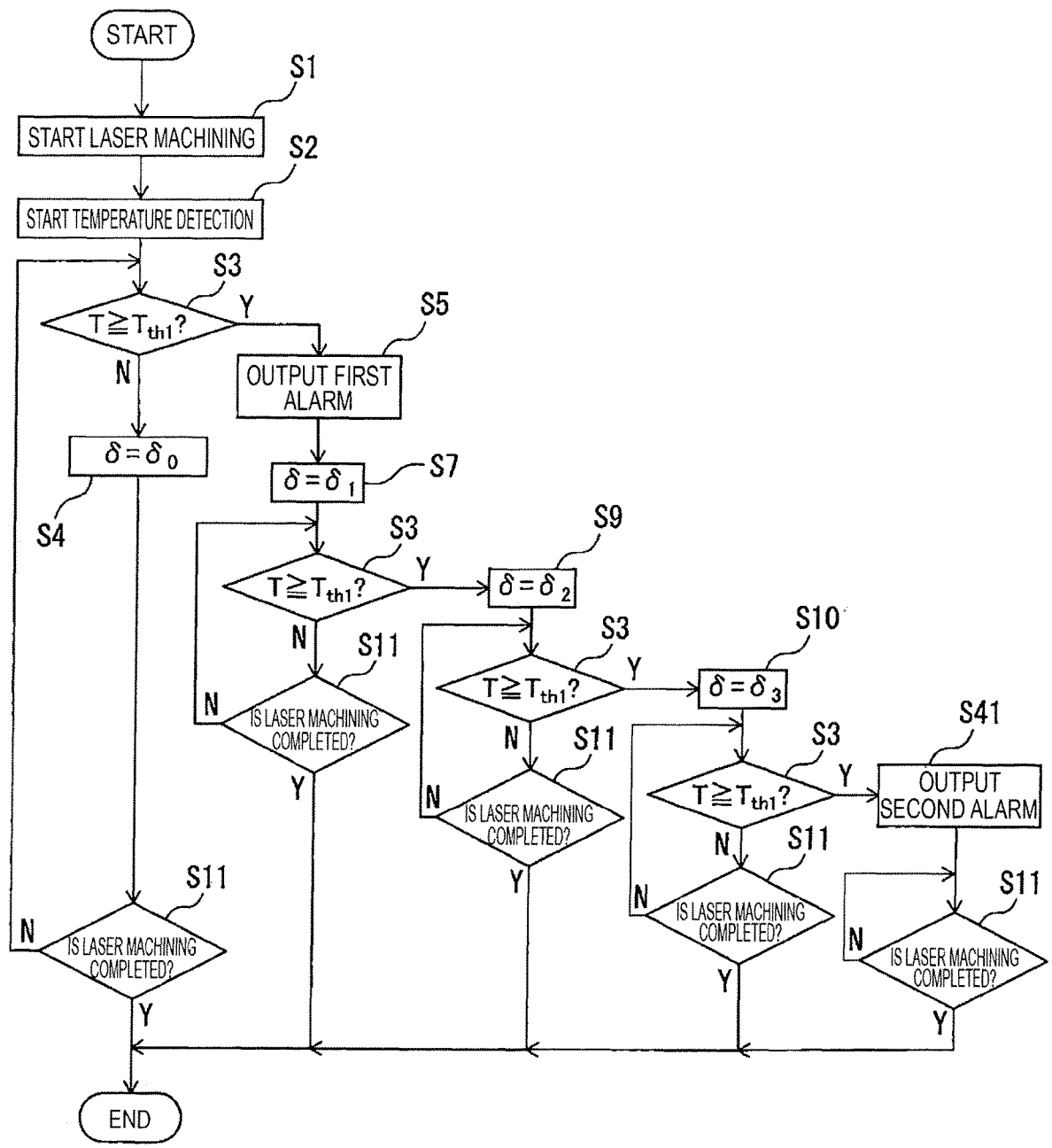
FIG. 38 is a flowchart illustrating another example of an operation flow of the laser machine illustrated in FIG. 19.

In the flow illustrated in FIG. 38, the processor 13 of the laser machine 90 increases the shift amount $\delta$ in stepwise manner so as to make the temperature T ($T_1$, $T_A$, or $R_T$) to fall within a range equal to or smaller than the first threshold value $T_{th1}$ ($T_{th1\_1}$, $T_{th1\_2}$, or $T_{th1\_3}$). Specifically, after step S7, the processor 13 repeats a loop of steps S3 and S11 until it determines YES in step S3 or S11, so as to maintain the shift amount $\delta$ to the first shift amount $\delta_1$. On the other hand, when it is determined YES in step S3 carried out immediately after step S7, in step S9, the processor 13 increases the shift amount $\delta$ from the first shift amount $\delta_1$ to the second shift amount $\delta_2$.

After step S9, the processor 13 repeats a loop of steps S3 and S11 until it determines YES in step S3 or S11, so as to maintain the shift amount $\delta$ to the second shift amount $\delta_2$. On the other hand, when it is determined YES in step S3 carried out immediately after step S9, in step S10, the processor 13 increases the shift amount $\delta$ from the second shift amount $\delta_2$ to the third shift amount $\delta_3$.

After step S10, the processor 13 repeats a loop of steps S3 and S11 until it determines YES in step S3 or S11, so as to maintain the shift amount $\delta$ to the third shift amount $\delta_3$. On the other hand, when the processor 13 determines YES in step S3 carried out immediately after step S10, it proceeds to step S41.

In step S41, the processor 13 outputs a second alarm. For example, the processor 13 generates an audio or image signal indicative of "Although shift amount of center axis of assist gas is maximum, there is possibility that cutting quality requirement (dross dimension) of product region is not satisfied", and outputs the generated signal through the speaker or display (not illustrated) provided at the control device 12. Subsequently, the processor 13 continues the laser machining while maintaining the shift amount $\delta$ to the third shift amount $\delta_2$ until it determines YES in step S11.

Thus, according to the flow illustrated in FIG. 38, the processor 13 increases the shift amount $\delta$ of the center axis. $A_2$ toward the product region $E_1$ in a stepwise manner in response to the temperature T, so as to make the temperature T ($T_1$, $T_A$, or $R_T$) to fall within the range equal to or smaller than the first threshold value $T_{th1}$ ($T_{th1\_1}$, $T_{th1\_2}$, or $T_{th1\_3}$). According to this configuration, it is possible to control the dimension of the dross generated in the product region $E_1$ so as to meet the cutting quality requirement.

Note that the width w of the kerf K described above correlates with the output characteristic value OP of the laser beam. Specifically, the larger the laser power of the laser beam L radiated onto the workpiece W is, the larger the width w of the kerf K generated may be. Accordingly, the processor 13 may control the shift amount $\delta$ in response to the output characteristic value OP of the laser beam.

For example, in the flow illustrated in FIG. 24, the output characteristic value OP of the laser beam may be acquired instead of the width w of the kerf K, and the positional relationship between the center axis $A_2$ and the optical axis $A_1$ may be changed in response to the acquired output characteristic value OP to control the shift amount $\delta$. In this case, the processor 13 starts to obtain the output characteristic value OP in step S21. If the output characteristic value OP is the laser power of the laser beam L for example, the laser machine 100 includes a laser power measuring instrument instead of (or in addition to) the dimension measuring instrument 102, wherein the processor 13 may acquire the laser power as the output characteristic value OP from the laser power measuring instrument.

Alternatively, if the output characteristic value OP is the laser power command value, or the frequency or duty ratio of the PW laser beam, such a parameter is defined in the machining program or stored in the storage 15 as a setting value. Accordingly, the processor 13 is able to acquire, from the machining program or the storage 15, the data of the laser power command value, or the frequency or duty ratio of the PW laser beam.

In step S22, the processor 13 determines whether or not the output characteristic value OP most-recently acquired is equal to or greater than a first threshold value $OP_{th1}$. The processor 13 determines YES when the output characteristic value OP is equal to or greater than the first threshold value $OP_{th1}$, and proceeds to step S23. On the other hand, the processor 13 determines NO when the output characteristic value OP is smaller than the first threshold value $OP_{th1}$, and proceeds to step S4.

In step S23, the processor 13 determines whether or not the output characteristic value OP most-recently acquired is equal to or greater than a second threshold value $OP_{th2}$ (>$OP_{th1}$). The processor 13 determines YES when the output characteristic value OP is equal to or greater than the second threshold value $OP_{th2}$, and proceeds to step S25. On the other hand, the processor 13 determines NO when the output characteristic value OP is smaller than the second threshold value $OP_{th2}$, and proceeds to step S24.

In step S25, the processor 13 determines whether or not the output characteristic value OP most-recently acquired is equal to or greater than a, third threshold value $OP_{th3}$ (>$OP_{th2}$). The processor 13 determines YES when the output characteristic value OP is equal to or greater than the third threshold value $OP_{th3}$, and proceeds to step S27. On the other hand, the processor 13 determines NO when the output characteristic value OP is smaller than the third threshold value $OP_{th3}$, and proceeds to step S26.

In this way, the processor 13 changes the positional relationship between the center axis $A_2$ and the optical axis $A_1$ in response to the output characteristic value OP during cutting between the product region $E_1$ and the waste region $E_2$. Specifically, the processor 13 changes the shift amount δ in response to the magnitude of the output characteristic value OP, so as to be the initial shift amount $δ_0$ if OP<$OP_{th1}$ is satisfied, to be the first shift amount $δ_4$ if $OP_{th1}$≤OP<$OP_{th2}$ is satisfied, to be the second shift amount $δ_5$ if $OP_{th2}$<OP<$OP_{th3}$ is satisfied, and to be the third shift amount $δ_6$ if $OP_{th3}$≤OP is satisfied.

According to this configuration, the positional relationship between the center axis $A_2$ and the optical axis $A_1$ is changed in response to the change in the kerf-width w which occurs depending on the output characteristic value OP, whereby it is possible to finely adjust the rate of the assist gas B blown onto the product region $E_1$. As a result, the cutting quality requirement (dross dimension) of the product region $S_1$ can be more effectively satisfied.

Note that the storage 15 is not limited to one that is built in the control device 12, but it may be a memory unit (e.g., a hard disk or EEPROM) externally connected to the control device 12, or may be built in an external apparatus (e.g., a server) connected to the control device 12 via a communication network.

Further, the above-described optical fiber 32 may be omitted, and the laser beam emitted from the laser oscillator 14 may be reflected by a mirror to be guided to the machining head 16, for example. Further, the moving mechanism 20 is not limited to the above-described configuration. For example, the moving mechanism 20 may be configured so as to move the machining head 16 (or a work table) in the x-axis, y-axis, and z-axis directions.

Furthermore, the workpiece W is not limited to the example illustrated in FIG. 13. For example, in the workpiece W, the cutting line $l_3$ or $l_6$ may be a bent line bent to form an acute, right or obtuse angle. In this case, the cutting speeds $v_{13}$ and $v_{16}$ when cutting the workpiece W along the bent cutting lines $l_3$ and $l_6$ are set to the speed $v_L$ slower than the speed $v_H$, similarly to the above-described embodiments.

Although the present disclosure is described above through the embodiments, the embodiments described above are not intended to limit the claimed invention.

The invention claimed is:

1. A laser machine comprising:
 a machining head configured to emit a laser beam and an assist gas coaxially and non-coaxially;
 a data table which is embedded in a non-transitory memory, and in which data of a machining condition for cutting a workpiece using the machining head, and a shift amount, by which a center axis of the assist gas is to be shifted from an optical axis of the laser beam in order to make cutting quality on both sides of a cutting line to be different during cutting the workpiece, are stored in association with each other; and
 a processor configured to:
  obtain the shift amount from the data table in response to the machining condition; and
  maintain the center axis to be shifter from the optical axis by the shift amount, while cutting along the cutting line.

2. The laser machine of claim 1, wherein the data of the machining condition includes at least one of a material of the workpiece, a thickness of the workpiece, a machining speed at which the workpiece is cut, a nozzle diameter of the machining head, a supply pressure of the assist gas, a focus position of the laser beam, and an output characteristic value of the laser beam.

3. The laser machine of claim 1, further comprising a moving device configured to shift the center axis from the optical axis in accordance with the shift amount.

4. The laser machine of claim 3, further comprising a temperature sensor configured to detect a temperature of the workpiece during cutting the workpiece,
 wherein the moving device is configured to change a positional relationship between the center axis and the optical axis in response to the detected temperature.

5. The laser machine of claim 3, further comprising a dimension measuring instrument configured to measure a kerf-width along the cutting line during cutting the workpiece,
 wherein the moving device is configured to change a positional relationship between the center axis and the optical axis in response to the measured kerf-width (w).

6. The laser machine of claim 3, wherein the machining head includes a nozzle configured to emit the assist gas along with the laser beam,
 wherein the moving device is configured to shift the center axis from the optical axis by moving the nozzle.

7. The laser machine of claim 3, wherein the machining head includes a nozzle configured to emit the assist gas along with the laser beam, the nozzle including a plurality of discharge ports configured to discharge the assist gas,
 wherein the moving device is configured to shift the center axis from the optical axis by varying a flow rate of the assist gas in the plurality of discharge ports.

8. The laser machine of claim 3, wherein the machining head includes an optical element configured to guide the laser beam,
 wherein the moving device is configured to shift the center axis from the optical axis by moving the optical element.

9. The laser machine of claim 3, wherein the machining head includes an beam-coupling section configured to couple a plurality of laser beams,
   wherein the moving device is configured to shift the center axis from the optical axis by making a coupling mode of the laser beams in the beam-coupling section be non-uniform.

10. The laser machine of claim 1, further comprising a position detector in order to check a positional relationship between the center axis and the optical axis.

* * * * *